US009897352B2

United States Patent
Li

(10) Patent No.: US 9,897,352 B2
(45) Date of Patent: Feb. 20, 2018

(54) HIERARCHY CONDENSATION THIRD-TYPE ABSORPTION HEAT PUMP

(76) Inventor: Huayu Li, Qingdao (CN)

( * ) Notice: Subject to any disclaimer, the term of this patent is extended or adjusted under 35 U.S.C. 154(b) by 671 days.

(21) Appl. No.: 14/400,885

(22) PCT Filed: Aug. 17, 2012

(86) PCT No.: PCT/CN2012/001108
§ 371 (c)(1),
(2), (4) Date: Nov. 13, 2014

(87) PCT Pub. No.: WO2013/170406
PCT Pub. Date: Nov. 21, 2013

(65) Prior Publication Data
US 2015/0121938 A1  May 7, 2015

(30) Foreign Application Priority Data
May 14, 2012 (CN) .......................... 2012 1 0160788

(51) Int. Cl.
F25B 15/00 (2006.01)
F25B 30/04 (2006.01)
F25B 15/02 (2006.01)

(52) U.S. Cl.
CPC ............ *F25B 30/04* (2013.01); *F25B 15/008* (2013.01); *F25B 15/02* (2013.01); *Y02B 30/62* (2013.01)

(58) Field of Classification Search
CPC ........ F25B 30/04; F25B 15/02; F25B 15/008; F25B 15/006; F25B 2315/002; F25B 2315/007; Y02B 30/62
See application file for complete search history.

(56) References Cited

FOREIGN PATENT DOCUMENTS

CN    102287960 A  * 12/2011

OTHER PUBLICATIONS

English Translation of Li, CN 102287960 A.*

\* cited by examiner

*Primary Examiner* — Frantz Jules
*Assistant Examiner* — Steve Tanenbaum

(57) ABSTRACT

The hierarchy condensation third-type absorption heat pump provided by the invention belongs to the absorption heat pump technology field. A solution cycle is formed by a first generator, an absorption-generator, a first absorber, a first solution pump, a second solution pump, a first solution heat exchanger and a steam distributing chamber. A solution cycle is formed by a second generator, a second absorber, a third solution pump and a second solution heat exchanger. The refrigerant vapor of the first generator is provided for the first condenser. The refrigerant vapor of the second generator is provided for the second condenser. The refrigerant vapor of the steam distributing chamber is provided for the second absorber. The refrigerant liquid of the first condenser enters evaporator via the throttle valve. The refrigerant liquid of the second condenser enters evaporator via the refrigerant liquid pump. The refrigerant vapor of evaporator is provided for the absorption-generator and the first absorber. The high temperature heat is used in the first generator. The waste heat is used in the second generator. The heat load is mainly provided by the first absorber and the first condenser. The low temperature heat is released in the second absorber and the second condenser. The hierarchy condensation second-type absorption heat pump is thereby formed.

12 Claims, 30 Drawing Sheets

US 9,897,352 B2

HIERARCHY CONDENSATION THIRD-TYPE ABSORPTION HEAT PUMP

FIELD

The present invention belongs to the area of heat pump technical field in low-temperature waste heat utilization.

BACKGROUND

In the place with abundant waste heat resource, it brings a better energy-efficient, environment-friendly and economy efficiency by adopting the third-type absorption heat pump. Hierarchy condensation is used for improving the waste heat medium temperature further if the waste heat temperature is relative lower or the needed temperature of users is relative higher in the third-type absorption heat pump in which the refrigerant vapor of the low temperature generator doesn't enters the low temperature condenser directly. In this way, the waste heat medium is used deeply.

The situations of the thermal driving medium, the waste heat medium and the cooling medium should be considered in the process in which the waste heat medium temperature is improved by the third-type absorption heat pump. It is good for reducing the heat transfer temperature difference in cooling process and promoting thermodynamic perfect degree when there are two or more cooling sides and the no phase transition cooling medium is adopted. To reduce the heat transfer temperature difference and to reduce the irreversible heat transfer degree, two generators is adopted to realize the hierarchy generation of solution when the high temperature thermal driving medium adopts the no phase transition cooling medium and its flow rate is small relatively. When the waste heat medium is adopting the phase transition medium, the thermodynamic perfect degree is improved by using two or more low temperature generator in the low temperature generation process. The performance index of the third-type absorption heat pump is continuous in a certain range when the regenerative cooling side and the regenerative process are adopted in common.

THE CONTENTS OF THE INVENTION

The mainly purpose of the invention is providing the hierarchy condensation third-type absorption heat pump. The specific method is as follows.

1. The hierarchy condensation third-type absorption heat pump mainly comprises a first generator, a second generator, a first absorber, a second absorber, an absorption-generator, a first condenser, a second condenser, an evaporator, a first solution pump, a second solution pump, a third solution pump, a refrigerant liquid pump, a throttle, a first solution heat exchanger, a second solution heat exchanger and a steam distributing chamber. The dilute solution pipe of the second absorber communicates with the second generator via the third solution pump and the second solution heat exchanger. The concentrated solution pipe of the second generator communicates with the second absorber via the second solution heat exchanger. The refrigerant vapor channel of the second generator communicates with the second condenser. The refrigerant liquid pipe of the second condenser communicates with evaporator via the refrigerant liquid pump. The refrigerant vapor channel of evaporator communicates with the first absorber and absorption-generator. The dilute solution pipe of the first absorber communicates with absorption-generator. The dilute solution pipe of absorption-generator communicates with the first generator via the first solution pump and the first solution heat exchanger. The concentrated solution pipe of the first generator communicates with the steam distributing chamber via the second solution heat exchanger and absorption-generator. The concentrated solution pipe of the steam distributing chamber communicates with the first absorber via the second solution pump. The refrigerant vapor channel of the steam distributing chamber communicates with the second absorber. The refrigerant vapor channel of the first generator communicates with the first condenser. The refrigerant liquid pipe of the first condenser communicates with evaporator via the throttle. The thermal driving medium pipe of the first generator communicates with the external. The waste heat medium pipes of the second generator and the evaporator respectively communicates with the external. The heated medium pipe of the first absorber and the first condenser communicates with the external. The cooling medium pipes of the second absorber and the second absorber respectively communicates with the external. The heated medium pipe of absorption-generator communicates with the external. The hierarchy condensation third-type absorption heat pump is thereby formed.

2. The hierarchy condensation third-type absorption heat pump, in the hierarchy condensation third-type absorption heat pump of claim 1, further comprises a second evaporator, a second throttle valve and a third solution heat exchanger. The concentrated solution pipe of the steam distributing chamber communicates with the second generator via the second solution pump and the third solution heat exchanger. The dilute solution pipe of the first absorber communicates with absorption-generator via the third solution heat exchanger. The refrigerant vapor channel of evaporator communicated with absorption-generator is cancelled. Evaporator adds the refrigerant liquid pipe communicated with the second evaporator via the second throttle. The refrigerant vapor channel of the second evaporator communicates with absorption-generator. The waste heat medium pipe of the second evaporator communicates with the external. The hierarchy condensation third-type absorption heat pump is thereby formed.

3. The hierarchy condensation third-type absorption heat pump, in the hierarchy condensation third-type absorption heat pump of claim 1, further comprises a third absorber. The dilute solution pipe of the first absorber communicates with the third absorber. The dilute solution pipe of the third absorber communicates with absorption-generator. Evaporator adds the refrigerant vapor channel communicated with the third absorber. The heated medium pipe of the third absorber communicates with the external. The hierarchy condensation third-type absorption heat pump is thereby formed.

4. The hierarchy condensation third-type absorption heat pump, in the hierarchy condensation third-type absorption heat pump of claim 2, further comprises a third absorber. The dilute solution pipe of the first absorber communicates with the third absorber via the third solution heat exchanger. The dilute solution pipe of the third absorber communicates with absorption-generator. The second evaporator adds the refrigerant vapor channel communicated with the third absorber. The heated medium pipe of the third absorber communicates with the external. The hierarchy condensation third-type absorption heat pump is thereby formed.

5. The hierarchy condensation third-type absorption heat pump mainly comprises a first generator, a second generator, a first absorber, a second absorber, an absorption-generator, a first condenser, a second condenser, an evaporator, a first solution pump, a second solution pump, a third solution pump, a refrigerant liquid pump, a throttle, a first solution heat exchanger, a second solution heat exchanger, a steam distributing chamber and a solution throttle. The dilute solution pipe of the second absorber communicates with the second generator via the third solution pump and the second solution heat exchanger. The concentrated solution pipe of the second generator communicates with the second absorber via the second solution heat exchanger. The refrigerant vapor channel of the second generator communicates with the second condenser. The refrigerant liquid pipe of the second condenser communicates with evaporator via the refrigerant liquid pump. The refrigerant vapor channel of evaporator communicates with the first absorber and absorption-generator. The dilute solution pipe of the first absorber communicates with the steam distributing chamber via the solution throttle valve and absorption-generator. The concentrated solution pipe of the steam distributing chamber communicates with the first absorber via the second solution pump. The refrigerant vapor channel of the steam distributing chamber communicates with the second absorber. The dilute solution pipe of absorption-generator communicates with the first generator via the first solution pump and the first solution heat exchanger. The concentrated solution pipe of the first generator communicates with absorption-generator via the second solution heat exchanger. The refrigerant vapor channel of the first generator communicates with the first condenser. The refrigerant liquid pipe of the first condenser communicates with evaporator via the throttle. The thermal driving medium pipe of the first generator communicates with the external. The waste heat medium pipes of the second generator and the evaporator respectively communicates with the external. The heated medium pipe of the first absorber and the first condenser communicates with the external. The cooling medium pipes of the second absorber and the second absorber respectively communicates with the external. The heated medium pipe of absorption-generator communicates with the external. The hierarchy condensation third-type absorption heat pump is thereby formed.

6. The hierarchy condensation third-type absorption heat pump, in the hierarchy condensation third-type absorption heat pump of claim 5, further comprises a second evaporator and a third solution heat exchanger. The concentrated solution pipe of the steam distributing chamber communicates with the first absorber via the second solution pump and the third solution heat exchanger. The dilute solution pipe of the first absorber communicates with the steam distributing chamber via the third solution heat exchanger and absorption-generator. The refrigerant vapor channel of evaporator communicated with absorption-generator is cancelled. The refrigerant liquid pipe of the steam distributing chamber communicates with the second evaporator via the throttle. The refrigerant vapor channel of the second evaporator communicates with absorption-generator. The waste heat medium pipe of the second evaporator communicates with the external. The hierarchy condensation third-type absorption heat pump is thereby formed.

7. The hierarchy condensation third-type absorption heat pump, in the hierarchy condensation third-type absorption heat pump of claim 5, further comprises a third absorber. The dilute solution pipe of the first generator communicates with the third absorber via the first solution heat exchanger. The dilute solution pipe of the third absorber communicates with absorption-generator. Evaporator adds the refrigerant vapor channel communicated with the third absorber. The heated medium pipe of the third absorber communicates with the external. The hierarchy condensation third-type absorption heat pump is thereby formed.

8. The hierarchy condensation third-type absorption heat pump, in the hierarchy condensation third-type absorption heat pump of claim 6, further comprises a third absorber. The dilute solution pipe of the first generator communicates with the third absorber via the first solution heat exchanger. The dilute solution pipe of the third absorber communicates with absorption-generator. The second evaporator adds the refrigerant vapor channel communicated with the third absorber. The heated medium pipe of the third absorber communicates with the external. The hierarchy condensation third-type absorption heat pump is thereby formed.

9. The hierarchy condensation third-type absorption heat pump, in the hierarchy condensation third-type absorption heat pump of claim 1, further comprises a third generator, a third absorber, a third solution heat exchanger and a fourth solution pump. The dilute solution pipe of absorption-generator communicates with the third absorber via the first solution pump and the third solution heat exchanger. The dilute solution pipe of the third absorber communicates with the first generator via the fourth solution pump and the second solution heat exchanger. The concentrated solution pipe of the first generator communicates with the third generator via the second solution heat exchanger. The concentrated solution pipe of the third generator communicates with the steam distributing chamber via the third solution heat exchanger and absorption-generator. The refrigerant vapor channel of the third generator communicates with the third absorber. The thermal driving medium pipe of the third generator communicates with the external. The heated medium pipe of the third absorber communicates with the external. The hierarchy condensation third-type absorption heat pump is thereby formed.

10. The hierarchy condensation third-type absorption heat pump, in the hierarchy condensation third-type absorption heat pump of claim 2, further comprises a third generator, a third absorber, a fourth solution heat exchanger and a fourth solution pump. The dilute solution pipe of absorption-generator communicates with the third absorber via the first solution pump and the fourth solution heat exchanger. The dilute solution pipe of the third absorber communicates with the first generator via the fourth solution pump and the second solution heat exchanger. The concentrated solution pipe of the first generator communicates with the third generator via the second solution heat exchanger. The concentrated solution pipe of the third generator communicates with the steam distributing chamber via the fourth solution heat exchanger and absorption-generator. The refrigerant vapor channel of the third generator communicates with the third absorber. The thermal driving medium pipe of the third generator communicates with the external. The heated medium pipe of the third absorber communicates with the external. The hierarchy condensation third-type absorption heat pump is thereby formed.

11. The hierarchy condensation third-type absorption heat pump, in the hierarchy condensation third-type absorption heat pump of claim 5, further comprises a third generator, a third absorber, a third solution heat exchanger and a fourth solution pump. The dilute solution pipe of absorption-generator communicates with the third absorber via the first solution pump and the third solution heat exchanger. The dilute solution pipe of the third absorber communicates with the first generator via the fourth solution pump and the second solution heat exchanger. The concentrated solution pipe of the first generator communicates with the third generator via the second solution heat exchanger. The concentrated solution pipe of the third generator communicates with absorption-generator via the third solution heat exchanger. The refrigerant vapor channel of the third generator communicates with the third absorber. The thermal driving medium pipe of the third generator communicates with the external. The heated medium pipe of the third absorber communicates with the external. The hierarchy condensation third-type absorption heat pump is thereby formed.

12. The hierarchy condensation third-type absorption heat pump, in the hierarchy condensation third-type absorption heat pump of claim 6, further comprises a third generator, a third absorber, a fourth solution heat exchanger and a fourth solution pump. The dilute solution pipe of absorption-generator communicates with the third absorber via the first solution pump and the fourth solution heat exchanger. The dilute solution pipe of the third absorber communicates with the first generator via the fourth solution pump and the second solution heat exchanger. The concentrated solution pipe of the first generator communicates with the third generator via the second solution heat exchanger. The concentrated solution pipe of the third generator communicates with absorption-generator via the fourth solution heat exchanger. The refrigerant vapor channel of the third generator communicates with the third absorber. The thermal driving medium pipe of the third generator communicates with the external. The heated medium pipe of the third absorber communicates with the external. The hierarchy condensation third-type absorption heat pump is thereby formed.

13. The hierarchy condensation third-type absorption heat pump, in the hierarchy condensation third-type absorption heat pump of claim 6, further comprises a third generator, a third absorber, a third solution heat exchanger, a fourth solution heat exchanger and a fourth solution pump. The concentrated solution pipe of the steam distributing chamber communicates with the third generator via the second solution pump and the third solution heat exchanger. The concentrated solution pipe of the third generator communicates with the first absorber via the fourth solution heat exchanger. The dilute solution pipe of the first absorber communicates with the third absorber via the fourth solution pump and the fourth solution heat exchanger. The dilute solution pipe of the third absorber communicates with absorption-generator via the third solution heat exchanger. The refrigerant vapor channel of the third generator communicates with the third absorber. The thermal driving medium pipe of the third generator communicates with the external. The heated medium pipe of the third absorber communicates with the external. The hierarchy condensation third-type absorption heat pump is thereby formed.

14. The hierarchy condensation third-type absorption heat pump, in the hierarchy condensation third-type absorption heat pump of claim 2, further comprises a third generator, a third absorber, a fourth solution heat exchanger and a fourth solution pump. The concentrated solution pipe of the steam distributing chamber communicates with the third generator via the second solution pump and the third solution heat exchanger. The concentrated solution pipe of the third generator communicates with the first absorber via the fourth solution heat exchanger. The dilute solution pipe of the first absorber communicates with the third absorber via the fourth solution pump and the fourth solution heat exchanger. The dilute solution pipe of the third absorber communicates with absorption-generator via the third solution heat exchanger. The refrigerant vapor channel of the third generator communicates with the third absorber. The thermal driving medium pipe of the third generator communicates with the external. The heated medium pipe of the third absorber communicates with the external. The hierarchy condensation third-type absorption heat pump is thereby formed.

15. The hierarchy condensation third-type absorption heat pump, in the hierarchy condensation third-type absorption heat pump of claim 6, further comprises a third generator, a third absorber, a third solution heat exchanger, a fourth solution heat exchanger and a fourth solution pump and cancelling the solution throttle. The concentrated solution pipe of the steam distributing chamber communicates with the third generator via the second solution pump and the third solution heat exchanger. The concentrated solution pipe of the third generator communicates with the first absorber via the fourth solution heat exchanger. The dilute solution pipe of the first absorber communicates with the third absorber via the fourth solution pump and the fourth solution heat exchanger. The dilute solution pipe of the third absorber communicates with the steam distributing chamber via the third solution heat exchanger and absorption-generator. The refrigerant vapor channel of the third generator communicates with the third absorber. The thermal driving medium pipe of the third generator communicates with the external. The heated medium pipe of the third absorber communicates with the external. The hierarchy condensation third-type absorption heat pump is thereby formed.

16. The hierarchy condensation third-type absorption heat pump, in the hierarchy condensation third-type absorption heat pump of claim 6, further comprises a third generator, a third absorber, a fourth solution heat exchanger and a fourth solution pump. The concentrated solution pipe of the steam distributing chamber communicates with the third generator via the second solution pump and the third solution heat exchanger. The concentrated solution pipe of the third generator communicates with the first absorber via the fourth solution heat exchanger. The dilute solution pipe of the first absorber communicates with the third absorber via the fourth solution pump and the fourth solution heat exchanger. The dilute solution pipe of the third absorber communicates with the steam distributing chamber via the third solution heat exchanger and absorption-generator. The refrigerant vapor channel of the third generator communicates with the third absorber. The thermal driving medium pipe of the third generator communicates with the external. The heated medium pipe of the third absorber communicates with the external. The hierarchy condensation third-type absorption heat pump is thereby formed.

17. The hierarchy condensation third-type absorption heat pump, in the hierarchy condensation third-type absorption heat pump of claim 6, further comprises a third generator, a third absorber, a third solution heat exchanger, a fourth solution heat exchanger and a fourth solution pump and cancelling the solution throttle. The concentrated solution pipe of the steam distributing chamber communicates with the third generator via the third solution heat exchanger. The concentrated solution pipe of the third generator communicates with the first absorber via the second solution pump and the fourth solution heat exchanger. The dilute solution pipe of the first absorber communicates with the third absorber via the fourth solution heat exchanger. The dilute solution pipe of the third absorber communicates with absorption-generator via the fourth solution pump and the third solution heat exchanger. The refrigerant vapor channel of the third generator communicates with the third absorber. The thermal driving medium pipe of the third generator communicates with the external. The heated medium pipe of the third absorber communicates with the external. The hierarchy condensation third-type absorption heat pump is thereby formed.

18. The hierarchy condensation third-type absorption heat pump, in the hierarchy condensation third-type absorption heat pump of claim 2, further comprises a third generator, a third absorber, a fourth solution heat exchanger and a fourth solution pump. The concentrated solution pipe of the steam distributing chamber communicates with the third generator via the third solution heat exchanger. The concentrated solution pipe of the third generator communicates with the first absorber via the second solution pump and the fourth solution heat exchanger. The dilute solution pipe of the first absorber communicates with the third absorber via the fourth solution heat exchanger. The dilute solution pipe of the third absorber communicates with absorption-generator via the fourth solution pump and the third solution heat exchanger. The refrigerant vapor channel of the third generator communicates with the third absorber. The thermal driving medium pipe of the third generator communicates with the external. The heated medium pipe of the third absorber communicates with the external. The hierarchy condensation third-type absorption heat pump is thereby formed.

19. The hierarchy condensation third-type absorption heat pump, in the hierarchy condensation third-type absorption heat pump of claim 5, further comprises a third generator, a third absorber, a third solution heat exchanger, a fourth solution heat exchanger and a fourth solution pump and cancelling the solution throttle. The concentrated solution pipe of the steam distributing chamber communicates with the third generator via the third solution heat exchanger. The concentrated solution pipe of the third generator communicates with the first absorber via the second solution pump and the fourth solution heat exchanger. The dilute solution pipe of the first absorber communicates with the third absorber via the fourth solution heat exchanger. The dilute solution pipe of the third absorber communicates with the steam distributing chamber via the fourth solution pump, the third solution heat exchanger and absorption-generator. The refrigerant vapor channel of the third generator communicates with the third absorber. The thermal driving medium pipe of the third generator communicates with the external. The heated medium pipe of the third absorber communicates with the external. The hierarchy condensation third-type absorption heat pump is thereby formed.

20. The hierarchy condensation third-type absorption heat pump, in the hierarchy condensation third-type absorption heat pump of claim 6, further comprises a third generator, a third absorber, a fourth solution heat exchanger and a fourth solution pump. The concentrated solution pipe of the steam distributing chamber communicates with the third generator via the third solution heat exchanger. The concentrated solution pipe of the third generator communicates with the first absorber via the second solution pump and the fourth solution heat exchanger. The dilute solution pipe of the first absorber communicates with the third absorber via the fourth solution heat exchanger. The dilute solution pipe of the third absorber communicates with the steam distributing chamber via the fourth solution pump, the third solution heat exchanger and absorption-generator. The refrigerant vapor channel of the third generator communicates with the third absorber. The thermal driving medium pipe of the third generator communicates with the external. The heated medium pipe of the third absorber communicates with the external. The hierarchy condensation third-type absorption heat pump is thereby formed.

21. The hierarchy condensation third-type absorption heat pump, in any one of the hierarchy condensation third-type absorption heat pump of claim 1-4, 13-14, 17-18, further comprises a new added generator, a new added throttle valve and a new added solution heat exchanger. The dilute solution pipe of the first solution pump communicates with the new added generator via the new added solution heat exchanger. The concentrated solution pipe of the new added generator communicates with the steam distributing chamber via the new added solution heat exchanger and absorption-generator. The refrigerant liquid pipe of the new added generator communicates with the first condenser via the new added throttle valve after that the refrigerant vapor channel of the first generator communicates with the new added generator. The refrigerant vapor channel of the new added generator communicates with the first condenser. The hierarchy condensation third-type absorption heat pump is thereby formed.

22. The hierarchy condensation third-type absorption heat pump, in any one of the hierarchy condensation third-type absorption heat pump of claim 1-4, 13-14, 17-18, further comprises a new added generator, a new added throttle valve and a new added solution heat exchanger. The dilute solution pipe of the first solution pump communicates with the first generator via the first solution heat exchanger and the new added solution heat exchanger. The concentrated solution pipe of the first generator communicates with the new added generator via the new added solution heat exchanger. The concentrated solution pipe of the new added generator communicates with the steam distributing chamber via the first solution heat exchanger and absorption-generator. The refrigerant liquid pipe of the new added generator communicates with the first condenser via the new added throttle valve after that the refrigerant vapor channel of the first generator communicates with the new added generator. The refrigerant vapor channel of the new added generator communicates with the first condenser. The hierarchy condensation third-type absorption heat pump is thereby formed.

23. The hierarchy condensation third-type absorption heat pump, in any one of the hierarchy condensation third-type absorption heat pump of claim 1-4, 13-14, 17-18, further comprises a new added generator, a new added throttle, a new added solution heat exchanger and a new added solution pump. The dilute solution pipe of the first solution pump communicates with the new added generator via the first solution heat exchanger. The concentrated solution pipe of the new added generator communicates with the first generator via the new added solution pump and the new added solution heat exchanger. The concentrated solution pipe of the first generator communicates with the steam distributing chamber via the new added solution heat exchanger, the first solution heat exchanger and absorption-generator. The refrigerant liquid pipe of the new added generator communicates with the first condenser via the new added throttle valve after that the refrigerant vapor channel of the first generator communicates with the new added generator. The refrigerant vapor channel of the new added generator communicates with the first condenser. The hierarchy condensation third-type absorption heat pump is thereby formed.

24. The hierarchy condensation third-type absorption heat pump, in any one of the hierarchy condensation third-type absorption heat pump of claim 5-6, 15-16, 19-20, further comprises a new added generator, a new added throttle valve and a new added solution heat exchanger. The dilute solution pipe of the first solution pump communicates with the new added generator via the new added solution heat exchanger. The concentrated solution pipe of the new added generator communicates with absorption-generator via the new added solution heat exchanger. The refrigerant liquid pipe of the new added generator communicates with the first condenser via the new added throttle valve after that the refrigerant vapor channel of the first generator communicates with the new added generator. The refrigerant vapor channel of the new added generator communicates with the first condenser. The hierarchy condensation third-type absorption heat pump is thereby formed.

25. The hierarchy condensation third-type absorption heat pump, in any one of the hierarchy condensation third-type absorption heat pump of claim 5-6, 15-16, 19-20, further comprises a new added generator, a new added throttle valve and a new added solution heat exchanger. The dilute solution pipe of the first solution pump communicates with the first generator via the first solution heat exchanger and the new added solution heat exchanger. The concentrated solution pipe of the first generator communicates with the new added generator via the new added solution heat exchanger. The concentrated solution pipe of the new added generator communicates with absorption-generator via the first solution heat exchanger. The refrigerant liquid pipe of the new added generator communicates with the first condenser via the new added throttle valve after that the refrigerant vapor channel of the first generator communicates with the new added generator. The refrigerant vapor channel of the new added generator communicates with the first condenser. The hierarchy condensation third-type absorption heat pump is thereby formed.

26. The hierarchy condensation third-type absorption heat pump, in any one of the hierarchy condensation third-type absorption heat pump of claim 5-6, 15-16, 19-20, further comprises a new added generator, a new added throttle, a new added solution heat exchanger and a new added solution pump. The dilute solution pipe of the first solution pump communicates with the new added generator via the first solution heat exchanger. The concentrated solution pipe of the new added generator communicates with the first generator via the new added solution pump and the new added solution heat exchanger. The concentrated solution pipe of the first generator communicates with absorption-generator via the new added solution heat exchanger and the first solution heat exchanger. The refrigerant liquid pipe of the new added generator communicates with the first condenser via the new added throttle valve after that the refrigerant vapor channel of the first generator communicates with the new added generator. The refrigerant vapor channel of the new added generator communicates with the first condenser. The hierarchy condensation third-type absorption heat pump is thereby formed.

27. The hierarchy condensation third-type absorption heat pump, in any one of the hierarchy condensation third-type absorption heat pump of claim 7-8, further comprises a new added generator, a new added throttle valve and a new added solution heat exchanger. The dilute solution pipe of the first solution pump communicates with the new added generator via the new added solution heat exchanger. The concentrated solution pipe of the new added generator communicates with the third absorber via the new added solution heat exchanger. The refrigerant liquid pipe of the new added generator communicates with the first condenser via the new added throttle valve after that the refrigerant vapor channel of the first generator communicates with the new added generator. The refrigerant vapor channel of the new added generator communicates with the first condenser. The hierarchy condensation third-type absorption heat pump is thereby formed.

28. The hierarchy condensation third-type absorption heat pump, in any one of the hierarchy condensation third-type absorption heat pump of claim 7-8, further comprises a new added generator, a new added throttle valve and a new added solution heat exchanger. The dilute solution pipe of the first solution pump communicates with the first generator via the first solution heat exchanger and the new added solution heat exchanger. The concentrated solution pipe of the first generator communicates with the new added generator via the new added solution heat exchanger. The concentrated solution pipe of the new added generator communicates with the third absorber via the first solution heat exchanger. The refrigerant liquid pipe of the new added generator communicates with the first condenser via the new added throttle valve after that the refrigerant vapor channel of the first generator communicates with the new added generator. The refrigerant vapor channel of the new added generator communicates with the first condenser. The hierarchy condensation third-type absorption heat pump is thereby formed.

29. The hierarchy condensation third-type absorption heat pump, in any one of the hierarchy condensation third-type absorption heat pump of claim 7-8, further comprises a new added generator, a new added throttle, a new added solution heat exchanger and a new added solution pump. The dilute solution pipe of the first solution pump communicates with the new added generator via the first solution heat exchanger. The concentrated solution pipe of the new added generator communicates with the first generator via the new added solution pump and the new added solution heat exchanger. The concentrated solution pipe of the first generator communicates with the third absorber via the new added solution heat exchanger and the first solution heat exchanger. The refrigerant liquid pipe of the new added generator communicates with the first condenser via the new added throttle valve after that the refrigerant vapor channel of the first generator communicates with the new added generator. The refrigerant vapor channel of the new added generator communicates with the first condenser. The hierarchy condensation third-type absorption heat pump is thereby formed.

30. The hierarchy condensation third-type absorption heat pump, in any one of the hierarchy condensation third-type absorption heat pump of claim 9-12, further comprises a new added generator, a new added throttle valve and a new added solution heat exchanger. The dilute solution pipe of the fourth solution pump communicates with the new added generator via the new added solution heat exchanger. The concentrated solution pipe of the new added generator communicates with the third generator via the new added solution heat exchanger. The refrigerant liquid pipe of the new added generator communicates with the first condenser via the new added throttle valve after that the refrigerant vapor channel of the first generator communicates with the new added generator. The refrigerant vapor channel of the new added generator communicates with the first condenser. The hierarchy condensation third-type absorption heat pump is thereby formed.

31. The hierarchy condensation third-type absorption heat pump, in any one of the hierarchy condensation third-type absorption heat pump of claim 9-12, further comprises a new added generator, a new added throttle valve and a new added solution heat exchanger. The dilute solution pipe of the fourth solution pump communicates with the first generator via the second solution heat exchanger and the new added solution heat exchanger. The concentrated solution pipe of the first generator communicates with the new added generator via the new added solution heat exchanger. The concentrated solution pipe of the new added generator communicates with the third generator via the second solution heat exchanger. The refrigerant liquid pipe of the new added generator communicates with the first condenser via the new added throttle valve after that the refrigerant vapor channel of the first generator communicates with the new added generator. The refrigerant vapor channel of the new added generator communicates with the first condenser. The hierarchy condensation third-type absorption heat pump is thereby formed.

32. The hierarchy condensation third-type absorption heat pump, in any one of the hierarchy condensation third-type absorption heat pump of claim 9-12, further comprises a new added generator, a new added throttle, a new added solution heat exchanger and a new added solution pump. The dilute solution pipe of the fourth solution pump communicates with the new added generator via the first solution heat exchanger. The concentrated solution pipe of the new added generator communicates with the first generator via the new added solution pump and the new added solution heat exchanger. The concentrated solution pipe of the first generator communicates with the third generator via the new added solution heat exchanger and the first solution heat exchanger. The refrigerant liquid pipe of the new added generator communicates with the first condenser via the new added throttle valve after that the refrigerant vapor channel of the first generator communicates with the new added generator. The refrigerant vapor channel of the new added generator communicates with the first condenser. The hierarchy condensation third-type absorption heat pump is thereby formed.

33. The hierarchy condensation third-type absorption heat pump, in any one of the hierarchy condensation third-type absorption heat pump of claim 1-20, further comprises a new added generator, a new added absorber, a new added solution heat exchanger and a new added solution pump. The refrigerant vapor channel of the first generator communicates with the new added absorber. The dilute solution pipe of the new added absorber communicates with the new added generator via the new added solution pump and the new added solution heat exchanger. The concentrated solution pipe of the new added generator communicates with the new added absorber via the new added solution heat exchanger. The refrigerant vapor channel of the new added generator communicates with the first condenser. The thermal driving medium pipe of the new added generator communicates with the external. The heated medium pipe of the new added generator communicates with the external. The hierarchy condensation third-type absorption heat pump is thereby formed.

34. The hierarchy condensation third-type absorption heat pump, in any one of the hierarchy condensation third-type absorption heat pump of claim 1-20, further comprises a new added generator, a new added absorber, a new added solution heat exchanger, a new added solution pump, a new added condenser and a new added throttle. The refrigerant vapor channel of the first generator communicates with the new added absorber. The dilute solution pipe of the new added absorber communicates with the new added generator via the new added solution pump and the new added solution heat exchanger. The concentrated solution pipe of the new added generator communicates with the new added absorber via the new added solution heat exchanger. The refrigerant vapor channel of the new added generator communicates with the new added condenser. The refrigerant liquid pipe of the new added condenser communicates with the first condenser via the new added throttle. The thermal driving medium pipe of the new added generator communicates with the external. The heated medium pipe of the new added absorber and the new added condenser communicates with the external. The hierarchy condensation third-type absorption heat pump is thereby formed.

35. The hierarchy condensation third-type absorption heat pump, in any one of the hierarchy condensation third-type absorption heat pump of claim 33, further comprises a new added throttle valve and cancelling the heated medium pipe of the first absorber communicated with the external. The refrigerant liquid pipe of the first condenser communicates with the first absorber via the new added throttle valve after that the refrigerant vapor channel of the first absorber communicates with the new added absorber. The hierarchy condensation third-type absorption heat pump is thereby formed.

36. The hierarchy condensation third-type absorption heat pump, in any one of the hierarchy condensation third-type absorption heat pump of claim 1, 9, further comprises a new added refrigerant liquid pump or a new added throttle, a new added solution heat exchanger and a new added absorption-generator. The concentrated solution pipe of the steam distributing chamber communicates with the first absorber via the second solution pump and the new added solution heat exchanger. The dilute solution pipe of the first absorber communicates with the new added absorption-generator via the new added solution heat exchanger. The dilute solution pipe of the new added absorption-generator communicates with absorption-generator. The refrigerant vapor channel of evaporator communicates with the new added absorption-generator. The refrigerant liquid pipe of evaporator communicates with the new added absorption-generator via the new added refrigerant liquid pump after that the refrigerant vapor channel of the new added absorption-generator communicates with the first absorber. Or the refrigerant liquid pipe of the first condenser communicates with the new added absorption-generator via the new added throttle valve after that the refrigerant vapor channel of the new added absorption-generator communicates with the first absorber. The hierarchy condensation third-type absorption heat pump is thereby formed.

37. The hierarchy condensation third-type absorption heat pump, in any one of the hierarchy condensation third-type absorption heat pump of claim 1, 9, further comprises a new added refrigerant liquid pump or a new added throttle, a new added solution heat exchanger, a new added absorption-generator and a new added solution pump. The concentrated solution pipe of the steam distributing chamber communicates with the new added absorption-generator via the second solution pump. The dilute solution pipe of the new added absorption-generator communicates with the first absorber via the new added solution pump and the new added solution heat exchanger. The dilute solution pipe of the first absorber communicates with absorption-generator via the new added solution heat exchanger. The refrigerant vapor channel of evaporator communicates with the new added absorption-generator. The refrigerant liquid pipe of evaporator communicates with the new added absorption-generator via the new added refrigerant liquid pump after that the refrigerant vapor channel of the new added absorption-generator communicates with the first absorber. Or the refrigerant liquid pipe of the first condenser communicates with the new added absorption-generator via the new added throttle valve after that the refrigerant vapor channel of the new added absorption-generator communicates with the first absorber. The hierarchy condensation third-type absorption heat pump is thereby formed.

38. The hierarchy condensation third-type absorption heat pump, in any one of the hierarchy condensation third-type absorption heat pump of claim 2, 10, further comprises a new added refrigerant liquid pump or a new added throttle, a new added solution heat exchanger and a new added absorption-generator. The concentrated solution pipe of the steam distributing chamber communicates with the first absorber via the second solution pump, the third solution heat exchanger and the new added solution heat exchanger. The dilute solution pipe of the first absorber communicates with the new added absorption-generator via the new added solution heat exchanger. The dilute solution pipe of the new added absorption-generator communicates with absorption-generator via the third solution heat exchanger. The refrigerant vapor channel of evaporator communicates with the new added absorption-generator. The refrigerant liquid pipe of evaporator communicates with the new added absorption-generator via the new added refrigerant liquid pump after that the refrigerant vapor channel of the new added absorption-generator communicates with the first absorber. Or the refrigerant liquid pipe of the first condenser communicates with the new added absorption-generator via the new added throttle valve after that the refrigerant vapor channel of the new added absorption-generator communicates with the first absorber. The hierarchy condensation third-type absorption heat pump is thereby formed.

39. The hierarchy condensation third-type absorption heat pump, in any one of the hierarchy condensation third-type absorption heat pump of claim 2, 10, further comprises a new added refrigerant liquid pump or a new added throttle, a new added solution heat exchanger, a new added absorption-generator and a new added solution pump. The concentrated solution pipe of the steam distributing chamber communicates with the new added absorption-generator via the second solution pump and the third solution heat exchanger. The dilute solution pipe of the new added absorption-generator communicates with the first absorber via the new added solution pump and the new added solution heat exchanger. The dilute solution pipe of the first absorber communicates with absorption-generator via the new added solution heat exchanger and the third solution heat exchanger. The refrigerant vapor channel of evaporator communicates with the new added absorption-generator. The refrigerant liquid pipe of evaporator communicates with the new added absorption-generator via the new added refrigerant liquid pump after that the refrigerant vapor channel of the new added absorption-generator communicates with the first absorber. Or the refrigerant liquid pipe of the first condenser communicates with the new added absorption-generator via the new added throttle valve after that the refrigerant vapor channel of the new added absorption-generator communicates with the first absorber. The hierarchy condensation third-type absorption heat pump is thereby formed.

40. The hierarchy condensation third-type absorption heat pump, in any one of the hierarchy condensation third-type absorption heat pump of claim 5, 11, further comprises a new added refrigerant liquid pump or a new added throttle, a new added solution heat exchanger and a new added absorption-generator. The concentrated solution pipe of the steam distributing chamber communicates with the first absorber via the second solution pump and the new added solution heat exchanger. The dilute solution pipe of the first absorber communicates with the new added absorption-generator via the new added solution heat exchanger. The dilute solution pipe of the new added absorption-generator communicates with the steam distributing chamber via the solution throttle valve and absorption-generator. The refrigerant vapor channel of evaporator communicates with the new added absorption-generator. The refrigerant liquid pipe of evaporator communicates with the new added absorption-generator via the new added refrigerant liquid pump after that the refrigerant vapor channel of the new added absorption-generator communicates with the first absorber. Or the refrigerant liquid pipe of the first condenser communicates with the new added absorption-generator via the new added throttle valve after that the refrigerant vapor channel of the new added absorption-generator communicates with the first absorber. The hierarchy condensation third-type absorption heat pump is thereby formed.

41. The hierarchy condensation third-type absorption heat pump, in any one of the hierarchy condensation third-type absorption heat pump of claim 5, 11, further comprises a new added refrigerant liquid pump or a new added throttle, a new added solution heat exchanger, a new added absorption-generator and a new added solution pump and cancelling the solution throttle. The concentrated solution pipe of the steam distributing chamber communicates with the new added absorption-generator via the second solution pump. The dilute solution pipe of the new added absorption-generator communicates with the first absorber via the new added solution pump and the new added solution heat exchanger. The dilute solution pipe of the first absorber communicates with the steam distributing chamber via the second solution pump and absorption-generator. The refrigerant vapor channel of evaporator communicates with the new added absorption-generator. The refrigerant liquid pipe of evaporator communicates with the new added absorption-generator via the new added refrigerant liquid pump after that the refrigerant vapor channel of the new added absorption-generator communicates with the first absorber. Or the refrigerant liquid pipe of the first condenser communicates with the new added absorption-generator via the new added throttle valve after that the refrigerant vapor channel of the new added absorption-generator communicates with the first absorber. The hierarchy condensation third-type absorption heat pump is thereby formed.

42. The hierarchy condensation third-type absorption heat pump, in any one of the hierarchy condensation third-type absorption heat pump of claim 6, 12, further comprises a new added refrigerant liquid pump, a new added solution heat exchanger and a new added absorption-generator. The concentrated solution pipe of the steam distributing chamber communicates with the first absorber via the second solution pump, the third solution heat exchanger and the new added solution heat exchanger. The dilute solution pipe of the first absorber communicates with the new added absorption-generator via the new added solution heat exchanger. The dilute solution pipe of the new added absorption-generator communicates with the steam distributing chamber via the third solution heat exchanger and absorption-generator. The refrigerant vapor channel of evaporator communicates with the new added absorption-generator. The refrigerant liquid pipe of evaporator communicates with the new added absorption-generator via the new added refrigerant liquid pump after that the refrigerant vapor channel of the new added absorption-generator communicates with the first absorber. The hierarchy condensation third-type absorption heat pump is thereby formed.

43. The hierarchy condensation third-type absorption heat pump, in any one of the hierarchy condensation third-type absorption heat pump of claim 6, 12, further comprises a new added refrigerant liquid pump, a new added solution heat exchanger, a new added absorption-generator and a new added solution pump. The concentrated solution pipe of the steam distributing chamber communicates with the new added absorption-generator via the second solution pump and the third solution heat exchanger. The dilute solution pipe of the new added absorption-generator communicates with the first absorber via the new added solution pump and the new added solution heat exchanger. The dilute solution pipe of the first absorber communicates with the steam distributing chamber via the new added solution heat exchanger, the third solution heat exchanger and absorption-generator. The refrigerant vapor channel of evaporator communicates with the new added absorption-generator. The refrigerant liquid pipe of evaporator communicates with the new added absorption-generator via the new added refrigerant liquid pump after that the refrigerant vapor channel of the new added absorption-generator communicates with the first absorber. The hierarchy condensation third-type absorption heat pump is thereby formed.

44. The hierarchy condensation third-type absorption heat pump, in any one of the hierarchy condensation third-type absorption heat pump of claim 21-32, further comprises a new added condenser and a new added second throttle. The refrigerant vapor channel of the first generator communicates with the new added condenser. The refrigerant liquid pipe of the new added condenser communicates with the first condenser via the new added second throttle. The heated medium pipe of the new added condenser communicates with the external. The hierarchy condensation third-type absorption heat pump is thereby formed.

45. The hierarchy condensation third-type absorption heat pump, in any one of the hierarchy condensation third-type absorption heat pump of claim 21-32, further comprises a new added second generator, a new added absorber, a new added second solution heat exchanger, a new added second solution pump, a new added condenser and a new added second throttle. The refrigerant vapor channel of the new added generator communicates with the new added absorber. The dilute solution pipe of the new added absorber communicates with the new added second generator via the new added second solution pump and the new added second solution heat exchanger. The concentrated solution pipe of the new added second generator communicates with the new added absorber via the new added second solution heat exchanger. The refrigerant vapor channel of the new added second generator communicates with the new added condenser. The refrigerant liquid pipe of the new added condenser communicates with the first condenser via the new added second throttle. The thermal driving medium pipe of the new added second generator communicates with the external. The heated medium pipe of the new added absorber and the new added condenser communicates with the external. The hierarchy condensation third-type absorption heat pump is thereby formed.

46. The hierarchy condensation third-type absorption heat pump, in any one of the hierarchy condensation third-type absorption heat pump of claim 45, further comprises a new added third throttle valve and cancelling the thermal driving medium pipe of the new added second generator communicated with the external. The refrigerant liquid pipe of the new added second generator communicates with the new added condenser via the new added third throttle valve after that the refrigerant liquid pipe of the first generator communicates with the new added condenser. The hierarchy condensation third-type absorption heat pump is thereby formed.

47. The hierarchy condensation third-type absorption heat pump, in any one of the hierarchy condensation third-type absorption heat pump of claim 1-46, further comprises a third condenser and a second refrigerant liquid pump. The refrigerant vapor channel of the steam distributing chamber communicates with the third condenser. The refrigerant liquid pipe of the third condenser communicates with evaporator via the second refrigerant liquid pump. The cooling medium pipe of the third condenser communicates with the external. The hierarchy condensation third-type absorption heat pump is thereby formed.

48. The hierarchy condensation third-type absorption heat pump, in any one of the hierarchy condensation third-type absorption heat pump of claim 1-47, further comprises a re-added generator, a re-added absorber, a re-added solution heat exchanger and a re-added solution pump. The dilute solution pipe of the second absorber communicates with the re-added absorber via the third solution pump and the second solution heat exchanger. The dilute solution pipe of the re-added absorber communicates with the second generator via the re-added solution pump and the re-added solution heat exchanger. The concentrated solution pipe of the second generator communicates with the re-added generator via the re-added solution heat exchanger. The concentrated solution pipe of the re-added generator communicates with the second absorber via the second solution heat exchanger. The refrigerant vapor channel of the re-added generator communicates with the re-added absorber. The waste heat medium pipe of the re-added generator communicates with the external. The cooling medium pipe of the re-added absorber communicates with the external. The hierarchy condensation third-type absorption heat pump is thereby formed.

The invention is illustrated further by taking the hierarchy condensation third-type absorption heat pump shown in FIG. 1, FIG. 6 and FIG. 30 as example.

In FIG. 1, the refrigerant vapor produced by the steam distributing chamber 16 enters directly the second condenser 7 and is absorbed by the solution, and the solution releases heat to the cooling medium. The refrigerant vapor is released again and is provided for the second condenser 7 in the second generator 2 via the waste heat medium driving. The effects are achieved as following.

(1) The pressure of refrigerant vapor produced by the steam distributing chamber 16 is lower than the pressure of refrigerant vapor produced by the second generator 2. The solution concentration in the exit of the steam distributing chamber 16 increases. The solution temperature is improved by absorbing the refrigerant vapor in the first absorber 3. The waste heat medium temperature is promoted hierarchically.

(2) It is good for reducing the heat transfer temperature difference when the second absorber 4 and the second condenser 7 complete a part of the temperature drop process of waste heat in common.

(3) The waste heat is used respectively in the absorption-generator 5, the second generator 2 and evaporator 8. That is good for using deeply of the waste heat resources.

In FIG. 6, the high temperature generation process of solution is realized by the first generator 1 and the third generator 22. The regenerative process is realized by the third generator 22 and the third absorber 20. The effects are achieved as following.

(1) It is good for reducing the heat transfer temperature difference, reducing the irreversible heat transfer degree, using the high temperature thermal driving medium deeply and using different grade high temperature thermal driving mediums when the high temperature generation process of solution is realized hierarchically.

(2) The regenerative process is realized by the third generator 22 and the third absorber 20. Their heat load is adjustable. And the performance index of this kind of absorption heat pump is reasonable and sequential changes.

In FIG. 30, the low temperature generation process of solution is realized by the second generator 2 and the re-added generator M. The regenerative process is realized by the re-added generator M and the re-added absorber N. The effects are achieved as following.

(1) It is good for reducing the heat transfer temperature difference, reducing the irreversible heat transfer degree, using the high temperature thermal driving medium deeply and using different grade high temperature thermal driving mediums when the high temperature generation process of solution is realized hierarchically.

(2) The regenerative process is realized by the re-added generator M and the re-added absorber N. Their heat load is adjustable. And the performance index of this kind of absorption heat pump is reasonable and sequential changes.

Figure 1:
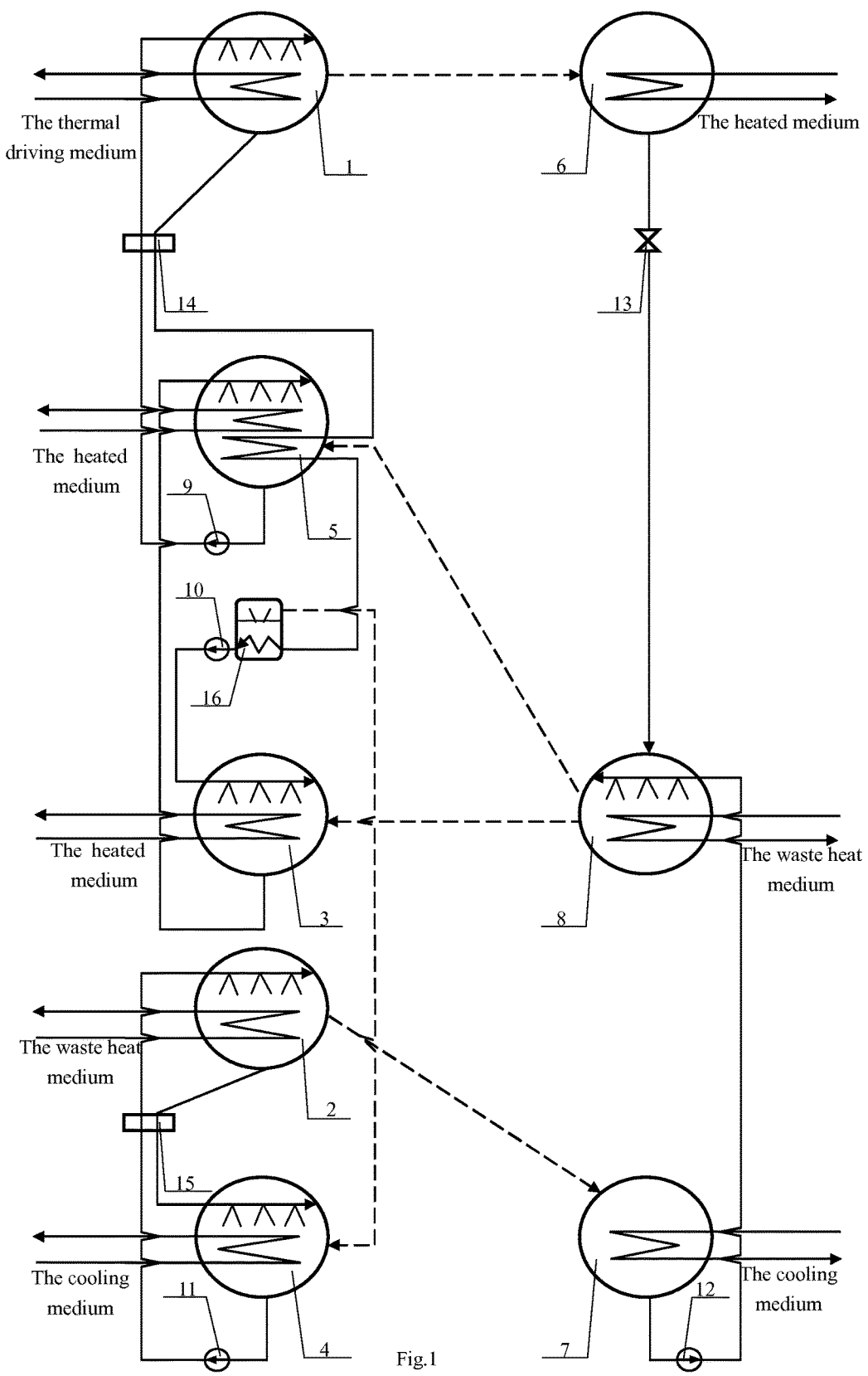
FIG. 1 is the first structure and flow diagram of the hierarchy condensation third-type absorption heat pump.

In the figures, 1—the first generator, 2—the second generator, 3—the first absorber, 4—the second absorber, 5—absorption-generator, 6—the first condenser, 7—the second condenser, 8—evaporator, 9—the first solution pump, 10—the second solution pump, 11—the third solution pump, 12—the refrigerant liquid pump, 13—throttle, 14—the first solution heat exchanger, 15—the second solution heat exchanger, 16—the steam distributing chamber, 17—the second evaporator, 18—the second throttle, 19—the third solution heat exchanger, 20—the third absorber, 21—the solution throttle, 22—the third generator, 23—the fourth solution pump, 24—the fourth solution heat exchanger, 25—the third condenser, 26—the second refrigerant liquid pump; A—the new added generator, B—the new added throttle, C—the new added solution heat exchanger, D—the new added solution pump, E—the new added absorber, F—the new added condenser, G—the new added second throttle, H—the new added absorption-evaporator, I—the new added refrigerant liquid pump, J—the new added second generator, K—the new added second solution heat exchanger, L—the new added second solution pump; M—the re-added generator, N—the re-added absorber, O—the re-added solution heat exchanger, P—the re-added solution pump.

DETAILED DESCRIPTION

The detailed description of the invention combined with the attached drawings and examples is as follows. If not necessary, I don't repeat the structures and process in stating the specific examples.

The hierarchy condensation third-type absorption heat pump in FIG. 1 can be realized in the following manner:

Structurally, it mainly comprises a first generator 1, a second generator 2, a first absorber 3, a second absorber 4, an absorption-generator 5, a first condenser 6, a second condenser 7, a evaporator 8, a first solution pump 9, a second solution pump 10, a third solution pump 11, a refrigerant liquid pump 12, a throttle valve 13, a first solution heat exchanger 14, a second solution heat exchanger 15 and a steam distributing chamber 16. The dilute solution pipe of the second absorber 4 communicates with the second generator 2 via the third solution pump 11 and the second solution heat exchanger 15. The concentrated solution pipe of the second generator 2 communicates with the second absorber 4 via the second solution heat exchanger 15. The refrigerant vapor channel of the second generator 2 communicates with the second condenser 7. The refrigerant liquid pipe of the second condenser 7 communicates with evaporator 8 via the refrigerant liquid pump 12. The refrigerant vapor channel of evaporator 8 communicates with the first absorber 3 and absorption-generator 5. The dilute solution pipe of the first absorber 3 communicates with absorption-generator 5. The dilute solution pipe of absorption-generator 5 communicates with the first generator 1 via the first solution pump 9 and the first solution heat exchanger 14. The concentrated solution pipe of the first generator 1 communicates with the steam distributing chamber 16 via the second solution heat exchanger 14 and absorption-generator 5. The concentrated solution pipe of the steam distributing chamber 16 communicates with the first absorber 3 via the second solution pump 10. The refrigerant vapor channel of the steam distributing chamber 16 communicates with the second absorber 4. The refrigerant vapor channel of the first generator 1 communicates with the first condenser 6. The refrigerant liquid pipe of the first condenser 6 communicates with evaporator 8 via the throttle valve 13. The thermal driving medium pipe of the first generator 1 communicates with the external. The waste heat medium pipes of the second generator 2 and the evaporator 8 respectively communicates with the external. The heated medium pipe of the first absorber 3 and the first condenser 6 communicates with the external. The cooling medium pipes of the second absorber 4 and the second absorber 7 respectively communicates with the external. The heated medium pipe of absorption-generator 5 communicates with the external.

Procedurally, the dilute solution of the second absorber 4 flows through the third solution pump 11 and the second solution heat exchanger 15 into the second generator 2. The waste heat medium flows through the second generator 2 in which it heats the solution flowed through 2 and the solution releases the refrigerant vapor provided for the second condenser 7. The concentrated solution of the second generator 2 flows through the second solution heat exchanger 15 into the second absorber 4 in which it absorbs the refrigerant vapor and releases heat to the cooling medium. The refrigerant vapor of the second absorber 7 releases heat to the cooling medium and becomes the refrigerant liquid. The refrigerant liquid of the second absorber 7 flows through the second refrigerant liquid pump 12 into evaporator 8. The dilute solution of the first absorber 3 into absorption-generator 5 in which it absorbs the refrigerant vapor and releases heat to the heated medium and the solution flowed through 5. The dilute solution of absorption-generator 5 flows through the first solution pump 9 and the first solution heat exchanger 14 into the first generator 1. The thermal driving medium flows through the first generator 1 in which it heat the solution flowed through 1 and the solution releases the refrigerant vapor provided for the first condenser 6. The concentrated solution of the first generator 1 flows through the second solution heat exchanger 14 into absorption-generator 5 in which it absorbs heat partial vaporization and enters the steam distributing chamber 16. The refrigerant vapor of the steam distributing chamber 16 is provided for the second absorber 4. The concentrated solution of the steam distributing chamber 16 flows through the second solution pump 10 into the first absorber 3 in which it absorbs the refrigerant vapor and releases heat to the cooling medium. The refrigerant vapor of the first condenser 6 releases heat to the heated medium and becomes the refrigerant liquid. The refrigerant liquid of the first condenser 6 flows through throttle valve 13 into evaporator 8. The waste heat medium flows through evaporator 8 in which it heats the refrigerant liquid flowed through 8 and becomes the refrigerant vapor provided for the first absorber 3 and absorption-generator 5. The hierarchy condensation third-type absorption heat pump is thereby formed.

The hierarchy condensation third-type absorption heat pump in FIG. 2 can be realized in the following manner:

Structurally, in the hierarchy condensation third-type absorption heat pump shown in FIG. 1, it further adds with a second evaporator 17, a second throttle valve 18 and a third solution heat exchanger 19. The concentrated solution pipe of the steam distributing chamber 16 communicates with the second generator 2 via the second solution pump 10 and the third solution heat exchanger 19. The dilute solution pipe of the first absorber 3 communicates with absorption-generator 5 via the third solution heat exchanger 19. The refrigerant vapor channel of evaporator 8 communicated with absorption-generator 5 is cancelled. Evaporator 8 adds the refrigerant liquid pipe communicated with the second evaporator 17 via the second throttle valve 18. The refrigerant vapor channel of the second evaporator 17 communicates with absorption-generator 5. The waste heat medium pipe of the second evaporator 17 communicates with the external.

Procedurally, the dilute solution of the first absorber 3 flows through the third solution heat exchanger 19 into absorption-generator 5 in which it absorbs the refrigerant vapor and releases heat to the heated medium and the solution flowed through 5. The concentrated solution of the steam distributing chamber 16 flows through the second solution pump 10 and the third solution heat exchanger 19 into the first absorber 3 in which it absorbs the refrigerant vapor and releases heat to the heated medium. The refrigerant liquid of evaporator 8 is divided in two. The first of the refrigerant liquid absorbs waste heat and becomes the refrigerant vapor provided for the first absorber 3. The second of the refrigerant liquid flows through the second throttle valve 18 into the second evaporator 17 in which it absorbs waste heat and becomes the refrigerant vapor provided for absorption-generator 5. The hierarchy condensation third-type absorption heat pump is thereby formed.

Figure 3:
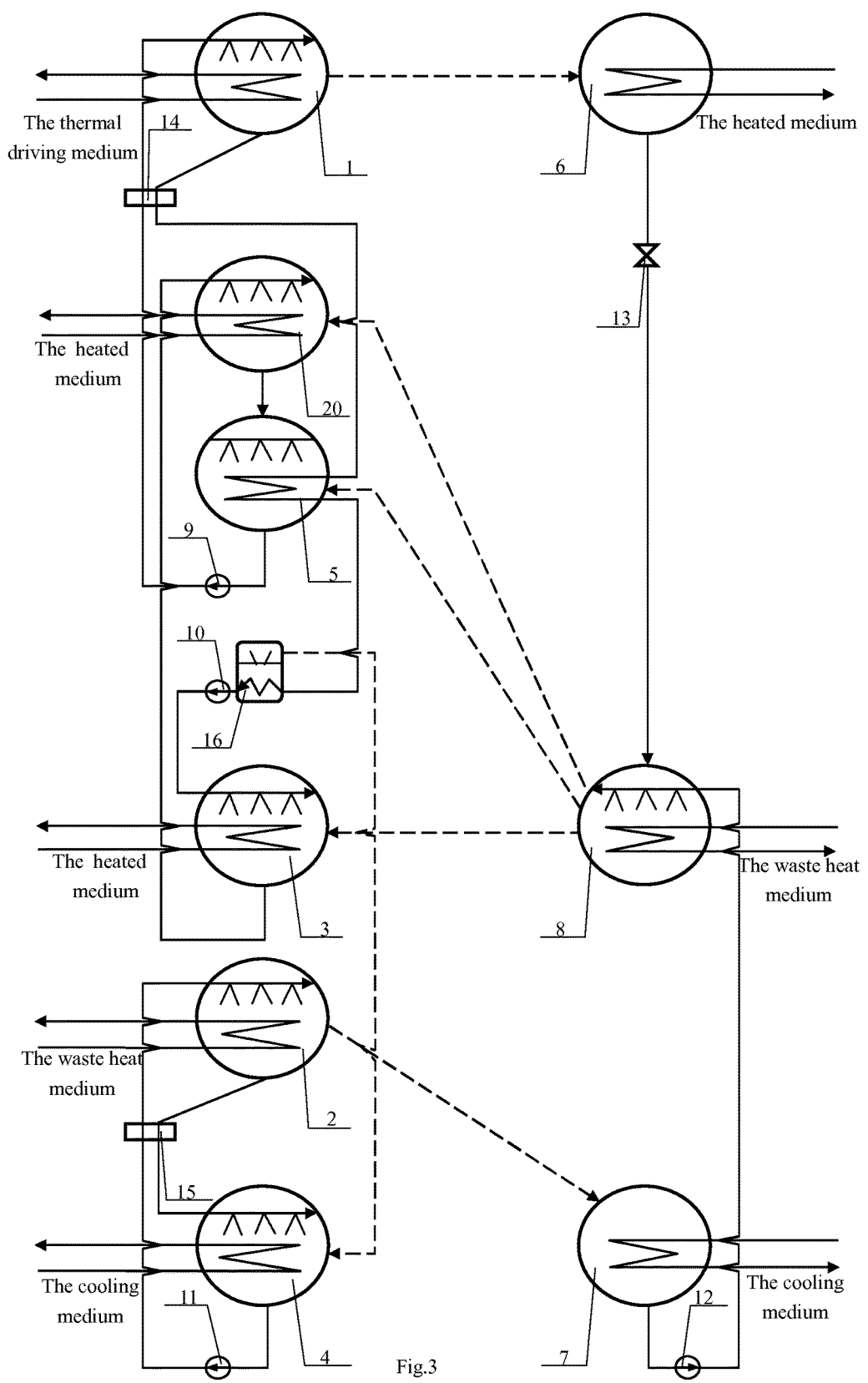
FIG. 3 is the third structure and flow diagram of the hierarchy condensation third-type absorption heat pump.

The hierarchy condensation third-type absorption heat pump in FIG. 3 can be realized in the following manner:

Structurally, in the hierarchy condensation third-type absorption heat pump shown in FIG. 1, it further adds with a third absorber 20 and a heated medium pipe of absorption-generator 5 communicated with the external is cancelled. The dilute solution pipe of the first absorber 3 communicates with the third absorber 20. The dilute solution pipe of the third absorber 20 communicates with absorption-generator 5. Evaporator 8 adds the refrigerant vapor channel communicated with the third absorber 20. The heated medium pipe of the third absorber 20 communicates with the external.

Procedurally, the dilute solution of the first absorber 3 enters the third absorber 20 in which it absorbs the refrigerant vapor and releases heat to the heated medium. The dilute solution of the third absorber 20 enters absorption-generator 5 in which it absorbs the refrigerant vapor and releases heat to absorption-generator 5. The refrigerant liquid of evaporator 8 absorbs waste heat and becomes the refrigerant vapor provided for the first absorber 3, absorption-generator 5 and the third absorber 20. The hierarchy condensation third-type absorption heat pump is thereby formed.

The hierarchy condensation third-type absorption heat pump in FIG. 4 can be realized in the following manner:

Structurally, it mainly comprises a first generator 1, a second generator 2, a first absorber 3, a second absorber 4, an absorption-generator 5, a first condenser 6, a second condenser 7, an evaporator 8, a first solution pump 9, a second solution pump 10, a third solution pump 11, a refrigerant liquid pump 12, a throttle valve 13, a first solution heat exchanger 14, a second solution heat exchanger 15, a steam distributing chamber 16 and a solution throttle valve 21. The dilute solution pipe of the second absorber 4 communicates with the second generator 2 via the third solution pump 11 and the second solution heat exchanger 15. The concentrated solution pipe of the second generator 2 communicates with the second absorber 4 via the second solution heat exchanger 15. The refrigerant vapor channel of the second generator 2 communicates with the second condenser 7. The refrigerant liquid pipe of the second condenser 7 communicates with evaporator 8 via the refrigerant liquid pump 12. The refrigerant vapor channel of evaporator 8 communicates with the first absorber 3 and absorption-generator 5. The dilute solution pipe of the first absorber 3 communicates with the steam distributing chamber 16 via the solution throttle valve 21 and absorption-generator 5. The concentrated solution pipe of the steam distributing chamber 16 communicates with the first absorber 3 via the second solution pump 10. The refrigerant vapor channel of the steam distributing chamber 16 communicates with the second absorber 4. The dilute solution pipe of absorption-generator 5 communicates with the first generator 1 via the first solution pump 9 and the first solution heat exchanger 14. The concentrated solution pipe of the first generator 1 communicates with absorption-generator 5 via the second solution heat exchanger 14. The refrigerant vapor channel of the first generator 1 communicates with the first condenser 6. The refrigerant liquid pipe of the first condenser 6 communicates with evaporator 8 via the throttle valve 13. The thermal driving medium pipe of the first generator 1 communicates with the external. The waste heat medium pipes of the second generator 2 and the evaporator 8 respectively communicates with the external. The heated medium pipe of the first absorber 3 and the first condenser 6 communicates with the external. The cooling medium pipes of the second absorber 4 and the second absorber 7 respectively communicates with the external. The heated medium pipe of absorption-generator 5 communicates with the external.

Procedurally, the dilute solution of the second absorber 4 flows through the third solution pump 11 and the second solution heat exchanger 15 into the second generator 2. The waste heat medium flows through the second generator 2 in which it heats the solution flowed through 2 and the solution releases the refrigerant vapor provided for the second condenser 7. The concentrated solution of the second generator 2 flows through the second solution heat exchanger 15 into the second absorber 4 in which it absorbs the refrigerant vapor and releases heat to the cooling medium. The refrigerant vapor of the second absorber 7 releases heat to the cooling medium and becomes the refrigerant liquid. The refrigerant liquid of the second absorber 7 flows through the second refrigerant liquid pump 12 into evaporator 8. The dilute solution of the first absorber 3 flows through the solution throttle valve 21 into absorption-generator 5 in which it absorbs heat partial vaporization and enters the steam distributing chamber 16. The refrigerant vapor of the steam distributing chamber 16 is provided for the second absorber 4. The concentrated solution of the steam distributing chamber 16 flows through the second solution pump 10 into the first absorber 3 in which it absorbs the refrigerant vapor and releases heat to the cooling medium. The dilute solution of absorption-generator 5 flows through the first solution pump 9 and the first solution heat exchanger 14 into the first generator 1. The thermal driving medium flows through the first generator 1 in which it heat the solution flowed through 1 and the solution releases the refrigerant vapor provided for the first condenser 6. The concentrated solution of the first generator 1 flows through the second solution heat exchanger 14 into absorption-generator 5 in which it absorbs the refrigerant vapor and releases heat to the heated medium and the solution flowed through 5. The refrigerant vapor of the first condenser 6 releases heat to the heated medium and becomes the refrigerant liquid. The refrigerant liquid of the first condenser 6 flows through throttle valve 13 into evaporator 8. The waste heat medium flows through evaporator 8 in which it heats the refrigerant liquid flowed through 8 and becomes the refrigerant vapor provided for the first absorber 3 and absorption-generator 5. The hierarchy condensation third-type absorption heat pump is thereby formed.

Figure 4:
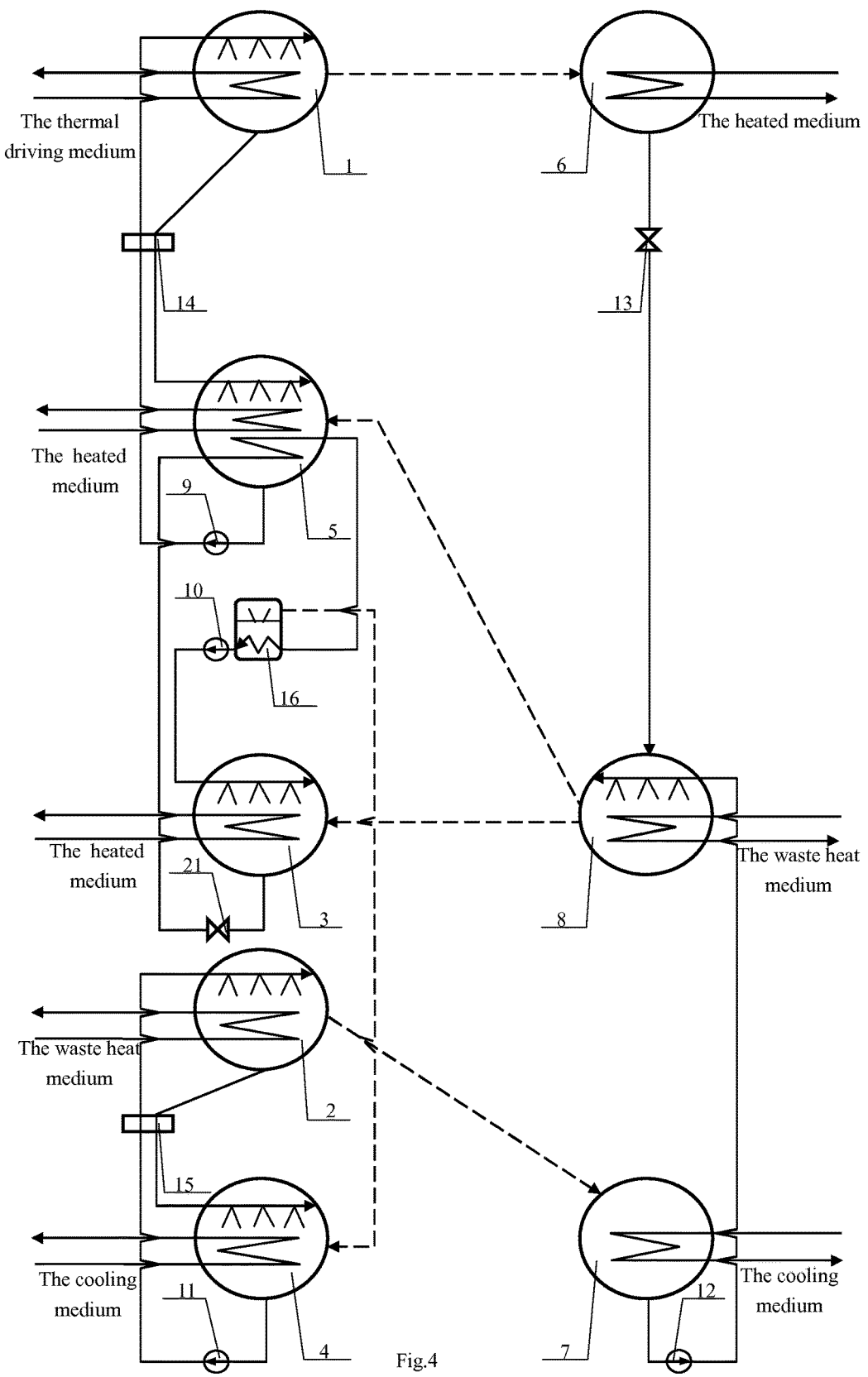
FIG. 4 is the fourth structure and flow diagram of the hierarchy condensation third-type absorption heat pump.

The hierarchy condensation third-type absorption heat pump in FIG. 5 can be realized in the following manner:

Structurally, in the hierarchy condensation third-type absorption heat pump shown in FIG. 4, it further adds with a second evaporator 17 and a third solution heat exchanger 19. The concentrated solution pipe of the steam distributing chamber 16 communicates with the first absorber 3 via the second solution pump 10 and the third solution heat exchanger 19. The dilute solution pipe of the first absorber 3 communicates with the steam distributing chamber 16 via the third solution heat exchanger 19 and absorption-generator 5. The refrigerant vapor channel of evaporator 8 communicated with absorption-generator 5 is cancelled. The refrigerant liquid pipe of the steam distributing chamber 16 communicates with the second evaporator 17 via the throttle valve 13. The refrigerant vapor channel of the second evaporator 17 communicates with absorption-generator 5. The waste heat medium pipe of the second evaporator 17 communicates with the external.

Procedurally, the dilute solution of the first absorber 3 flows through the third solution heat exchanger 19 into absorption-generator 5 in which it absorbs heat partial vaporization and enters the steam distributing chamber 16. The concentrated solution of the steam distributing chamber 16 flows through the second solution pump 10 and the third solution heat exchanger 19 into the first absorber 3 in which it absorbs the refrigerant vapor and releases heat to the heated medium. The refrigerant liquid of the first condenser 6 flows through throttle valve 13 and enters the second evaporator 17 in which it absorbs waste heat and becomes the refrigerant vapor provided for absorption-generator 5. The hierarchy condensation third-type absorption heat pump is thereby formed.

Figure 6:
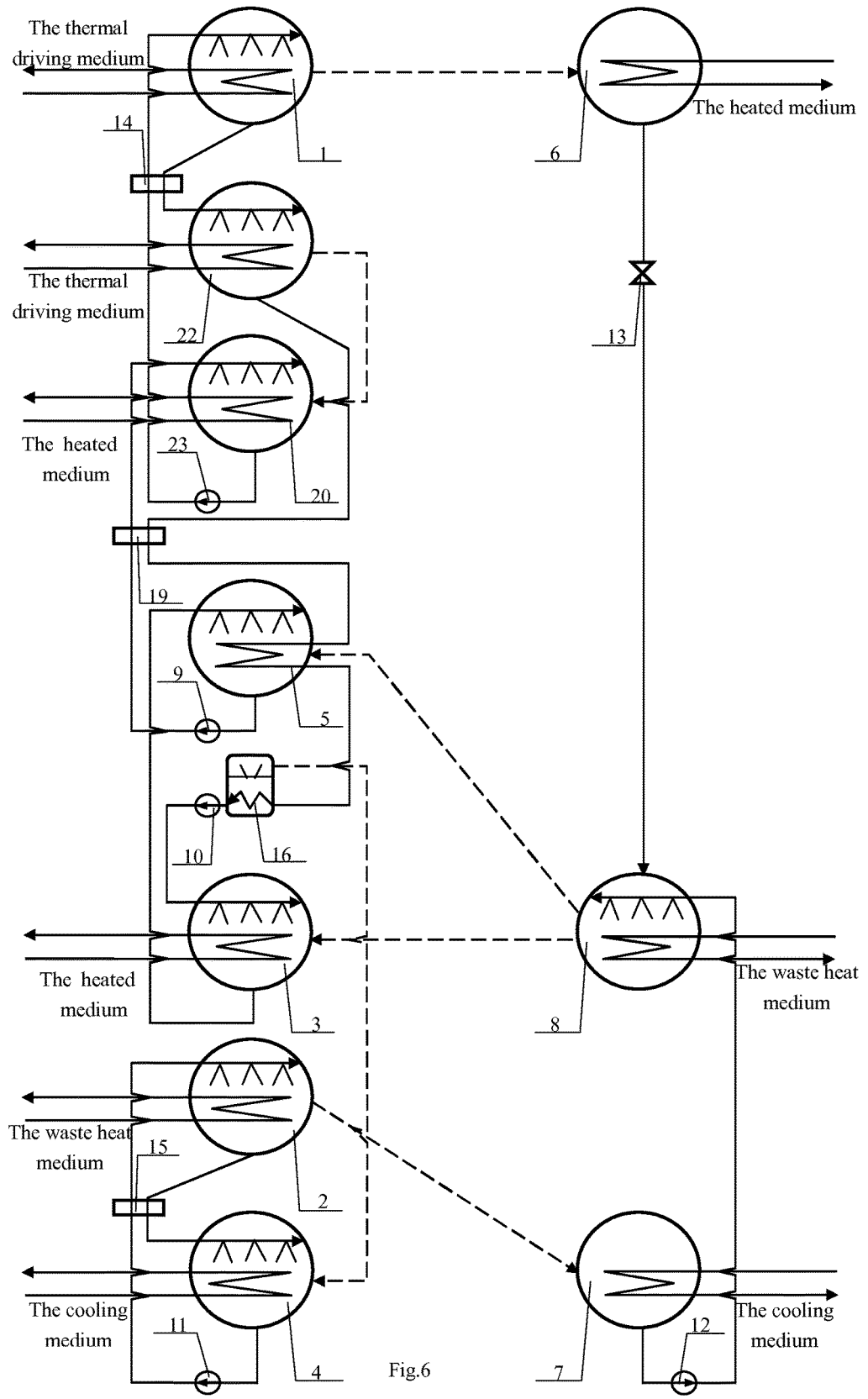
FIG. 6 is the sixth structure and flow diagram of the hierarchy condensation third-type absorption heat pump.

The hierarchy condensation third-type absorption heat pump in FIG. 6 can be realized in the following manner:

Structurally, in the hierarchy condensation third-type absorption heat pump shown in FIG. 1, it further adds with a third generator 22, a third absorber 20, a third solution heat exchanger 19 and a fourth solution pump 23 and the heated medium pipe of absorption-generator 5 communicated with the external is cancelled. The dilute solution pipe of absorption-generator 5 communicates with the third absorber 20 via the first solution pump 9 and the third solution heat exchanger 19. The dilute solution pipe of the third absorber 20 communicates with the first generator 1 via the fourth solution pump 23 and the second solution heat exchanger 14. The concentrated solution pipe of the first generator 1 communicates with the third generator 22 via the second solution heat exchanger 14. The concentrated solution pipe of the third generator 22 communicates with the steam distributing chamber 16 via the third solution heat exchanger 19 and absorption-generator 5. The refrigerant vapor channel of the third generator 22 communicates with the third absorber 20. The thermal driving medium pipe of the third generator 22 communicates with the external. The heated medium pipe of the third absorber 20 communicates with the external.

Procedurally, the dilute solution of absorption-generator 5 flows through the first solution pump 9 and the third solution heat exchanger 19 into the third absorber 20 in which it absorbs the refrigerant vapor and releases heat to the heated medium. The dilute solution of the third absorber 20 flows through the fourth solution pump 23 and the first solution heat exchanger 14 into the first generator 1. The concentrated solution of the first generator 1 flows through the first solution heat exchanger 14 into the third generator 22. The thermal driving medium flows through the third generator 22 in which it heats the solution flowed through 22 and the solution releases the refrigerant vapor provided for the third absorber 20. The concentrated solution of the third generator 22 flows through the third solution heat exchanger 19 into absorption-generator 5 in which it absorbs heat partial vaporization and enters the steam distributing chamber 16. The hierarchy condensation third-type absorption heat pump is thereby formed.

Figure 2:
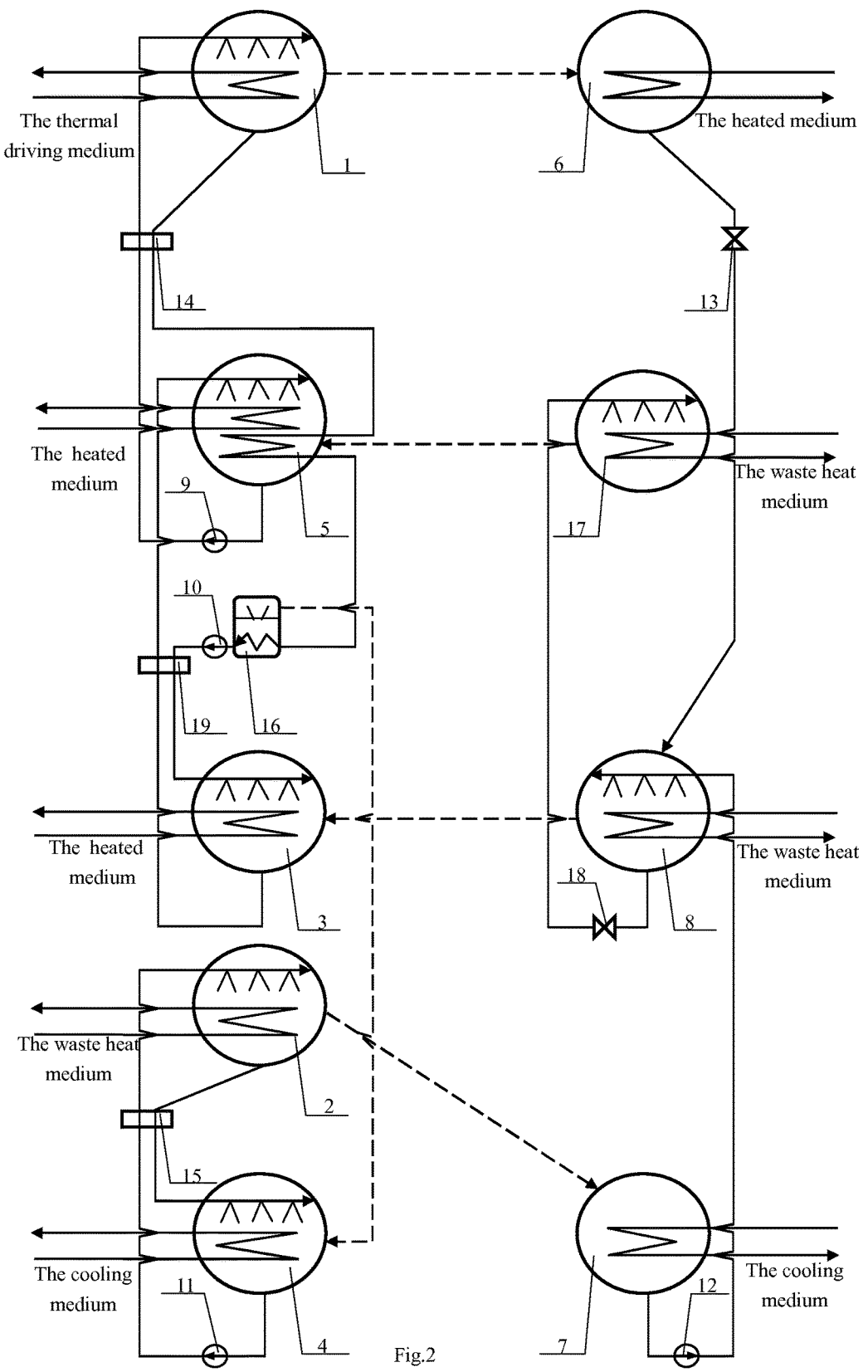
FIG. 2 is the second structure and flow diagram of the hierarchy condensation third-type absorption heat pump.
Figure 7:
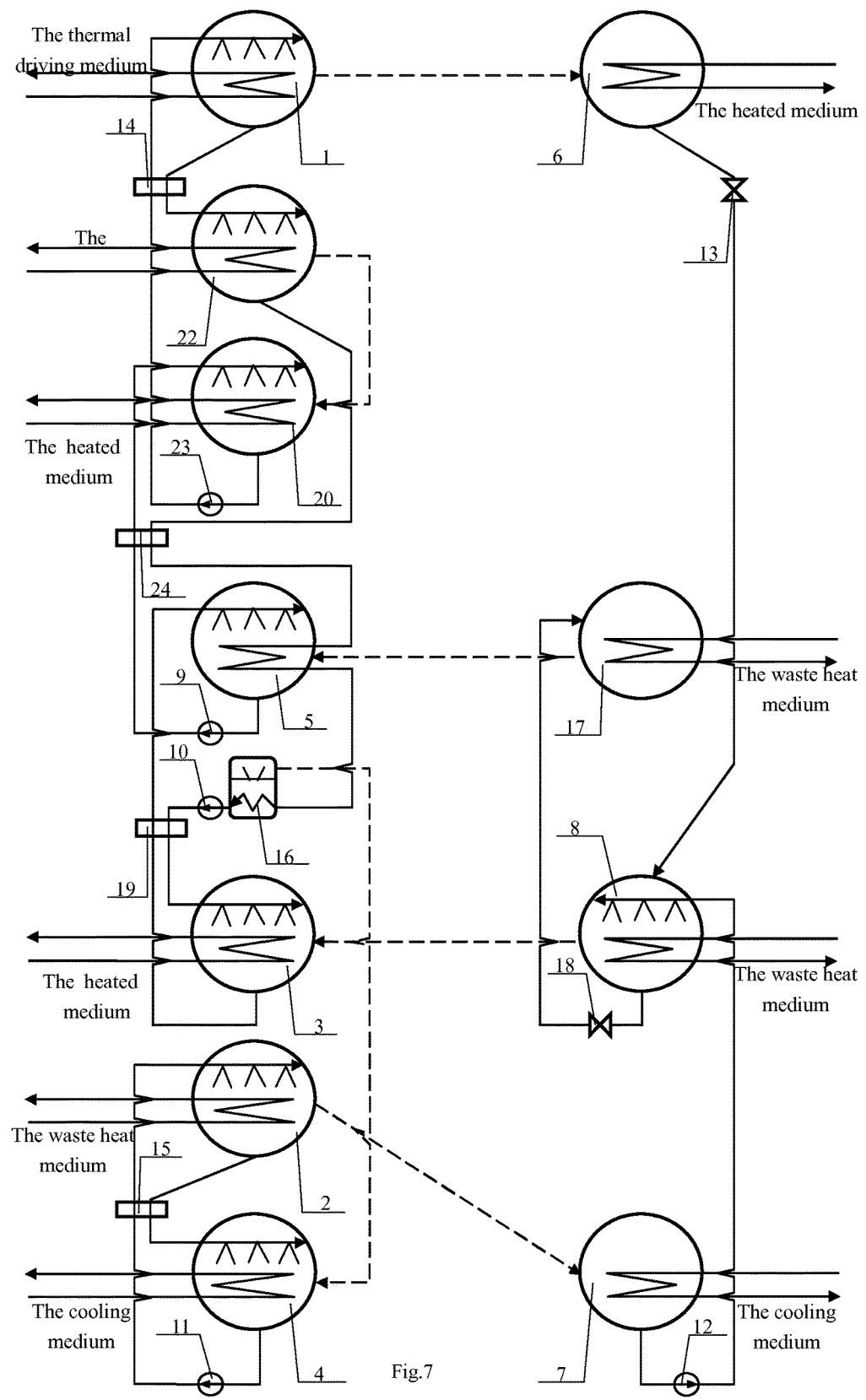
FIG. 7 is the seventh structure and flow diagram of the hierarchy condensation third-type absorption heat pump.

The hierarchy condensation third-type absorption heat pump in FIG. 7 can be realized in the following manner:

Structurally, in the hierarchy condensation third-type absorption heat pump shown in FIG. 2, it further adds with a third generator 22, a third absorber 20, a fourth solution heat exchanger 24 and a fourth solution pump 23 and the heated medium pipe of absorption-generator 5 communicated with the external is cancelled. The dilute solution pipe of absorption-generator 5 communicates with the third absorber 20 via the first solution pump 9 and the fourth solution heat exchanger 24. The dilute solution pipe of the third absorber 20 communicates with the first generator 1 via the fourth solution pump 23 and the second solution heat exchanger 14. The concentrated solution pipe of the first generator 1 communicates with the third generator 22 via the second solution heat exchanger 14. The concentrated solution pipe of the third generator 22 communicates with the steam distributing chamber 16 via the fourth solution heat exchanger 24 and absorption-generator 5. The refrigerant vapor channel of the third generator 22 communicates with the third absorber 20. The thermal driving medium pipe of the third generator 22 communicates with the external. The heated medium pipe of the third absorber 20 communicates with the external.

Procedurally, the dilute solution of absorption-generator 5 flows through the first solution pump 9 and the fourth solution heat exchanger 24 into the third absorber 20 in which it absorbs the refrigerant vapor and releases heat to the heated medium. The dilute solution of the third absorber 20 flows through the fourth solution pump 23 and the first solution heat exchanger 14 into the first generator 1. The concentrated solution of the first generator 1 flows through the first solution heat exchanger 14 into the third generator 22. The thermal driving medium flows through the third generator 22 in which it heats the solution flowed through 22 and the solution releases the refrigerant vapor provided for the third absorber 20. The concentrated solution of the third generator 22 flows through the fourth solution heat exchanger 24 into absorption-generator 5 in which it absorbs heat partial vaporization and enters the steam distributing chamber 16. The hierarchy condensation third-type absorption heat pump is thereby formed.

Figure 8:
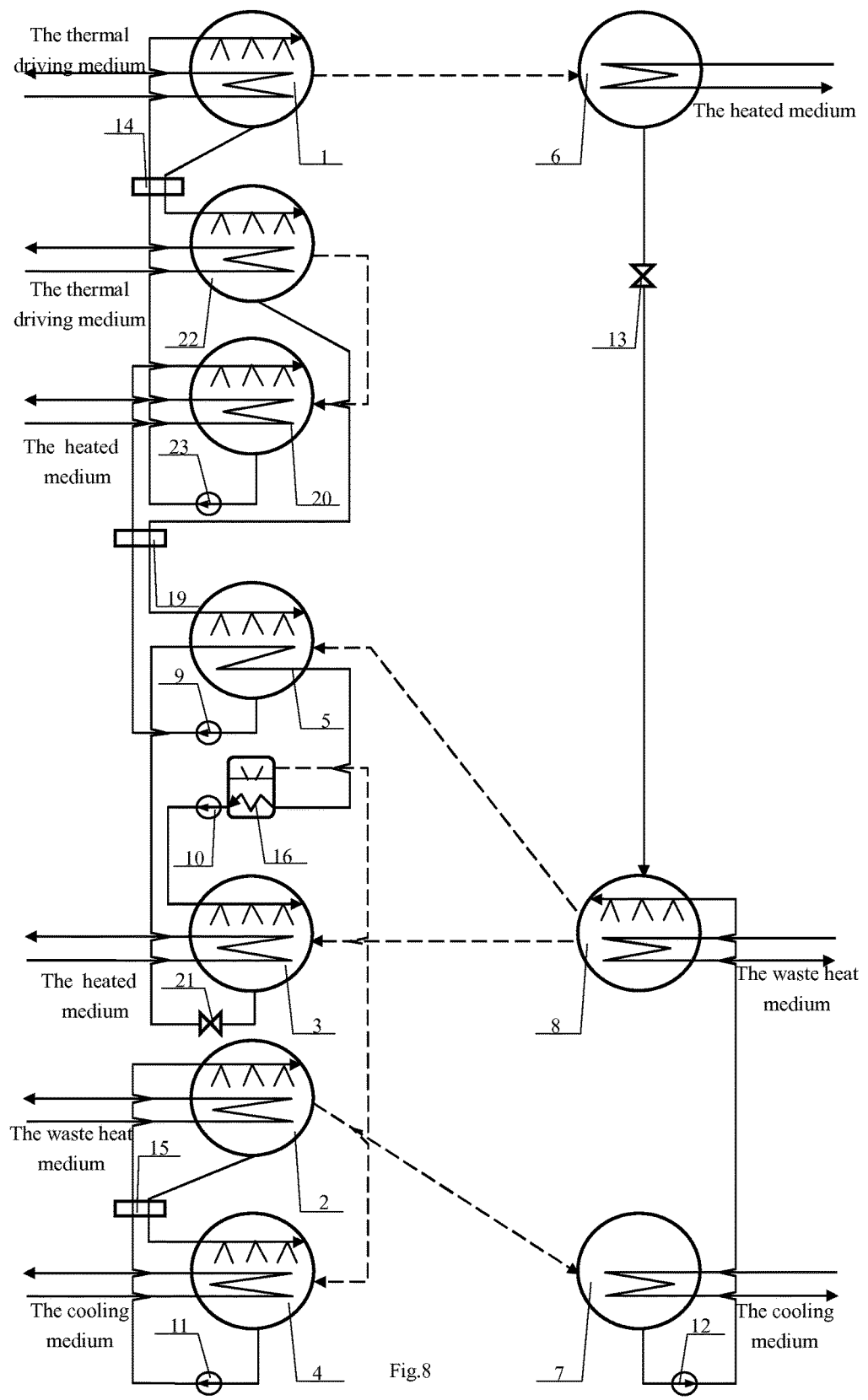
FIG. 8 is the eighth structure and flow diagram of the hierarchy condensation third-type absorption heat pump.

The hierarchy condensation third-type absorption heat pump in FIG. 8 can be realized in the following manner:

Structurally, in the hierarchy condensation third-type absorption heat pump shown in FIG. 4, it further adds with a third generator 22, a third absorber 20, a third solution heat exchanger 19 and a fourth solution pump 23. The dilute solution pipe of absorption-generator 5 communicates with the third absorber 20 via the first solution pump 9 and the third solution heat exchanger 19. The dilute solution pipe of the third absorber 20 communicates with the first generator 1 via the fourth solution pump 23 and the second solution heat exchanger 14. The concentrated solution pipe of the first generator 1 communicates with the third generator 22 via the second solution heat exchanger 14. The concentrated solution pipe of the third generator 22 communicates with absorption-generator 5 via the third solution heat exchanger 19. The refrigerant vapor channel of the third generator 22 communicates with the third absorber 20. The thermal driving medium pipe of the third generator 22 communicates with the external. The heated medium pipe of the third absorber 20 communicates with the external.

Procedurally, the dilute solution of absorption-generator 5 flows through the first solution pump 9 and the third solution heat exchanger 19 into the third absorber 20 in which it absorbs the refrigerant vapor and releases heat to the heated medium. The dilute solution of the third absorber 20 flows through the fourth solution pump 23 and the first solution heat exchanger 14 into the first generator 1. The concentrated solution of the first generator 1 flows through the first solution heat exchanger 14 into the third generator 22. The thermal driving medium flows through the third generator 22 in which it heats the solution flowed through 22 and the solution releases the refrigerant vapor provided for the third absorber 20. The concentrated solution of the third generator 22 flows through the third solution heat exchanger 19 into absorption-generator 5 in which it absorbs the refrigerant vapor and releases heat to the solution flowed through 5. The hierarchy condensation third-type absorption heat pump is thereby formed.

Figure 5:
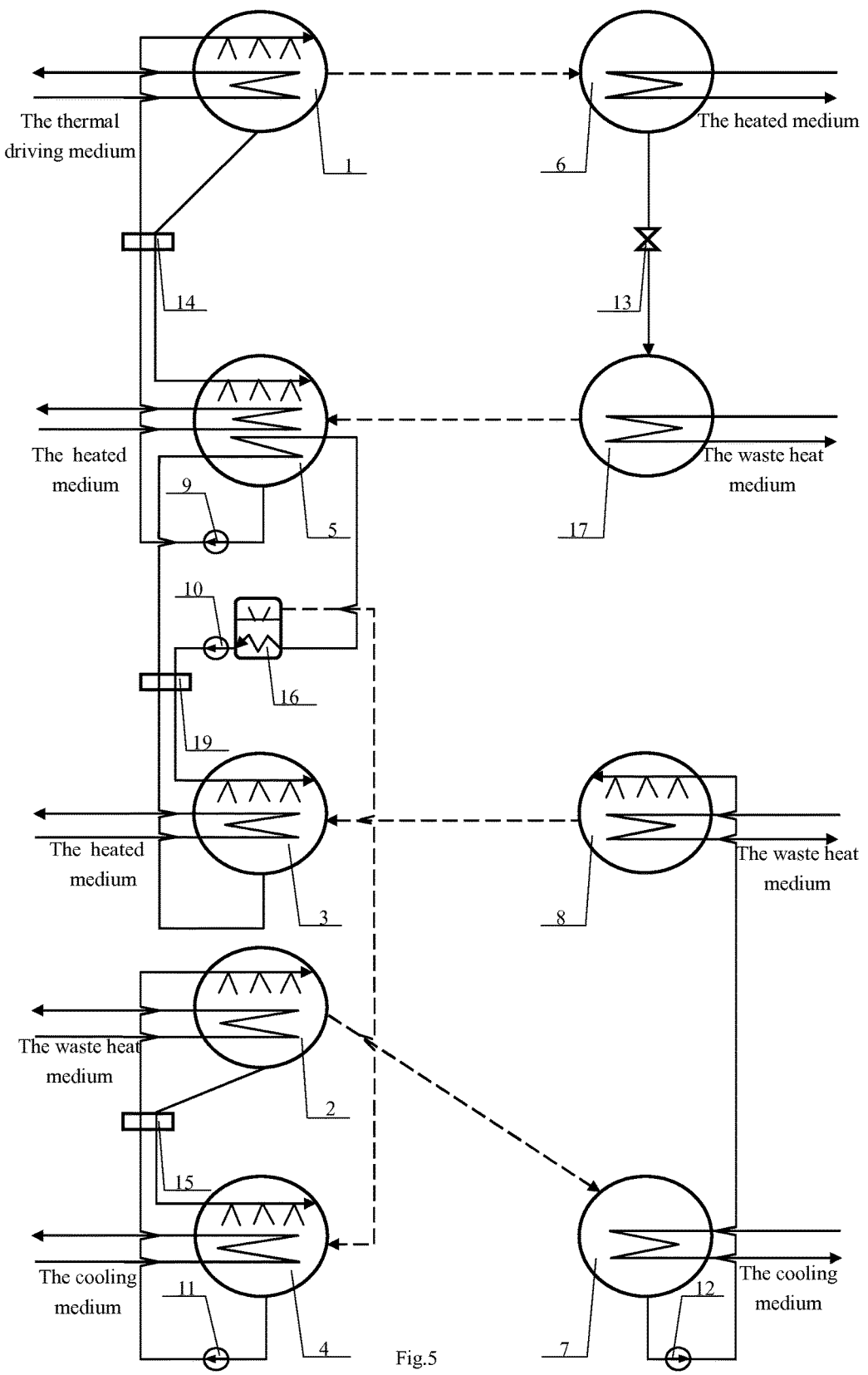
FIG. 5 is the fifth structure and flow diagram of the hierarchy condensation third-type absorption heat pump.
Figure 9:
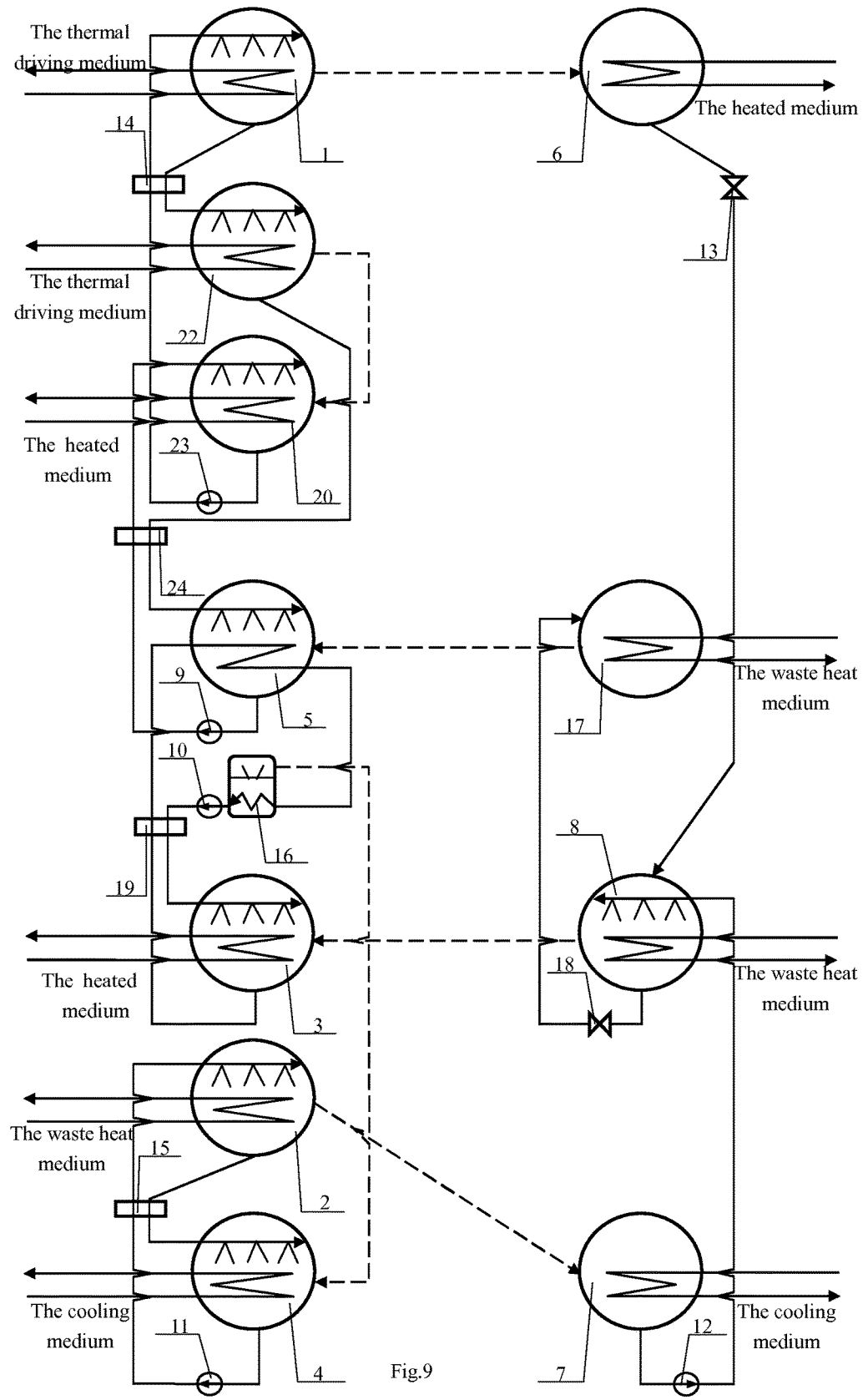
FIG. 9 is the ninth structure and flow diagram of the hierarchy condensation third-type absorption heat pump.

The hierarchy condensation third-type absorption heat pump in FIG. 9 can be realized in the following manner:

Structurally, in the hierarchy condensation third-type absorption heat pump shown in FIG. 5, it further adds with a third generator 22, a third absorber 20, a fourth solution heat exchanger 24 and a fourth solution pump 23 and the heated medium pipe of absorption-generator 5 communicated with the external is cancelled. The dilute solution pipe of absorption-generator 5 communicates with the third absorber 20 via the first solution pump 9 and the fourth solution heat exchanger 24. The dilute solution pipe of the third absorber 20 communicates with the first generator 1 via the fourth solution pump 23 and the second solution heat exchanger 14. The concentrated solution pipe of the first generator 1 communicates with the third generator 22 via the second solution heat exchanger 14. The concentrated solution pipe of the third generator 22 communicates with absorption-generator 5 via the fourth solution heat exchanger 24. The refrigerant vapor channel of the third generator 22 communicates with the third absorber 20. The thermal driving medium pipe of the third generator 22 communicates with the external. The heated medium pipe of the third absorber 20 communicates with the external.

Procedurally, the dilute solution of absorption-generator 5 flows through the first solution pump 9 and the fourth solution heat exchanger 24 into the third absorber 20 in which it absorbs the refrigerant vapor and releases heat to the heated medium. The dilute solution of the third absorber 20 flows through the fourth solution pump 23 and the first solution heat exchanger 14 into the first generator 1. The concentrated solution of the first generator 1 flows through the first solution heat exchanger 14 into the third generator 22. The thermal driving medium flows through the third generator 22 in which it heats the solution flowed through 22 and the solution releases the refrigerant vapor provided for the third absorber 20. The concentrated solution of the third generator 22 flows through the fourth solution heat exchanger 24 into absorption-generator 5 in which it absorbs the refrigerant vapor and releases heat to the solution flowed through 5. The hierarchy condensation third-type absorption heat pump is thereby formed.

Figure 10:
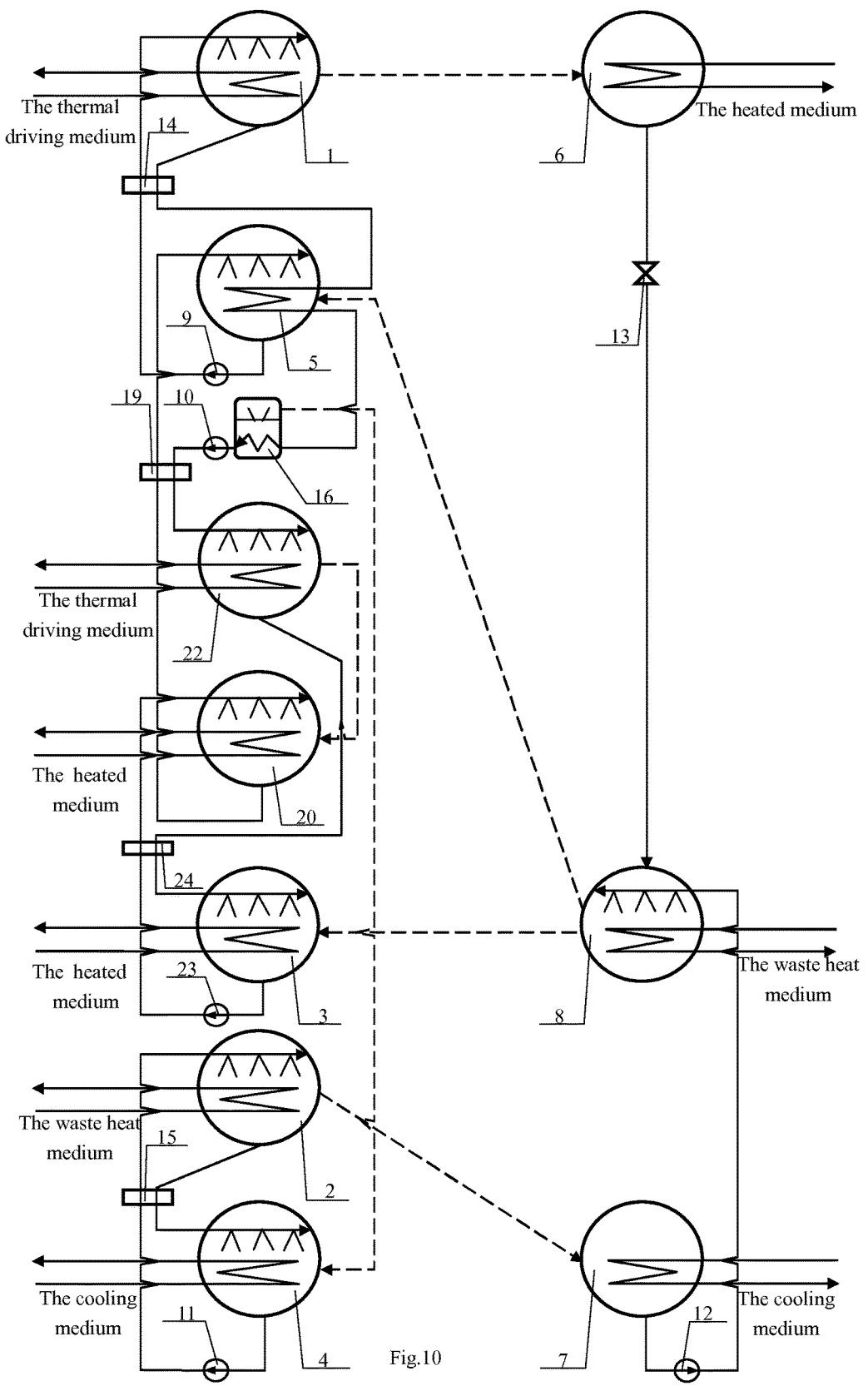
FIG. 10 is the tenth structure and flow diagram of the hierarchy condensation third-type absorption heat pump.

The hierarchy condensation third-type absorption heat pump in FIG. 10 can be realized in the following manner:

Structurally, in the hierarchy condensation third-type absorption heat pump shown in FIG. 1, it further adds with the third generator 22, the third absorber 20, the third solution heat exchanger 19, the fourth solution heat exchanger 24 and the fourth solution pump 23 and cancels the heated medium pipe of absorption-generator 5 connected the external. The concentrated solution pipe of the steam distributing chamber 16 communicates with the third generator 22 via the second solution pump 10 and the third solution heat exchanger 19. The concentrated solution pipe of the third generator 22 communicates with the first absorber 3 via the fourth solution heat exchanger 24. The dilute solution pipe of the first absorber 3 communicates with the third absorber 20 via the fourth solution pump 23 and the fourth solution heat exchanger 24. The dilute solution pipe of the third absorber 20 communicates with absorption-generator 5 via the third solution heat exchanger 19. The refrigerant vapor channel of the third generator 22 communicates with the third absorber 20. The thermal driving medium pipe of the third generator 22 communicates with the external. The heated medium pipe of the third absorber 20 communicates with external.

Procedurally, the dilute solution of the first absorber 3 flows through the fourth solution pump 23 and the fourth solution heat exchanger 24 into the third absorber 20 in which it absorbs the refrigerant vapor and releases heat to the heated medium. The dilute solution of the third absorber 20 flows through the third solution heat exchanger 19 into absorption-generator 5 in which it absorbs the refrigerant vapor and releases heat to the solution flowed through 5. The concentrated solution of the steam distributing chamber 16 flows through the second solution pump 10 and the third solution heat exchanger 19 into the third generator 22. The thermal driving medium flows through the third generator 22 in which it heats the solution flowed through 22 and the solution releases the refrigerant vapor provided for the third absorber 20. The concentrated solution of the third generator 22 flows through the fourth solution heat exchanger 24 into the first absorber 3. The hierarchy condensation third-type absorption heat pump is thereby formed.

Figure 11:
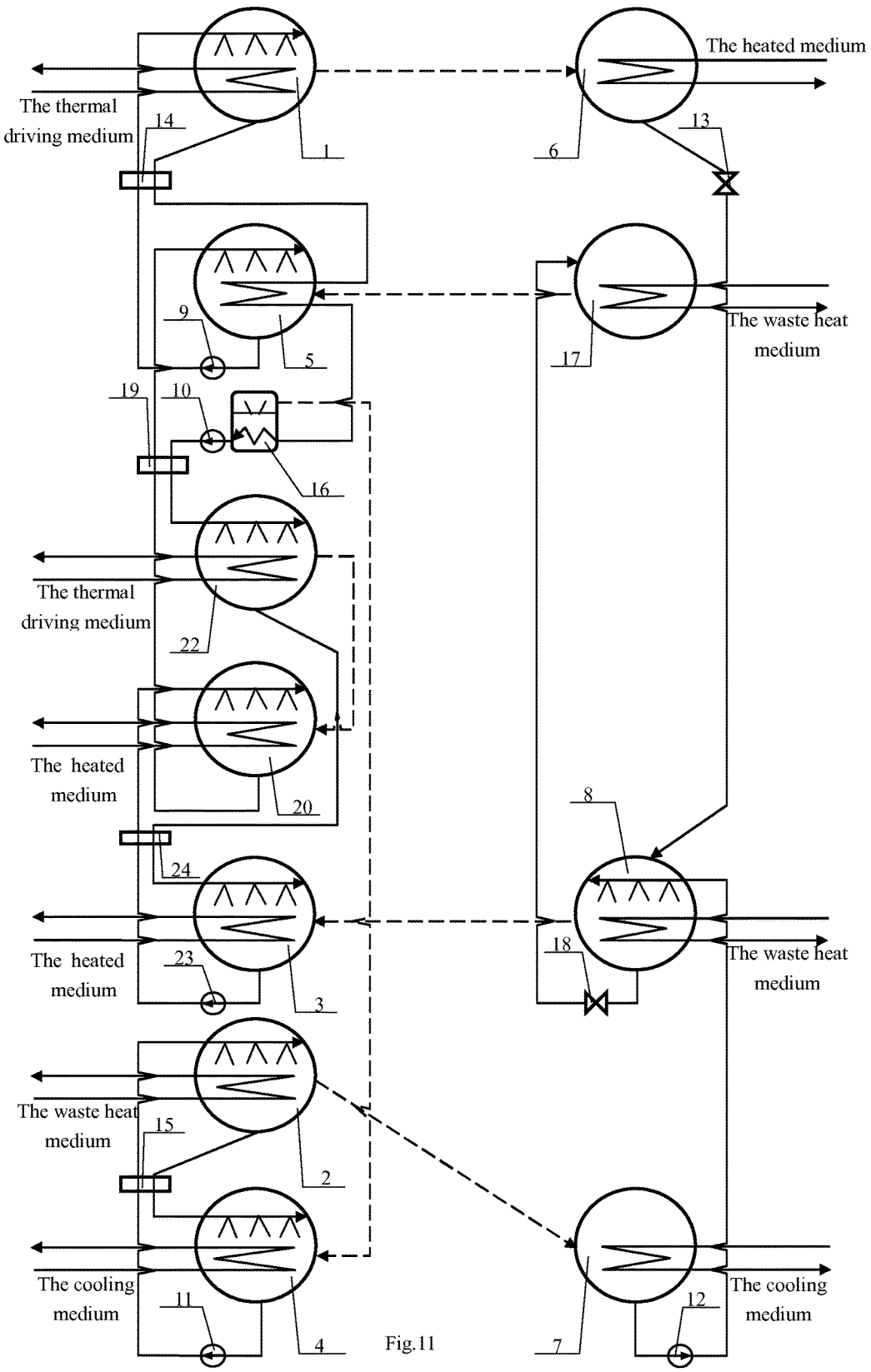
FIG. 11 is the eleventh structure and flow diagram of the hierarchy condensation third-type absorption heat pump.

The hierarchy condensation third-type absorption heat pump in FIG. 11 can be realized in the following manner:

Structurally, in the hierarchy condensation third-type absorption heat pump shown in FIG. 2, it further adds with the third generator 22, the third absorber 20, the fourth solution heat exchanger 24 and the fourth solution pump 23 and cancels the heated medium pipe of absorption-generator 5 connected the external. The concentrated solution pipe of the steam distributing chamber 16 communicates with the third generator 22 via the second solution pump 10 and the third solution heat exchanger 19. The concentrated solution pipe of the third generator 22 communicates with the first absorber 3 via the fourth solution heat exchanger 24. The dilute solution pipe of the first absorber 3 communicates with the third absorber 20 via the fourth solution pump 23 and the fourth solution heat exchanger 24. The dilute solution pipe of the third absorber 20 communicates with absorption-generator 5 via the third solution heat exchanger 19. The refrigerant vapor channel of the third generator 22 communicates with the third absorber 20. The thermal driving medium pipe of the third generator 22 communicates with the external. The heated medium pipe of the third absorber 20 communicates with the external.

Procedurally, the dilute solution of the first absorber 3 flows through the fourth solution pump 23 and the fourth solution heat exchanger 24 into the third absorber 20 in which it absorbs the refrigerant vapor and releases heat to the heated medium. The dilute solution of the third absorber 20 flows through the third solution heat exchanger 19 into absorption-generator 5 in which it absorbs the refrigerant vapor and releases heat to the solution flowed through 5. The concentrated solution of the steam distributing chamber 16 flows through the second solution pump 10 and the third solution heat exchanger 19 into the third generator 22. The thermal driving medium flows through the third generator 22 in which it heats the solution flowed through 22 and the solution releases the refrigerant vapor provided for the third absorber 20. The concentrated solution of the third generator 22 flows through the fourth solution heat exchanger 24 into the first absorber 3. The hierarchy condensation third-type absorption heat pump is thereby formed.

Figure 12:
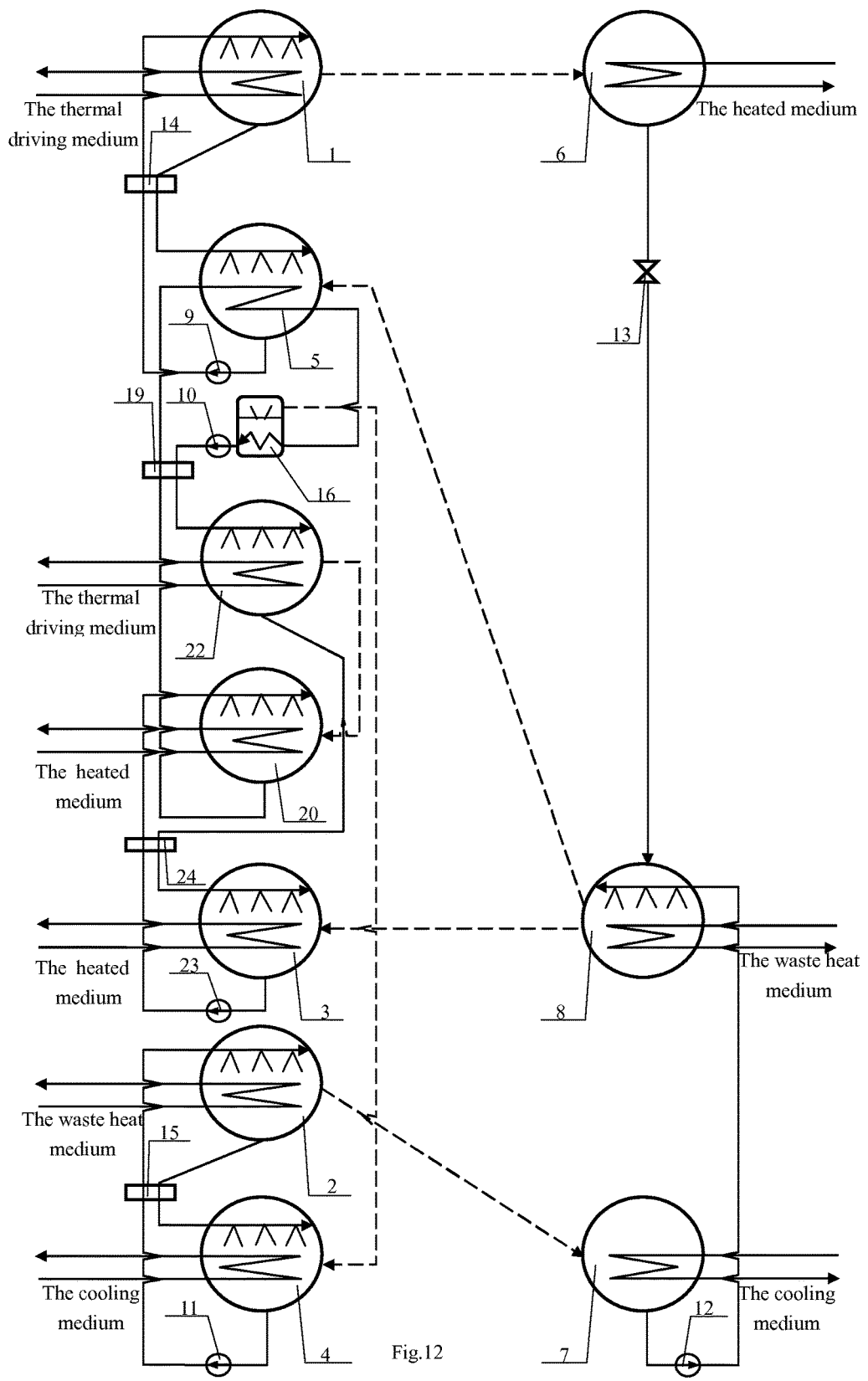
FIG. 12 is the twelfth structure and flow diagram of the hierarchy condensation third-type absorption heat pump.

The hierarchy condensation third-type absorption heat pump in FIG. 12 can be realized in the following manner:

Structurally, in the hierarchy condensation third-type absorption heat pump shown in FIG. 4, it further adds with the third generator 22, the third absorber 20, the third solution heat exchanger 19, the fourth solution heat exchanger 24 and the fourth solution pump 23 and cancels the solution throttle 21 and the heated medium pipe of absorption-generator 5 connected the external. The concentrated solution pipe of the steam distributing chamber 16 communicates with the third generator 22 via the second solution pump 10 and the third solution heat exchanger 19. The concentrated solution pipe of the third generator 22 communicates with the first absorber 3 via the fourth solution heat exchanger 24. The dilute solution pipe of the first absorber 3 communicates with the third absorber 20 via the fourth solution pump 23 and the fourth solution heat exchanger 24. The dilute solution pipe of the third absorber 20 communicates with the steam distributing chamber 16 via the third solution heat exchanger 19 and absorption-generator 5. The refrigerant vapor channel of the third generator 22 communicates with the third absorber 20. The thermal driving medium pipe of the third generator 22 communicates with the external. The heated medium pipe of the third absorber 20 communicates with the external.

Procedurally, the dilute solution of the first absorber 3 flows through the fourth solution pump 23 and the fourth solution heat exchanger 24 into the third absorber 20 in which it absorbs the refrigerant vapor and releases heat to the heated medium. The dilute solution of the third absorber 20 flows through the third solution heat exchanger 19 into absorption-generator 5 in which it absorbs heat partial vaporization and enters the steam distributing chamber 16. The concentrated solution of the steam distributing chamber 16 flows through the second solution pump 10 and the third solution heat exchanger 19 into the third generator 22. The thermal driving medium flows through the third generator 22 in which it heats the solution flowed through 22 and the solution releases the refrigerant vapor provided for the third absorber 20. The concentrated solution of the third generator 22 flows through the fourth solution heat exchanger 24 into the first absorber 3. The hierarchy condensation third-type absorption heat pump is thereby formed.

Figure 13:
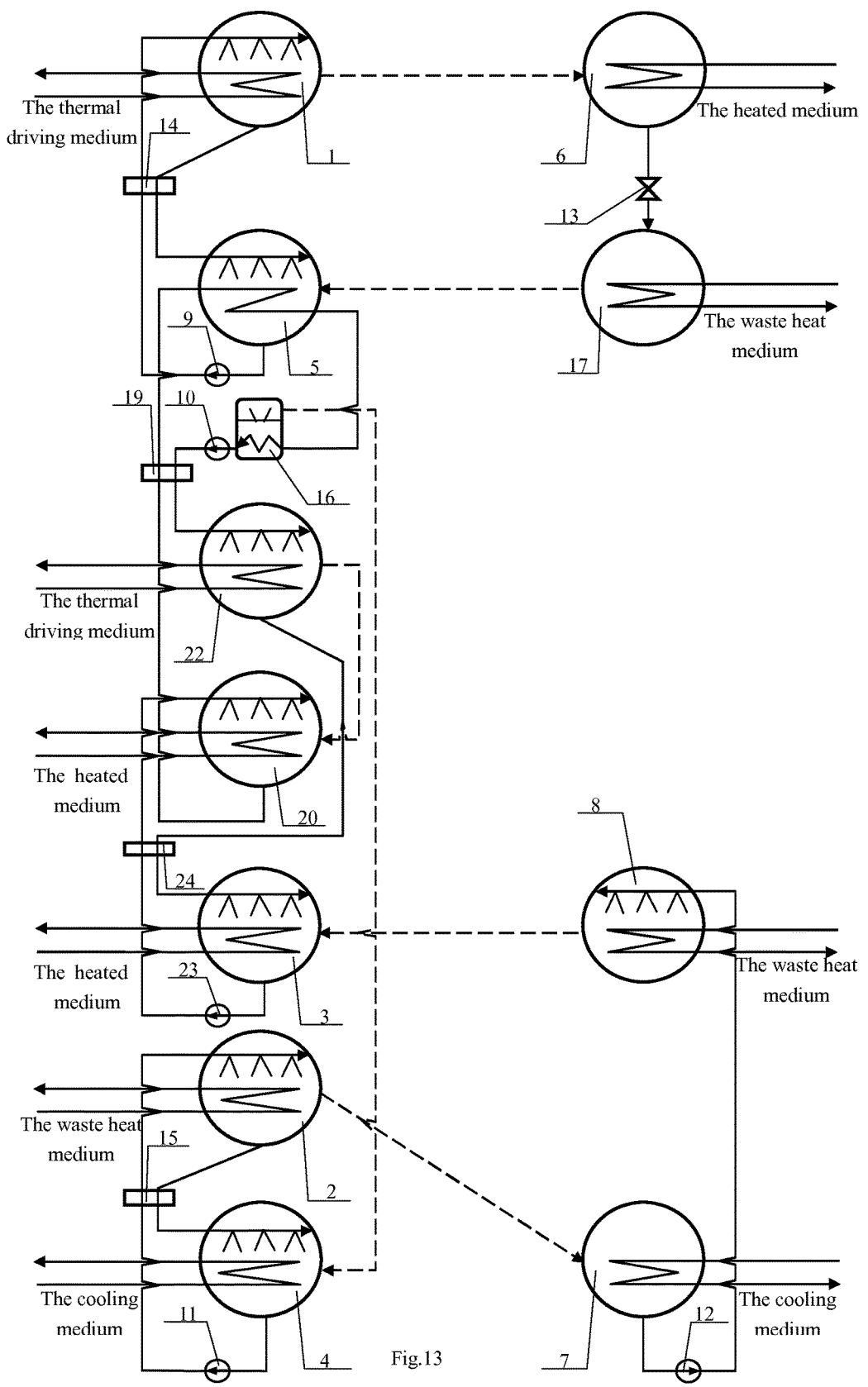
FIG. 13 is the thirteenth structure and flow diagram of the hierarchy condensation third-type absorption heat pump.

The hierarchy condensation third-type absorption heat pump in FIG. 13 can be realized in the following manner:

Structurally, in the hierarchy condensation third-type absorption heat pump shown in FIG. 5, it further adds with the third generator 22, the third absorber 20, the fourth solution heat exchanger 24 and the fourth solution pump 23 and cancels the heated medium pipe of absorption-generator 5 connected the external. The concentrated solution pipe of the steam distributing chamber 16 communicates with the third generator 22 via the second solution pump 10 and the third solution heat exchanger 19. The concentrated solution pipe of the third generator 22 communicates with the first absorber 3 via the fourth solution heat exchanger 24. The dilute solution pipe of the first absorber 3 communicates with the third absorber 20 via the fourth solution pump 23 and the fourth solution heat exchanger 24. The dilute solution pipe of the third absorber 20 communicates with the steam distributing chamber 16 via the third solution heat exchanger 19 and absorption-generator 5. The refrigerant vapor channel of the third generator 22 communicates with the third absorber 20. The thermal driving medium pipe of the third generator 22 communicates with the external. The heated medium pipe of the third absorber 20 communicates with the external.

Procedurally, the dilute solution of the first absorber 3 flows through the fourth solution pump 23 and the fourth solution heat exchanger 24 into the third absorber 20 in which it absorbs the refrigerant vapor and releases heat to the heated medium. The dilute solution of the third absorber 20 flows through the third solution heat exchanger 19 into absorption-generator 5 in which it absorbs heat partial vaporization and enters the steam distributing chamber 16. The concentrated solution of the steam distributing chamber 16 flows through the second solution pump 10 and the third solution heat exchanger 19 into the third generator 22. The thermal driving medium flows through the third generator 22 in which it heats the solution flowed through 22 and the solution releases the refrigerant vapor provided for the third absorber 20. The concentrated solution of the third generator 22 flows through the fourth solution heat exchanger 24 into the first absorber 3. The hierarchy condensation third-type absorption heat pump is thereby formed.

Figure 14:
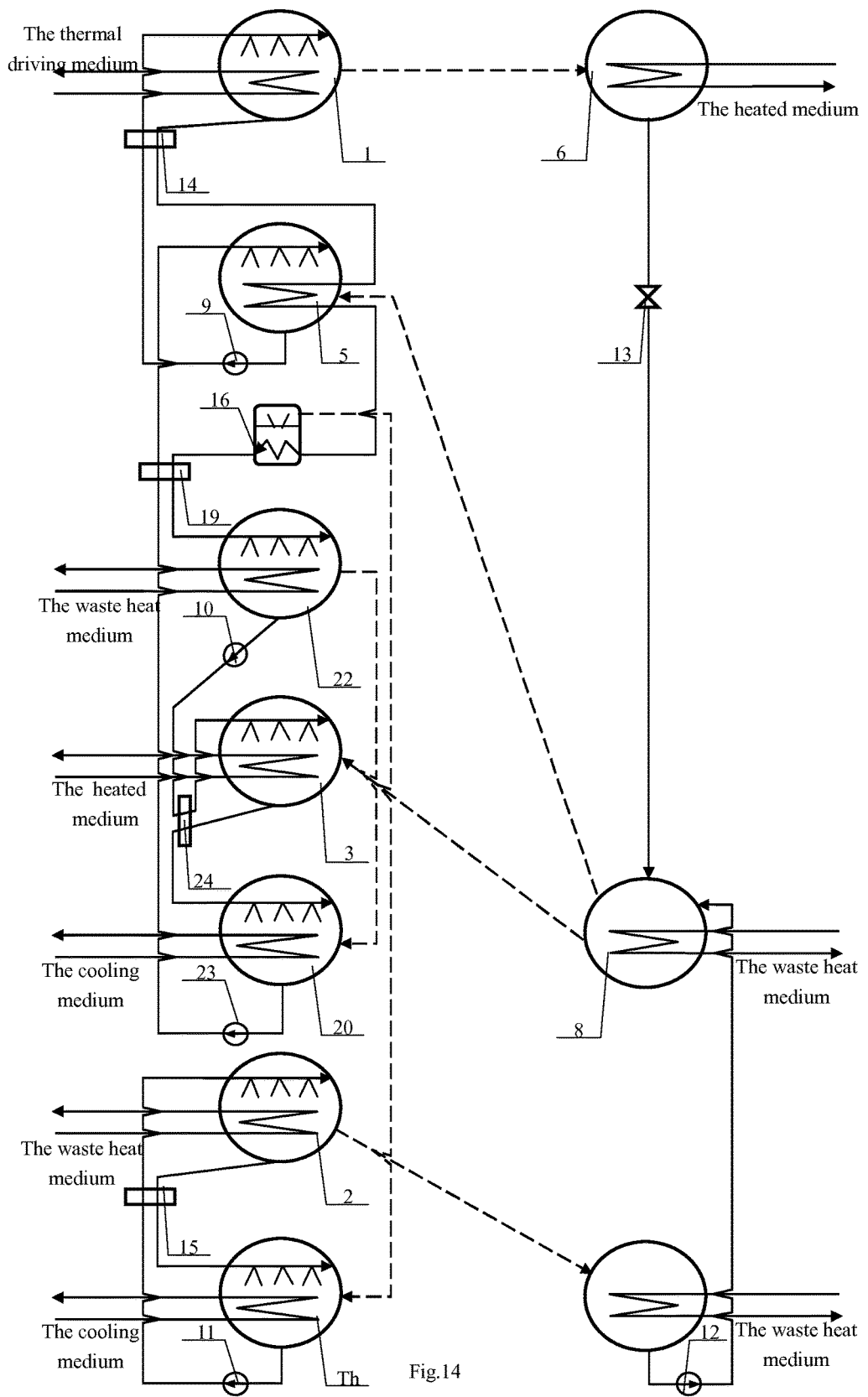
FIG. 14 is the fourteenth structure and flow diagram of the hierarchy condensation third-type absorption heat pump.

The hierarchy condensation third-type absorption heat pump in FIG. 14 can be realized in the following manner:

Structurally, in the hierarchy condensation third-type absorption heat pump shown in FIG. 1, it further adds with the third generator 22, the third absorber 20, the third solution heat exchanger 19, the fourth solution heat exchanger 24 and the fourth solution pump 23 and cancels the heated medium pipe of absorption-generator 5 connected the external. The concentrated solution pipe of the steam distributing chamber 16 communicates with the third generator 22 via the third solution heat exchanger 19. The concentrated solution pipe of the third generator 22 communicates with the first absorber 3 via the second solution pump 10 and the fourth solution heat exchanger 24. The dilute solution pipe of the first absorber 3 communicates with the third absorber 20 via the fourth solution heat exchanger 24. The dilute solution pipe of the third absorber 20 communicates with absorption-generator 5 via the fourth solution pump 23 and the third solution heat exchanger 19. The refrigerant vapor channel of the third generator 22 communicates with the third absorber 20. The thermal driving medium pipe of the third generator 22 communicates with the external. The heated medium pipe of the third absorber 20 communicates with the external.

Procedurally, the concentrated solution of the steam distributing chamber 16 flows through the third solution heat exchanger 19 into the third generator 22. The waste heat medium flows through the third generator 22 in which it heats the solution flowed through 22 and the solution releases the refrigerant vapor provided for the third absorber 20. The concentrated solution of the third generator 22 flows through the second solution pump 10 and the fourth solution heat exchanger 24 into the first absorber 3. The dilute solution of the first absorber 3 flows through the fourth solution heat exchanger 24 into the third absorber 20 in which it absorbs the refrigerant vapor and releases heat to the cooling medium. The dilute solution of the third absorber 20 flows through the fourth solution pump 23 and the third solution heat exchanger 19 into absorption-generator 5 in which it absorbs the refrigerant vapor and releases heat to the solution flowed through 5. The hierarchy condensation third-type absorption heat pump is thereby formed.

Figure 15:
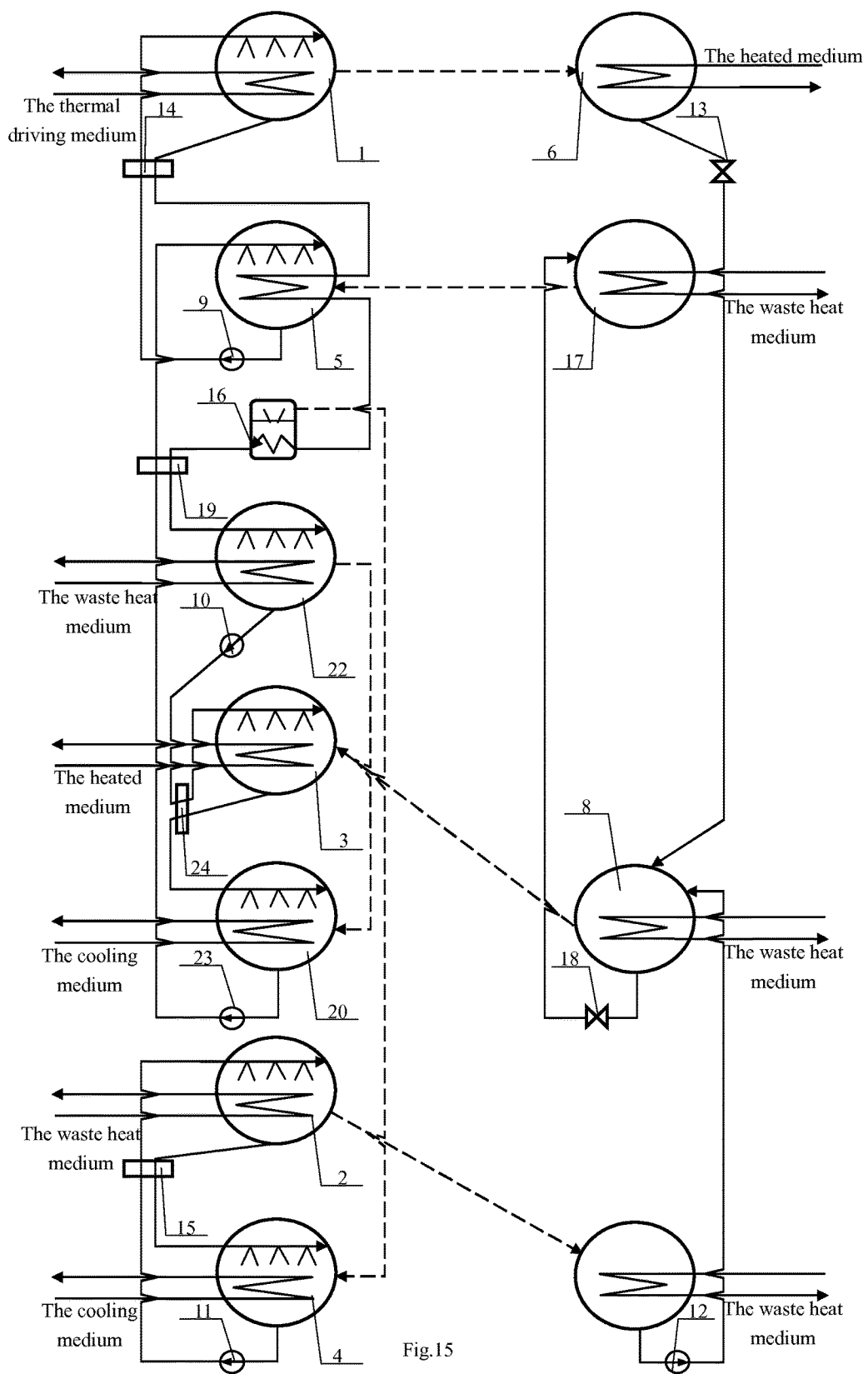
FIG. 15 is the fifteenth structure and flow diagram of the hierarchy condensation third-type absorption heat pump.

The hierarchy condensation third-type absorption heat pump in FIG. 15 can be realized in the following manner:

Structurally, in the hierarchy condensation third-type absorption heat pump shown in FIG. 2, it further adds with the third generator 22, the third absorber 20, the fourth solution heat exchanger 24 and the fourth solution pump 23 and cancels the heated medium pipe of absorption-generator 5 connected the external. The concentrated solution pipe of the steam distributing chamber 16 communicates with the third generator 22 via the third solution heat exchanger 19. The concentrated solution pipe of the third generator 22 communicates with the first absorber 3 via the second solution pump 10 and the fourth solution heat exchanger 24. The dilute solution pipe of the first absorber 3 communicates with the third absorber 20 via the fourth solution heat exchanger 24. The dilute solution pipe of the third absorber 20 communicates with absorption-generator 5 via the fourth solution pump 23 and the third solution heat exchanger 19. The refrigerant vapor channel of the third generator 22 communicates with the third absorber 20. The thermal driving medium pipe of the third generator 22 communicates with the external. The heated medium pipe of the third absorber 20 communicates with the external.

Procedurally, the concentrated solution of the steam distributing chamber 16 flows through the third solution heat exchanger 19 into the third generator 22. The waste heat medium flows through the third generator 22 in which it heats the solution flowed through 22 and the solution releases the refrigerant vapor provided for the third absorber 20. The concentrated solution of the third generator 22 flows through the second solution pump 10 and the fourth solution heat exchanger 24 into the first absorber 3. The dilute solution of the first absorber 3 flows through the fourth solution heat exchanger 24 into the third absorber 20 in which it absorbs the refrigerant vapor and releases heat to the cooling medium. The dilute solution of the third absorber 20 flows through the fourth solution pump 23 and the third solution heat exchanger 19 into absorption-generator 5 in which it absorbs the refrigerant vapor and releases heat to the solution flowed through 5. The hierarchy condensation third-type absorption heat pump is thereby formed.

Figure 16:
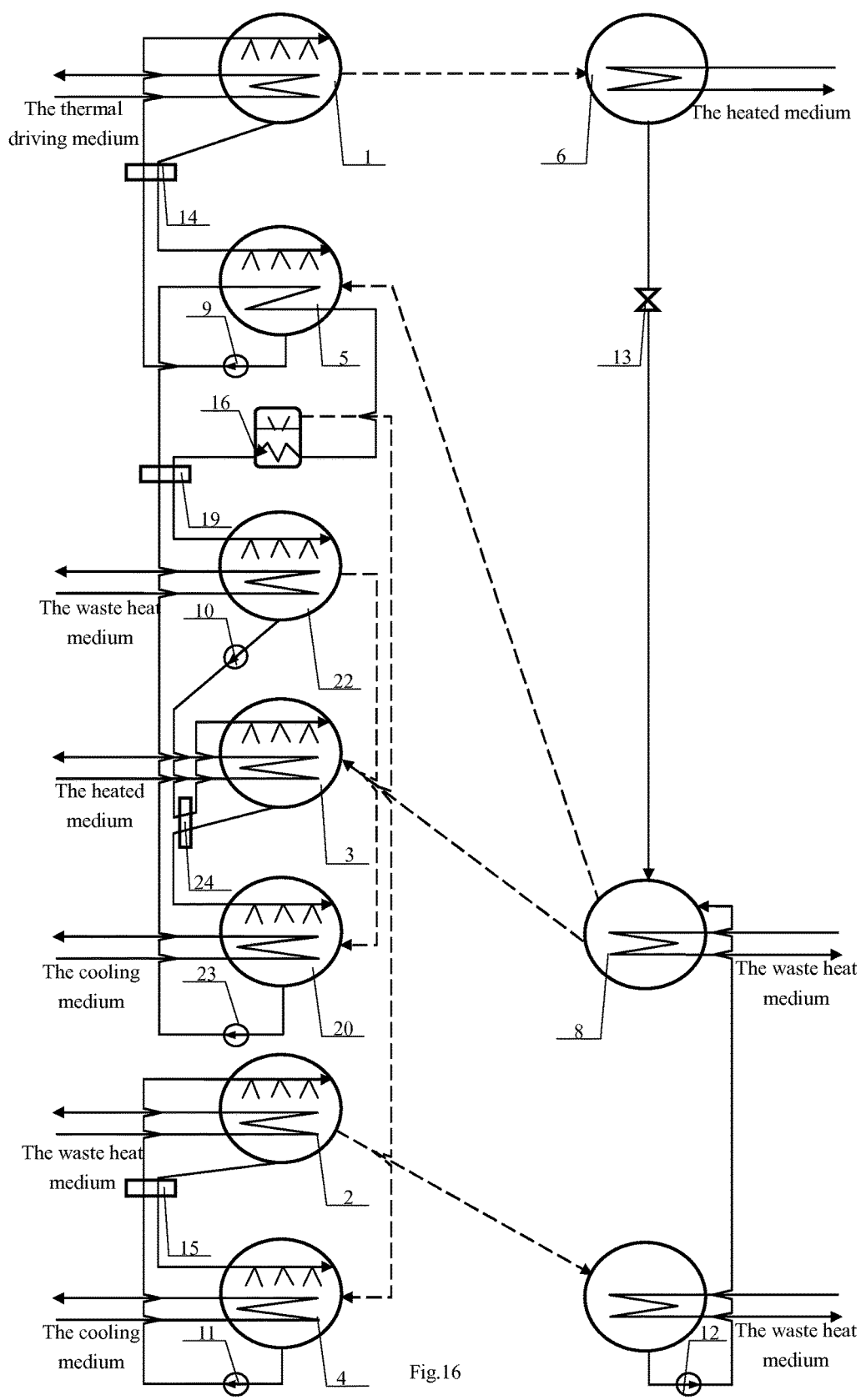
FIG. 16 is the sixteenth structure and flow diagram of the hierarchy condensation third-type absorption heat pump.

The hierarchy condensation third-type absorption heat pump in FIG. 16 can be realized in the following manner:

Structurally, in the hierarchy condensation third-type absorption heat pump shown in FIG. 4, it further adds with the third generator 22, the third absorber 20, the third solution heat exchanger 19, the fourth solution heat exchanger 24 and the fourth solution pump 23 and cancelling the solution throttle 21 and the heated medium pipe of absorption-generator 5 connected the external. The concentrated solution pipe of the steam distributing chamber 16 communicates with the third generator 22 via the third solution heat exchanger 19. The concentrated solution pipe of the third generator 22 communicates with the first absorber 3 via the second solution pump 10 and the fourth solution heat exchanger 24. The dilute solution pipe of the first absorber 3 communicates with the third absorber 20 via the fourth solution heat exchanger 24. The dilute solution pipe of the third absorber 20 communicates with the steam distributing chamber 16 via the fourth solution pump 23, the third solution heat exchanger 19 and absorption-generator 5. The refrigerant vapor channel of the third generator 22 communicates with the third absorber 20. The thermal driving medium pipe of the third generator 22 communicates with the external. The heated medium pipe of the third absorber 20 communicates with the external.

Procedurally, the concentrated solution of the steam distributing chamber 16 flows through the third solution heat exchanger 19 into the third generator 22. The waste heat medium flows through the third generator 22 in which it heats the solution flowed through 22 and the solution releases the refrigerant vapor provided for the third absorber 20. The concentrated solution of the third generator 22 flows through the second solution pump 10 and the fourth solution heat exchanger 24 into the first absorber 3. The dilute solution of the first absorber 3 flows through the fourth solution heat exchanger 24 into the third absorber 20 in which it absorbs the refrigerant vapor and releases heat to the cooling medium. The dilute solution of the third absorber 20 flows through the fourth solution pump 23 and the third solution heat exchanger 19 into absorption-generator 5 in which it absorbs heat partial vaporization and enters the steam distributing chamber 16. The hierarchy condensation third-type absorption heat pump is thereby formed.

Figure 17:
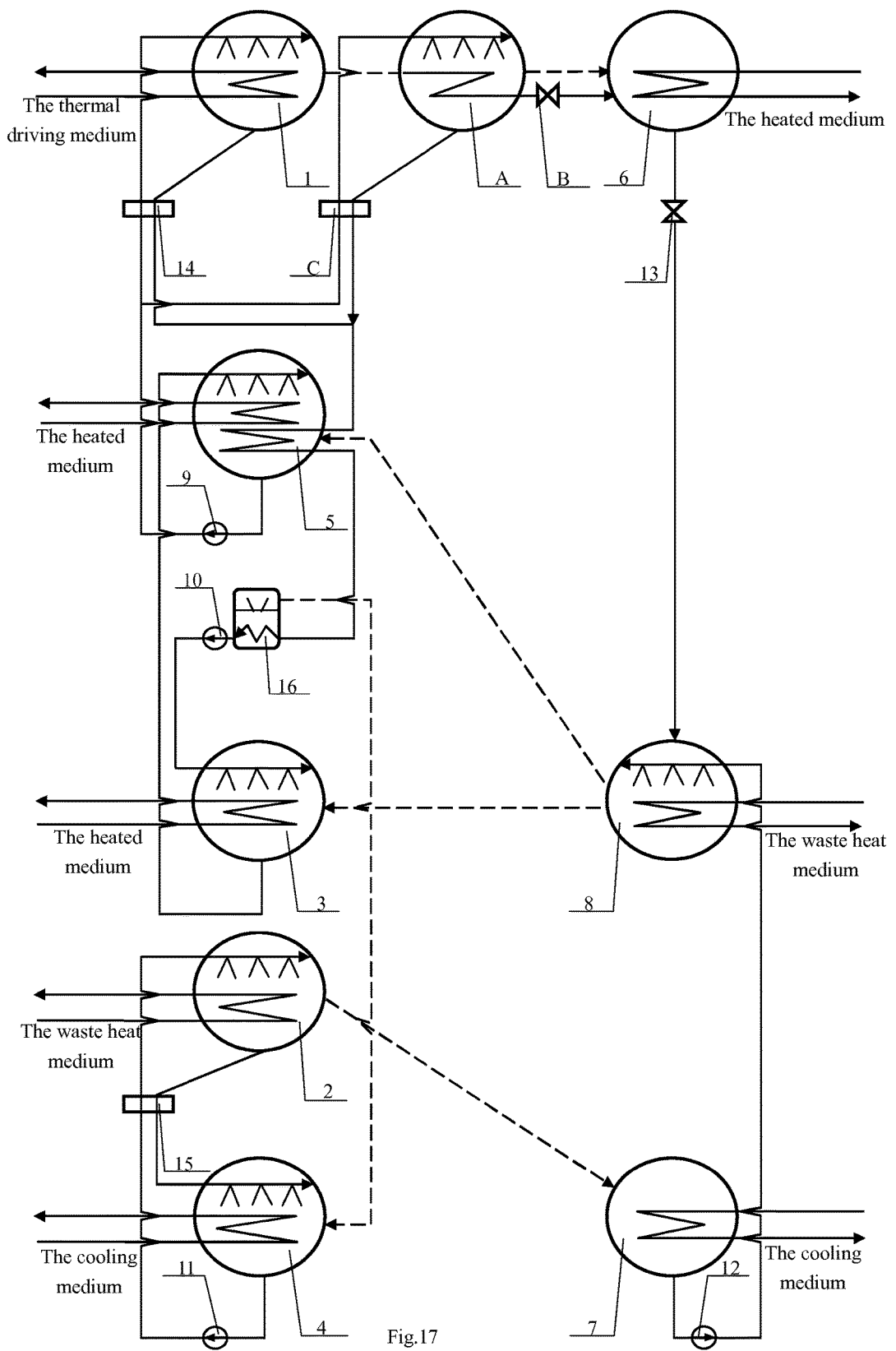
FIG. 17 is the seventeenth structure and flow diagram of the hierarchy condensation third-type absorption heat pump.

The hierarchy condensation third-type absorption heat pump in FIG. 17 can be realized in the following manner:

Structurally, in the hierarchy condensation third-type absorption heat pump shown in FIG. 1, it further adds with a new added generator A, a new added throttle B and a new added solution heat exchanger C. The dilute solution pipe of the first solution pump 9 communicates with the new added generator A via the new added solution heat exchanger C. The concentrated solution pipe of the new added generator A communicates with the steam distributing chamber 16 via the new added solution heat exchanger C and absorption-generator 5. The refrigerant liquid pipe of the new added generator A communicates with the first condenser 6 via the new added throttle B after that the refrigerant vapor channel of the first generator 1 communicates with the new added generator A. The refrigerant vapor channel of the new added generator A communicates with the first condenser 6.

Procedurally, the refrigerant vapor produced by the first generator 1 is provided for the new added generator A using as its thermal driving medium. The dilute solution of absorption-generator 5 flows through the first solution pump 9 and the new added solution heat exchanger C into the new added generator A. The refrigerant vapor flows through the new added generator A in which it heats the solution flowed through A and the solution releases the refrigerant vapor provided for the first condenser 6. The concentrated solution of the new added generator A flows through the new added solution heat exchanger C into absorption-generator 5 in which it absorbs heat partial vaporization and enters the steam distributing chamber 16. The refrigerant vapor flowed through the new added generator A releases heat and becomes refrigerant liquid. Then the refrigerant liquid flows through the new added throttle B into the first condenser 6. The hierarchy condensation third-type absorption heat pump is thereby formed.

The hierarchy condensation third-type absorption heat pump in FIG. 18 can be realized in the following manner:

Structurally, in the hierarchy condensation third-type absorption heat pump shown in FIG. 1, it further adds with a new added generator A, a new added throttle B and a new added solution heat exchanger C. The dilute solution pipe of the first solution pump 9 communicates with the first generator 1 via the first solution heat exchanger 14 and the new added solution heat exchanger C. The concentrated solution pipe of the first generator 1 communicates with the new added generator A via the new added solution heat exchanger C. The concentrated solution pipe of the new added generator A communicates with the steam distributing chamber 16 via the first solution heat exchanger 14 and absorption-generator 5. The refrigerant liquid pipe of the new added generator A communicates with the first condenser 6 via the new added throttle B after that the refrigerant vapor channel of the first generator 1 communicates with the new added generator A. The refrigerant vapor channel of the new added generator A communicates with the first condenser 6.

Procedurally, the refrigerant vapor produced by the first generator 1 is provided for the new added generator A using as its thermal driving medium. The dilute solution of absorption-generator 5 flows through the first solution pump 9, the first solution heat exchanger 14 and the new added solution heat exchanger C into the first generator 1. The concentrated solution of the first generator 1 flows through the new added solution heat exchanger C into the new added generator A. The refrigerant vapor flows through the new added generator A in which it heats the solution flowed through A and the solution releases the refrigerant vapor provided for the first condenser 6. The concentrated solution of the new added generator A flows through the first solution heat exchanger 14 into absorption-generator 5 in which it absorbs heat partial vaporization and enters the steam distributing chamber 16. The refrigerant vapor flowed through the new added generator A releases heat and becomes refrigerant liquid. Then the refrigerant liquid flows through the new added throttle B into the first condenser 6. The hierarchy condensation third-type absorption heat pump is thereby formed.

Figure 19:
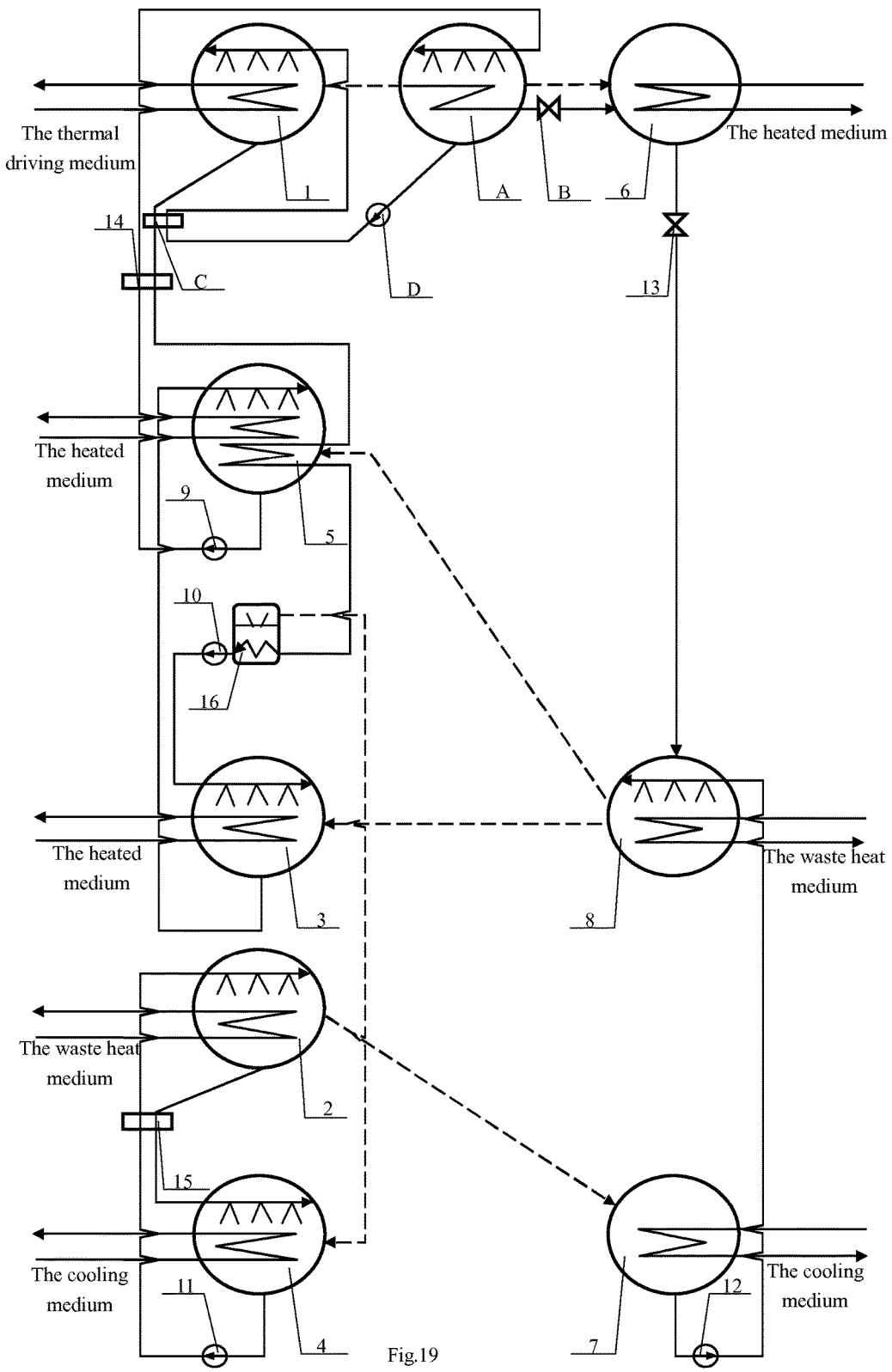
FIG. 19 is the nineteenth structure and flow diagram of the hierarchy condensation third-type absorption heat pump.

The hierarchy condensation third-type absorption heat pump in FIG. 19 can be realized in the following manner:

Structurally, in the hierarchy condensation third-type absorption heat pump shown in FIG. 1, it further adds with a new added generator A, a new added throttle B, a new added solution heat exchanger C and a new added solution pump D. The dilute solution pipe of the first solution pump 9 communicates with the new added generator A via the first solution heat exchanger 14. The concentrated solution pipe of the new added generator A communicates with the first generator 1 via the new added solution pump D and the new added solution heat exchanger C. The concentrated solution pipe of the first generator 1 communicates with the steam distributing chamber 16 via the new added solution heat exchanger C, the first solution heat exchanger 14 and absorption-generator 5. The refrigerant liquid pipe of the new added generator A communicates with the first condenser 6 via the new added throttle B after that the refrigerant vapor channel of the first generator 1 communicates with the new added generator A. The refrigerant vapor channel of the new added generator A communicates with the first condenser 6.

Procedurally, the refrigerant vapor produced by the first generator 1 is provided for the new added generator A using as its thermal driving medium. The dilute solution of absorption-generator 5 flows through the first solution pump 9 and the first solution heat exchanger 14 into the new added generator A. The refrigerant vapor flows through the new added generator A in which it heats the solution flowed through A and the solution releases the refrigerant vapor provided for the first condenser 6. The concentrated solution of the new added generator A flows through the new added solution pump D and the new added solution heat exchanger C into the first generator 1. The refrigerant vapor flowed through the new added generator A releases heat and becomes refrigerant liquid. Then the refrigerant liquid flows through the new added throttle B into the first condenser 6. The concentrated solution of the first generator 1 flows through the new added solution heat exchanger C, the first solution heat exchanger 14 into absorption-generator 5 in which it absorbs heat partial vaporization and enters the steam distributing chamber 16. The hierarchy condensation third-type absorption heat pump is thereby formed.

The hierarchy condensation third-type absorption heat pump in FIG. 20 can be realized in the following manner:

Structurally, in the hierarchy condensation third-type absorption heat pump shown in FIG. 1, it further adds with a new added generator A, a new added absorber E, a new added solution heat exchanger C and a new added solution pump D and cancels the heated medium pipe of absorption-generator 5 communicated with the external. The refrigerant vapor channel of the first generator 1 communicates with the new added absorber E. The dilute solution pipe of the new added absorber E communicates with the new added generator A via the new added solution pump D and the new added solution heat exchanger C. The concentrated solution pipe of the new added generator A communicates with the new added absorber E via the new added solution heat exchanger C. The refrigerant vapor channel of the new added generator A communicates with the first condenser 6. The thermal driving medium pipe of the new added generator A communicates with the external. The heated medium pipe of the new added generator A communicates with the external.

Procedurally, the refrigerant vapor produced by the first generator 1 is provided for the new added absorber E. The dilute solution of the new added absorber E flows through the new added solution pump D and the new added solution heat exchanger C into the new added generator A. The thermal driving medium flows through the new added generator A in which it heats the solution flowed through A and the solution releases the refrigerant vapor provided for the first condenser 6. The concentrated solution of the new added generator A flows through the new added solution heat exchanger C into the new added absorber E in which it absorbs the refrigerant vapor and releases heat to the heated medium. The hierarchy condensation third-type absorption heat pump is thereby formed.

Figure 21:
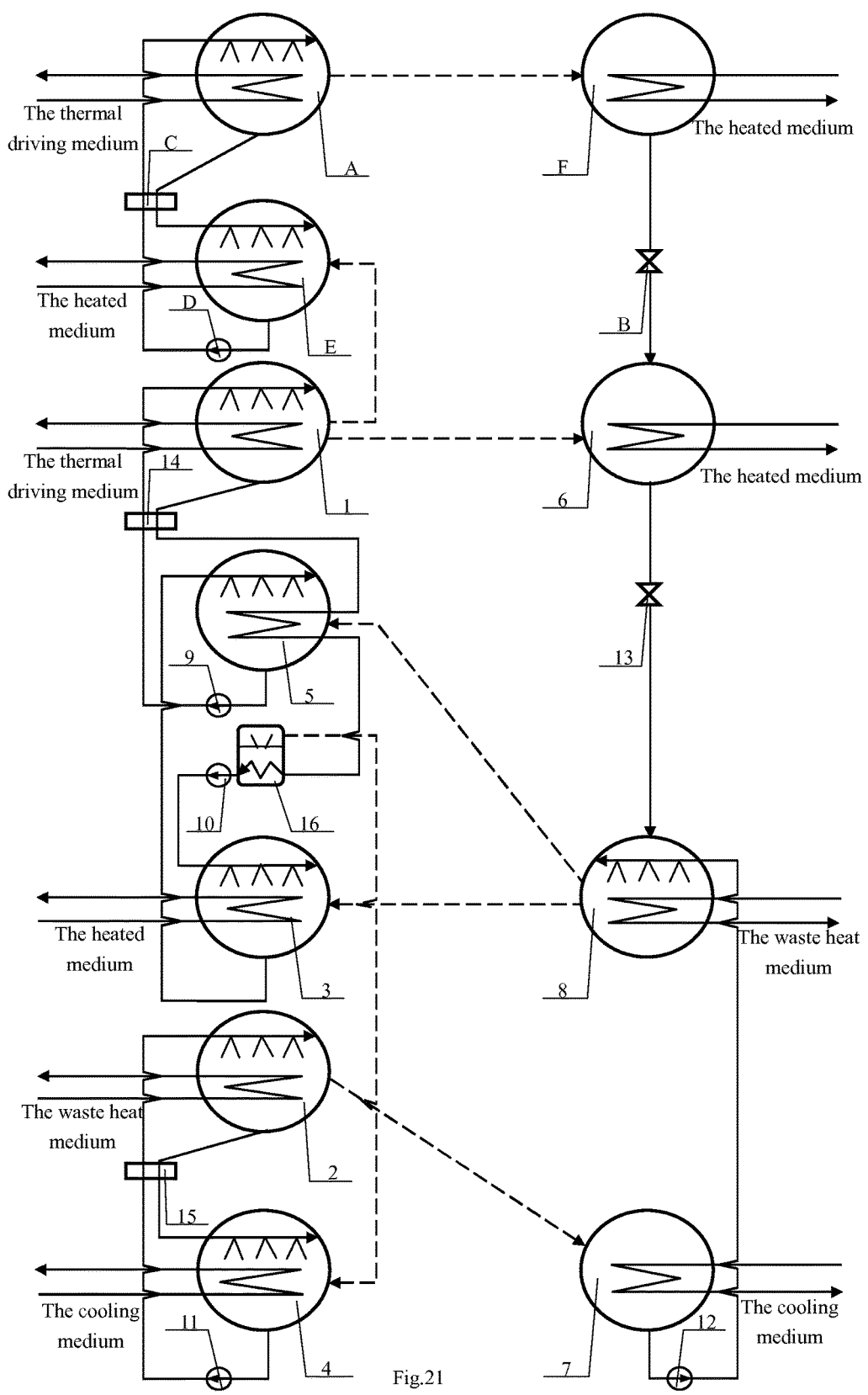
FIG. 21 is the twenty-first structure and flow diagram of the hierarchy condensation third-type absorption heat pump.

The hierarchy condensation third-type absorption heat pump in FIG. 21 can be realized in the following manner:

Structurally, in the hierarchy condensation third-type absorption heat pump shown in FIG. 1, it further adds with a new added generator A, a new added absorber E, a new added solution heat exchanger C, a new added solution pump D, a new added condenser F and a new added throttle B and cancels the heated medium pipe of absorption-generator 5 communicated with the external. The refrigerant vapor channel of the first generator 1 communicated with the new added absorber E. The dilute solution pipe of the new added absorber E communicated with the new added generator A via the new added solution pump D and the new added solution heat exchanger C. The concentrated solution pipe of the new added generator A communicated with the new added absorber E via the new added solution heat exchanger C. The refrigerant vapor channel of the new added generator A communicated with the new added condenser F. The refrigerant liquid pipe of the new added condenser F communicated with the first condenser 6 via the new added throttle B. The thermal driving medium pipe of the new added generator A communicated with the external. The heated medium pipe of the new added absorber E and the new added condenser F communicated with the external.

Procedurally, the refrigerant vapor produced by the first generator 1 is provided for the first condenser 6 and the new added absorber E respectively. The dilute solution of the new added absorber E flows through the new added solution pump D and the new added solution heat exchanger C into the new added generator A. The thermal driving medium flows through the new added generator A in which it heats the solution flowed through A and the solution releases the refrigerant vapor provided for the new added condenser F. The concentrated solution of the new added generator A flows through the new added solution heat exchanger C into the new added absorber E in which it absorbs the refrigerant vapor and releases heat to the heated medium. The refrigerant vapor of the new added condenser F releases heat to the cooling medium and becomes the refrigerant liquid. The refrigerant liquid of the new added condenser F flows through the new added throttle B into the first condenser 6. The hierarchy condensation third-type absorption heat pump is thereby formed.

Figure 20:
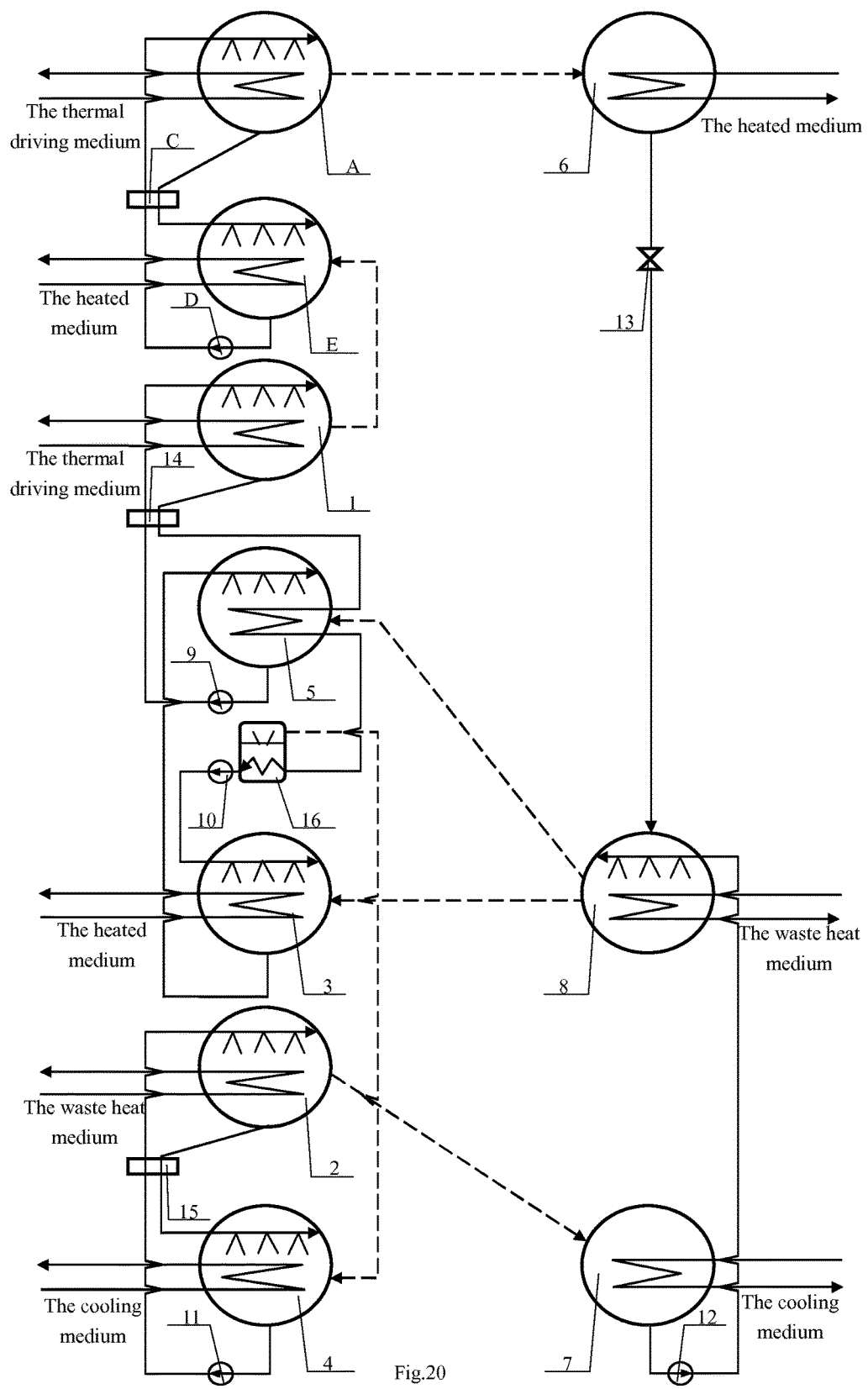
FIG. 20 is the twentieth structure and flow diagram of the hierarchy condensation third-type absorption heat pump.
Figure 22:
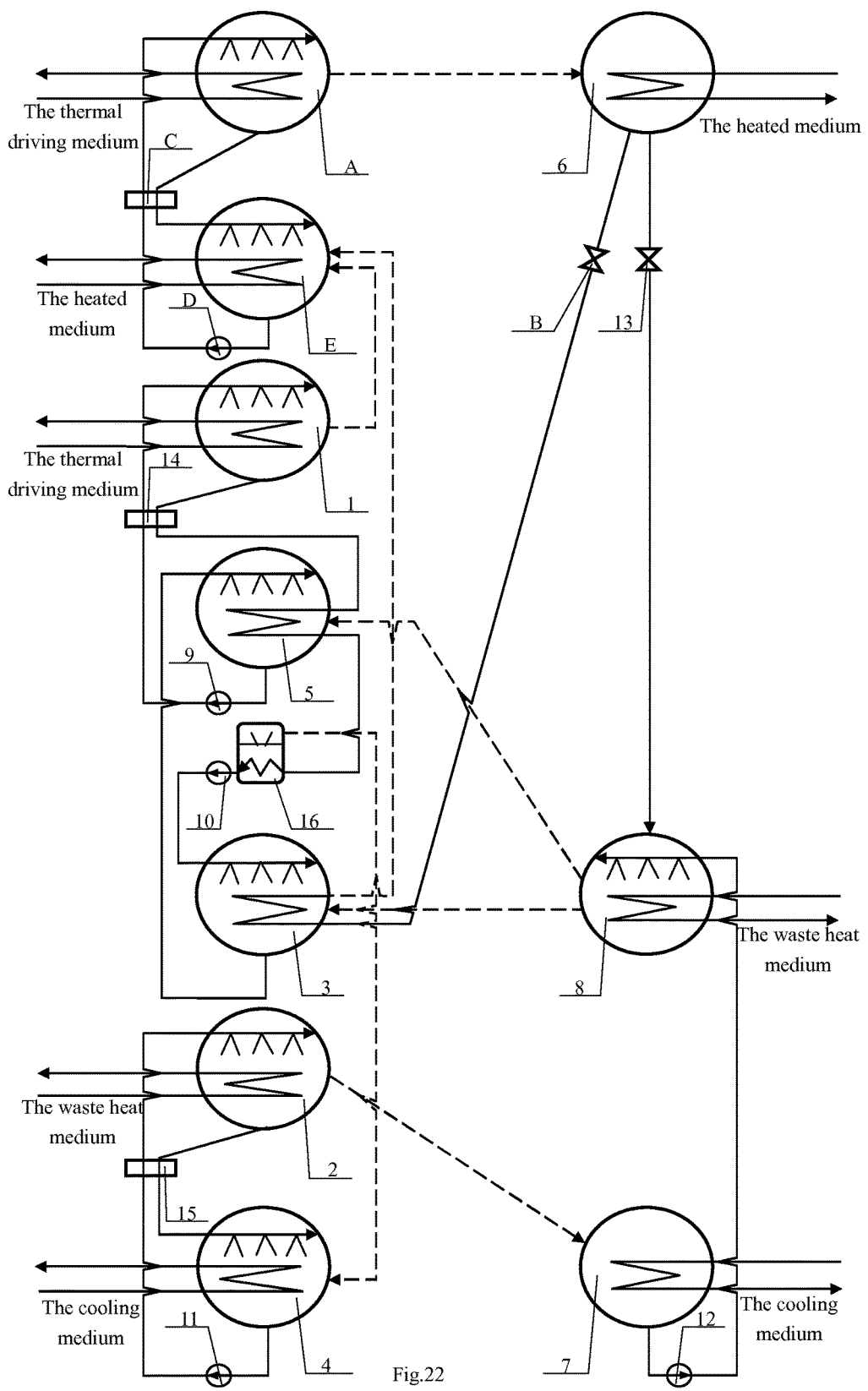
FIG. 22 is the twenty-second structure and flow diagram of the hierarchy condensation third-type absorption heat pump.

The hierarchy condensation third-type absorption heat pump in FIG. 22 can be realized in the following manner:

In the hierarchy condensation third-type absorption heat pump shown in FIG. 20, it further adds with a new added throttle B and cancels the heated medium pipe of the first absorber 3 connected external. The refrigerant liquid pipe of the first condenser 6 communicated with the first absorber 3 via the new added throttle B after that the refrigerant vapor channel of the first absorber 3 communicated with the new added absorber E; The refrigerant liquid of the first condenser 6 is divided in two. The first of the refrigerant liquid flows through the throttle valve 13 into evaporator 8. The second of the refrigerant liquid flows through the new added throttle B into the first absorber 3 in which it absorbs heat and becomes the refrigerant vapor provided for the new added absorber E. The hierarchy condensation third-type absorption heat pump is thereby formed.

Figure 23:
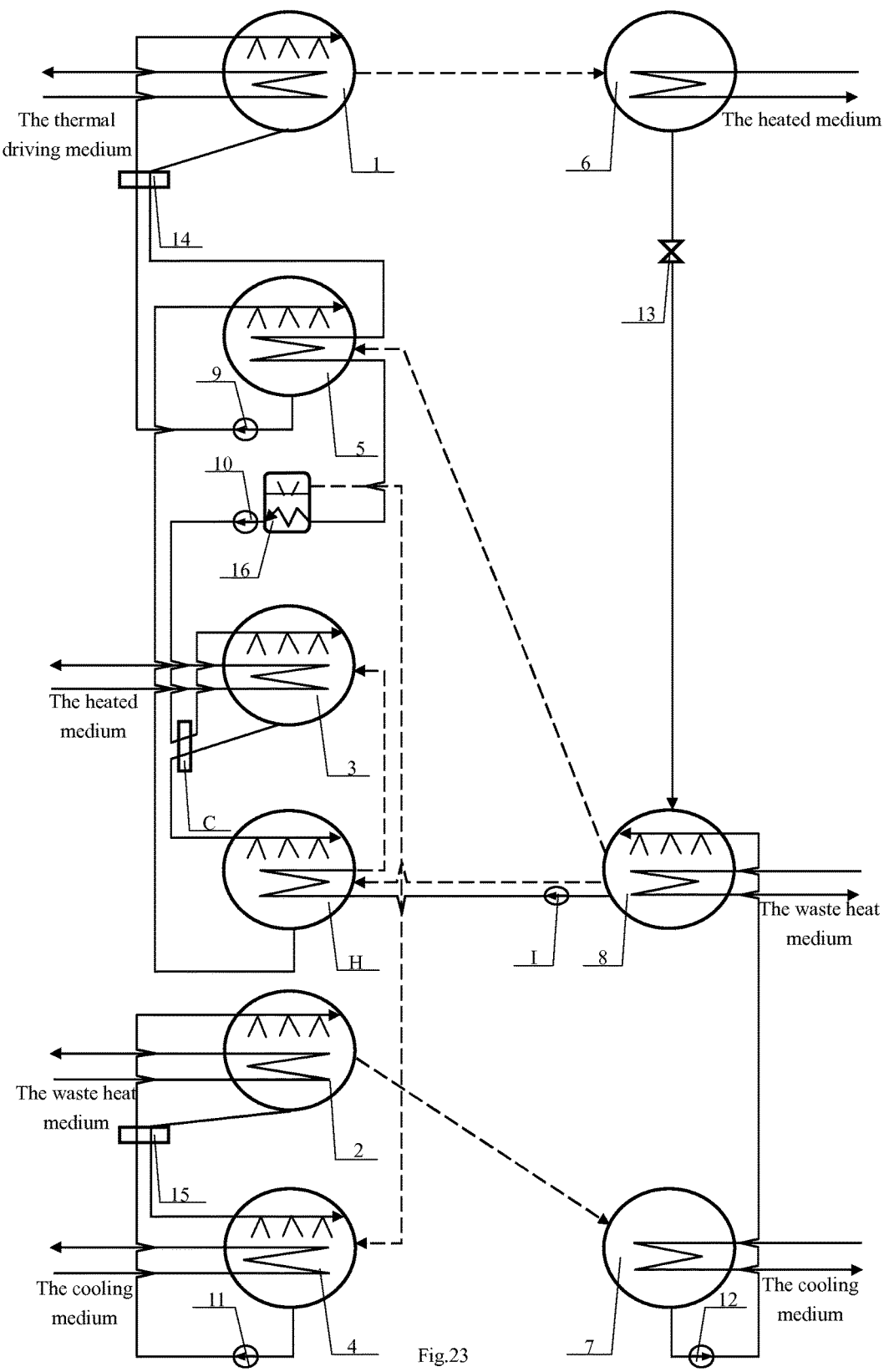
FIG. 23 is the twenty-third structure and flow diagram of the hierarchy condensation third-type absorption heat pump.

The hierarchy condensation third-type absorption heat pump in FIG. 23 can be realized in the following manner:

Structurally, in the hierarchy condensation third-type absorption heat pump shown in FIG. 1, it further adds with a new added refrigerant liquid pump I, a new added solution heat exchanger C and a new added absorption-generator H and cancels the heated medium pipe of absorption-generator 5 communicated with the external. The concentrated solution pipe of the steam distributing chamber 16 communicated with the first absorber 3 via the second solution pump 10 and the new added solution heat exchanger C. The dilute solution pipe of the first absorber 3 communicated with the new added absorption-generator H via the new added solution heat exchanger C. The dilute solution pipe of the new added absorption-generator H communicated with absorption-generator 5. The refrigerant vapor channel of evaporator 8 communicated with the new added absorption-generator H. The refrigerant liquid pipe of evaporator 8 communicated with the new added absorption-generator H via the new added refrigerant liquid pump I after that the refrigerant vapor channel of the new added absorption-generator H communicated with the first absorber 3.

Procedurally, the concentrated solution of the steam distributing chamber 16 flows through the second solution pump 10 and the new added solution heat exchanger C into the first absorber 3 in which it absorbs the refrigerant vapor and releases heat to the heated medium. The dilute solution of the first absorber 3 flows through the new added solution heat exchanger C into the new added absorption-generator H in which it absorbs the refrigerant vapor and releases heat to the solution flowed through H. The dilute solution of the new added absorption-generator H enters absorption-generator 5. The refrigerant liquid of evaporator 8 is divided in two. The first of the refrigerant liquid absorbs waste heat and becomes the refrigerant vapor provided for the new added absorption-generator H and the absorption-generator 5 respectively. The second of the refrigerant liquid flows through the new added refrigerant liquid pump I into the new added absorption-generator H in which it absorbs heat and becomes the refrigerant vapor provided for the first absorber 3. The hierarchy condensation third-type absorption heat pump is thereby formed.

Figure 24:
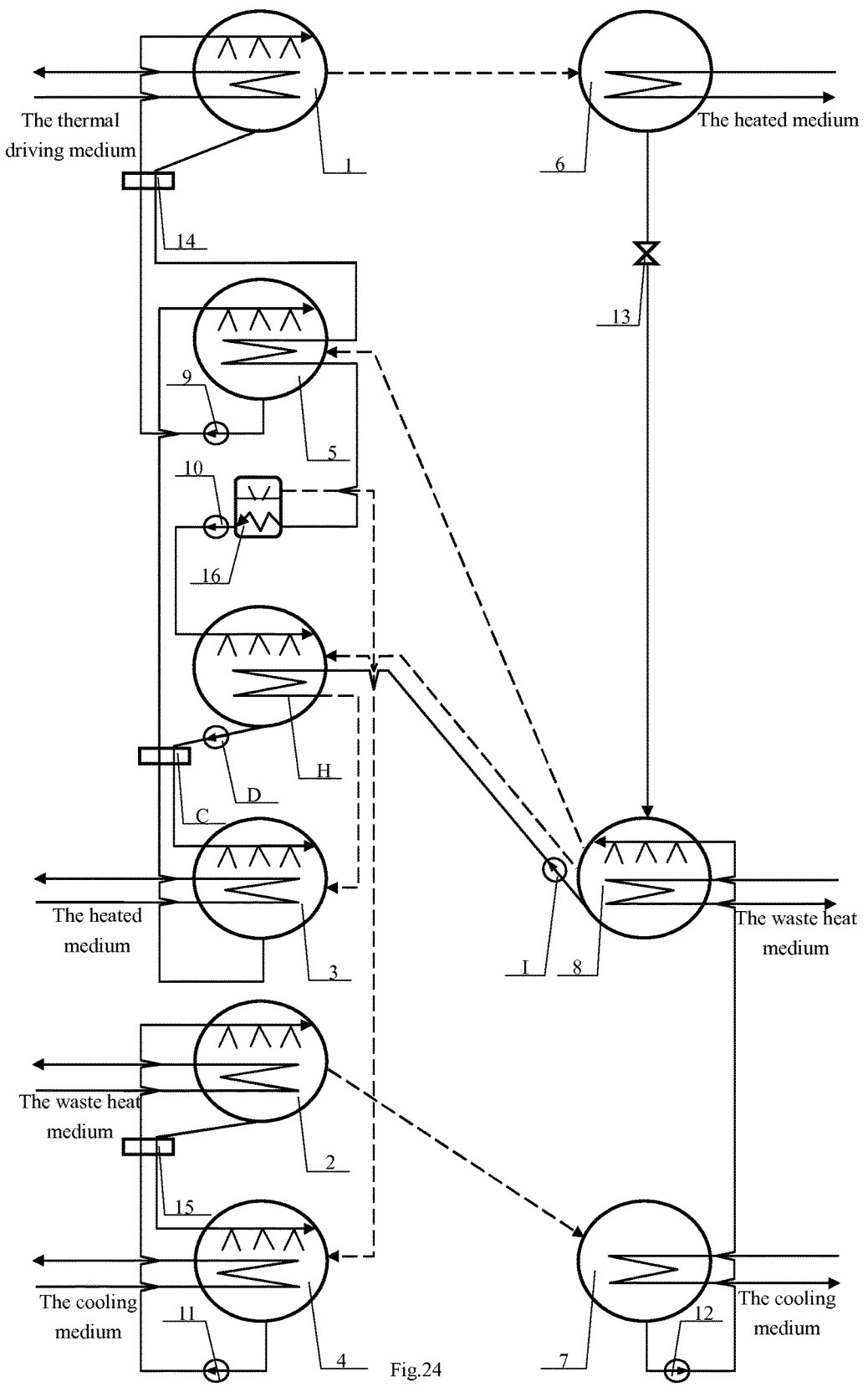
FIG. 24 is the twenty-fourth structure and flow diagram of the hierarchy condensation third-type absorption heat pump.

The hierarchy condensation third-type absorption heat pump in FIG. 24 can be realized in the following manner:

Structurally, in the hierarchy condensation third-type absorption heat pump shown in FIG. 1, it further adds with a new added refrigerant liquid pump I, a new added solution heat exchanger C, a new added absorption-generator H and a new added solution pump D and cancels the heated medium pipe of absorption-generator 5 communicated with the external. The concentrated solution pipe of the steam distributing chamber 16 communicated with the new added absorption-generator H via the second solution pump 10. The dilute solution pipe of the new added absorption-generator H communicated with the first absorber 3 via the new added solution pump D and the new added solution heat exchanger C. The dilute solution pipe of the first absorber 3 communicated with absorption-generator 5 via the new added solution heat exchanger C. The refrigerant vapor channel of evaporator 8 communicated with the new added absorption-generator H. The refrigerant liquid pipe of evaporator 8 communicated with the new added absorption-generator H via the new added refrigerant liquid pump I after that the refrigerant vapor channel of the new added absorption-generator H communicated with the first absorber 3.

Procedurally, the concentrated solution of the steam distributing chamber 16 flows through the second solution pump 10 into the new added absorption-generator H in which it absorbs the refrigerant vapor and releases heat to the refrigerant liquid flowed through H. The dilute solution of the new added absorption-generator H flows through the new added solution pump D and the new added solution heat exchanger C into the first absorber 3 in which it absorbs the refrigerant vapor and releases heat to the heated medium. The dilute solution of the first absorber 3 flows through the new added solution heat exchanger C into absorption-generator 5. The refrigerant liquid of evaporator 8 is divided in two. The first of the refrigerant liquid absorbs waste heat and becomes the refrigerant vapor provided for the new added absorption-generator H and the absorption-generator 5 respectively. The second of the refrigerant liquid flows through the new added refrigerant liquid pump I into the new added absorption-generator H in which it absorbs heat and becomes the refrigerant vapor provided for the first absorber 3. The hierarchy condensation third-type absorption heat pump is thereby formed.

Figure 25:
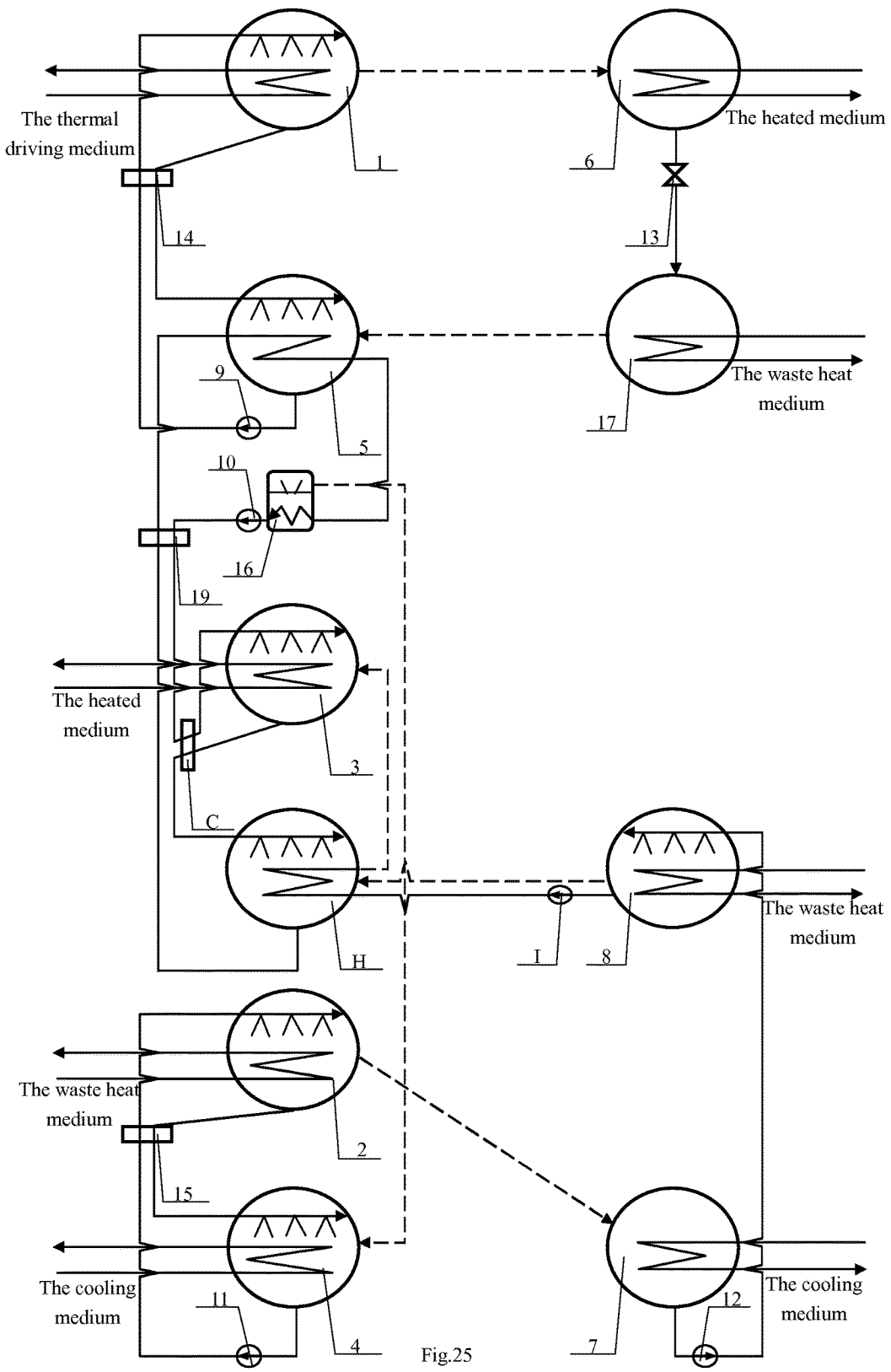
FIG. 25 is the twenty-fifth structure and flow diagram of the hierarchy condensation third-type absorption heat pump.

The hierarchy condensation third-type absorption heat pump in FIG. 25 can be realized in the following manner:

Structurally, in the hierarchy condensation third-type absorption heat pump shown in FIG. 5, it further adds with a new added refrigerant liquid pump I, a new added solution heat exchanger C and a new added absorption-generator H. The concentrated solution pipe of the steam distributing chamber 16 communicated with the first absorber 3 via the second solution pump 10, the third solution heat exchanger 19 and the new added solution heat exchanger C. The dilute solution pipe of the first absorber 3 communicated with the new added absorption-generator H via the new added solution heat exchanger C. The dilute solution pipe of the new added absorption-generator H communicated with the steam distributing chamber 16 via the third solution heat exchanger 19 and absorption-generator 5. The refrigerant vapor channel of evaporator 8 communicated with the new added absorption-generator H. The refrigerant liquid pipe of evaporator 8 communicated with the new added absorption-generator H via the new added refrigerant liquid pump I after that the refrigerant vapor channel of the new added absorption-generator H communicated with the first absorber 3.

Procedurally, the concentrated solution of the steam distributing chamber 16 flows through the second solution pump 10, the third solution heat exchanger 19 and the new added solution heat exchanger C into the first absorber 3 in which it absorbs the refrigerant vapor and releases heat to the heated medium. The dilute solution of the first absorber 3 flows through the new added solution heat exchanger C into the new added absorption-generator H in which it absorbs the refrigerant vapor and releases heat to the refrigerant liquid flowed through H. The dilute solution of the new added absorption-generator H flows through the third solution heat exchanger 19 into absorption-generator 5 in which it absorbs heat partial vaporization and enters the steam distributing chamber 16. The refrigerant liquid of evaporator 8 is divided in two. The first of the refrigerant liquid absorbs waste heat and becomes the refrigerant vapor provided for the new added absorption-generator H. The second of the refrigerant liquid flows through the new added refrigerant liquid pump I into the new added absorption-generator H in which it absorbs heat and becomes the refrigerant vapor provided for the first absorber 3. The hierarchy condensation third-type absorption heat pump is thereby formed.

Figure 26:
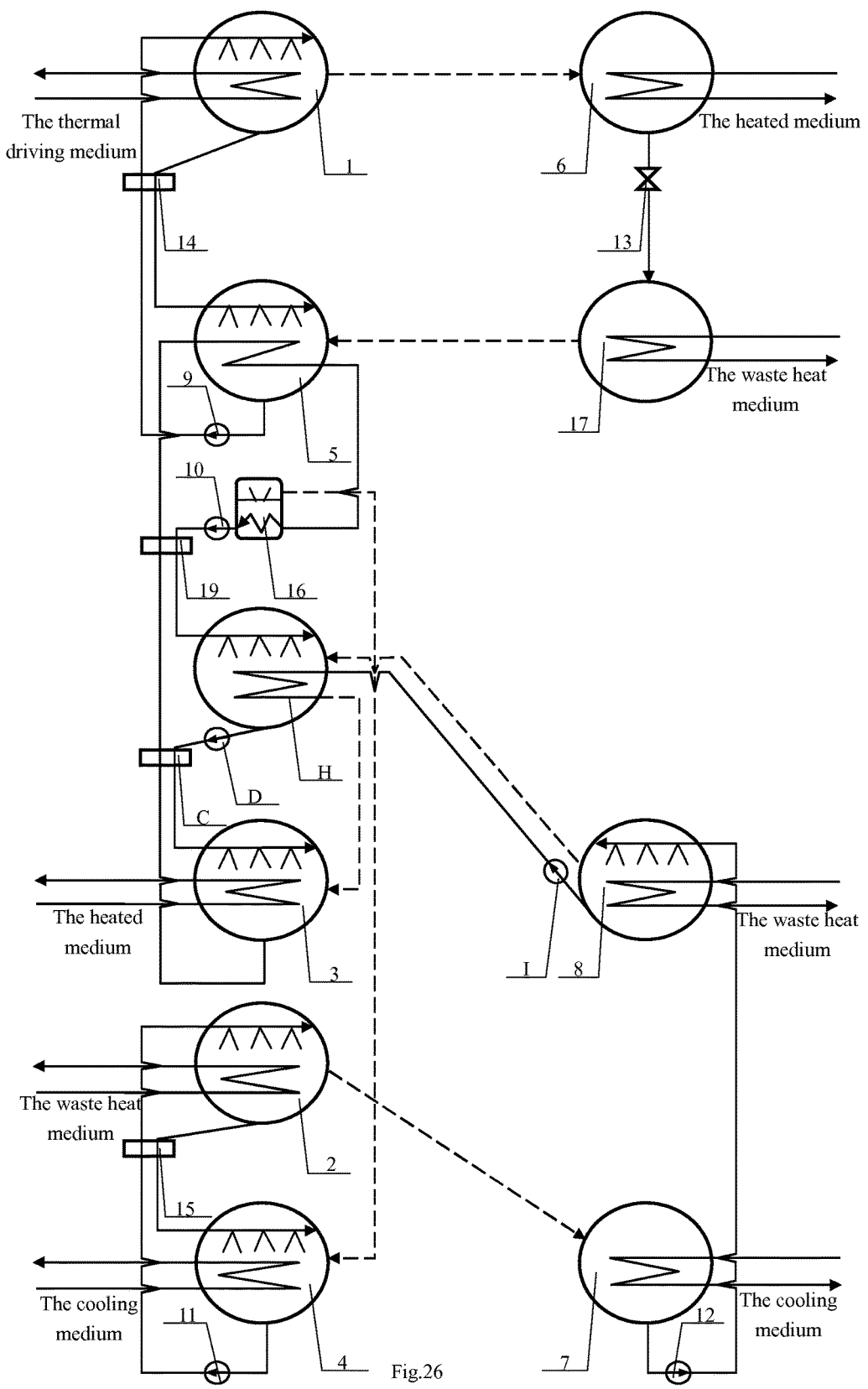
FIG. 26 is the twenty-sixth structure and flow diagram of the hierarchy condensation third-type absorption heat pump.

The hierarchy condensation third-type absorption heat pump in FIG. 26 can be realized in the following manner:

Structurally, in the hierarchy condensation third-type absorption heat pump shown in FIG. 5, it further adds with a new added refrigerant liquid pump I, a new added solution heat exchanger C, a new added absorption-generator H and a new added solution pump D. The concentrated solution pipe of the steam distributing chamber 16 communicated with the new added absorption-generator H via the second solution pump 10 and the third solution heat exchanger 19. The dilute solution pipe of the new added absorption-generator H communicated with the first absorber 3 via the new added solution pump D and the new added solution heat exchanger C. The dilute solution pipe of the first absorber 3 communicated with the steam distributing chamber 16 via the new added solution heat exchanger C, the third solution heat exchanger 19 and absorption-generator 5. The refrigerant vapor channel of evaporator 8 communicated with the new added absorption-generator H. The refrigerant liquid pipe of evaporator 8 communicated with the new added absorption-generator H via the new added refrigerant liquid pump I after that the refrigerant vapor channel of the new added absorption-generator H communicated with the first absorber 3.

Procedurally, the concentrated solution of the steam distributing chamber 16 flows through the second solution pump 10 and the third solution heat exchanger 19 into the new added absorption-generator H in which it absorbs the refrigerant vapor and releases heat to the refrigerant liquid flowed through H. The dilute solution of the new added absorption-generator H flows through the new added solution pump D and the new added solution heat exchanger C into the first absorber 3 in which it absorbs the refrigerant vapor and releases heat to the heated medium. The dilute solution of the first absorber 3 flows through the new added solution heat exchanger C and the third solution heat exchanger 19 into absorption-generator 5 in which it absorbs heat partial vaporization and enters the steam distributing chamber 16. The refrigerant liquid of evaporator 8 is divided in two. The first of the refrigerant liquid absorbs waste heat and becomes the refrigerant vapor provided for the new added absorption-generator H. The second of the refrigerant liquid flows through the new added refrigerant liquid pump I into the new added absorption-generator H in which it absorbs heat and becomes the refrigerant vapor provided for the first absorber 3. The hierarchy condensation third-type absorption heat pump is thereby formed.

Figure 18:
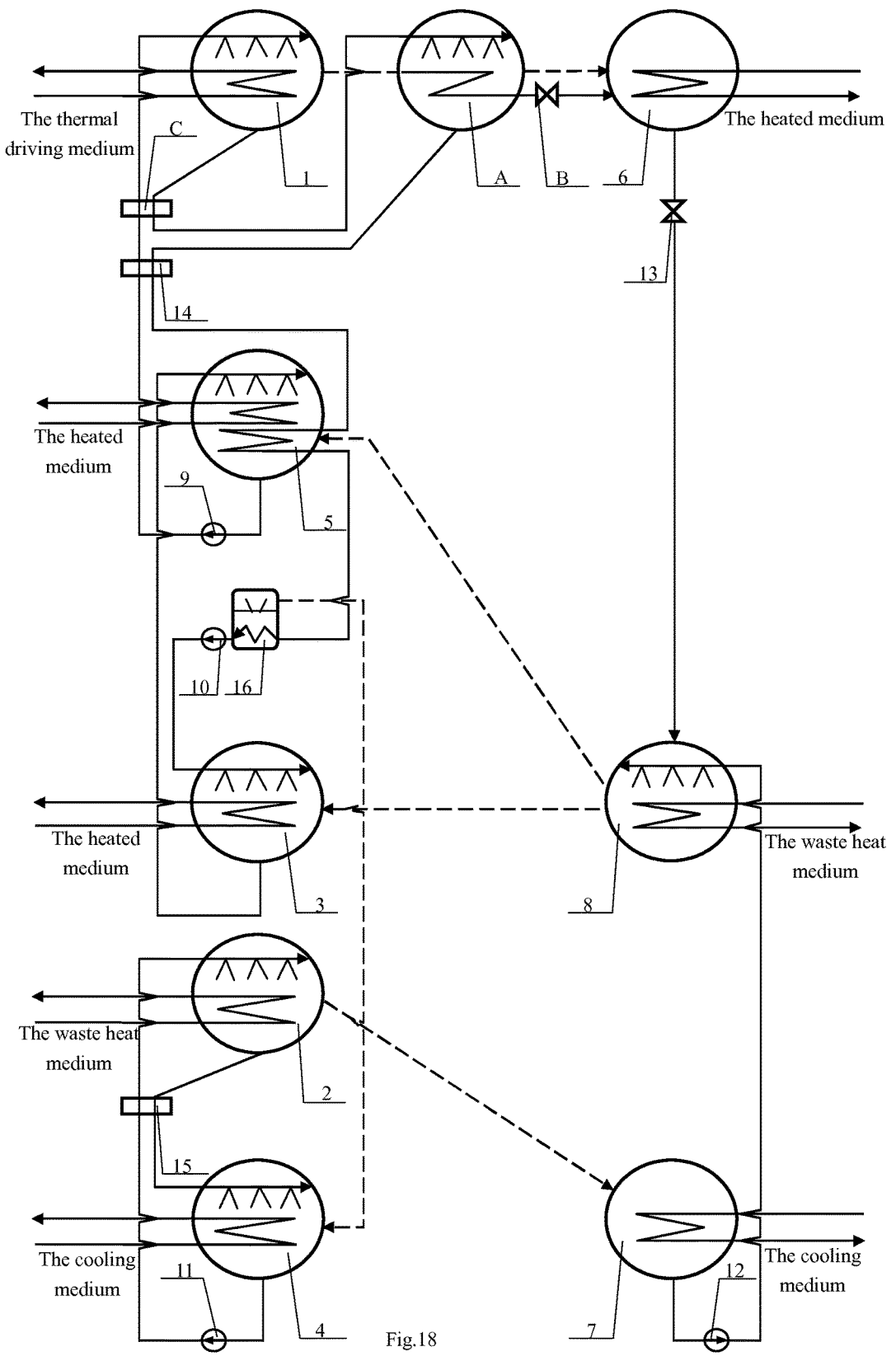
FIG. 18 is the eighteenth structure and flow diagram of the hierarchy condensation third-type absorption heat pump.
Figure 27:
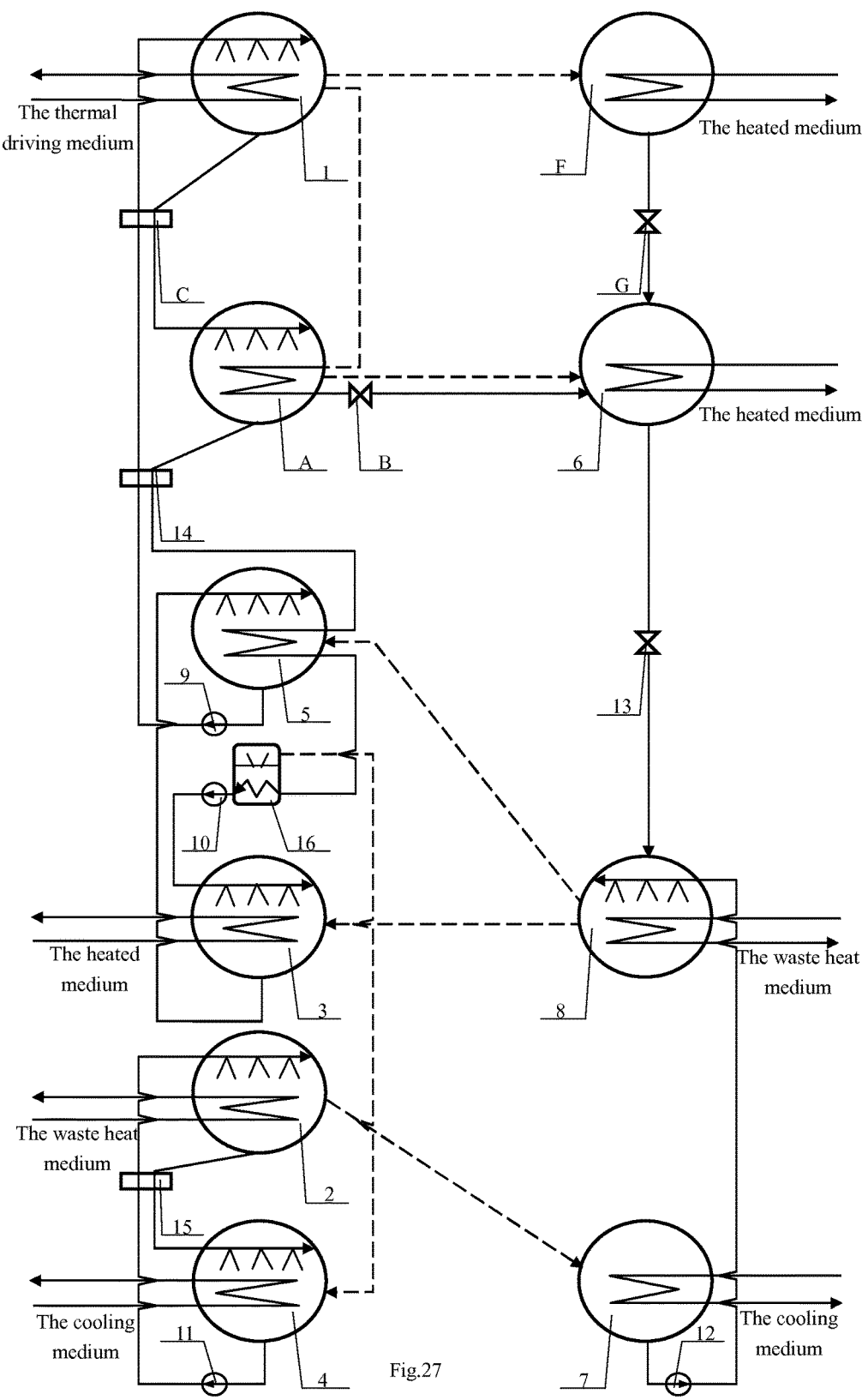
FIG. 27 is the twenty-seventh structure and flow diagram of the hierarchy condensation third-type absorption heat pump.

The hierarchy condensation third-type absorption heat pump in FIG. 27 can be realized in the following manner:

In the hierarchy condensation third-type absorption heat pump shown in FIG. 18, it further adds with a new added condenser F and a new added second throttle G and cancels the heated medium pipe of absorption-generator 5 connected the external. The refrigerant vapor channel of the first generator 1 communicated with the new added condenser F. The refrigerant liquid pipe of the new added condenser F communicated with the first condenser 6 via the new added second throttle G. The heated medium pipe of the new added condenser F communicated with the external. The refrigerant vapor produced by the first generator 1 is provided for the new added generator A and the new added condenser F respectively. The refrigerant vapor of the new added condenser F releases heat to the heated medium and becomes refrigerant liquid. The refrigerant liquid of the new added condenser F flows through the new added second throttle G into the first condenser 6. The hierarchy condensation third-type absorption heat pump is thereby formed.

Figure 28:
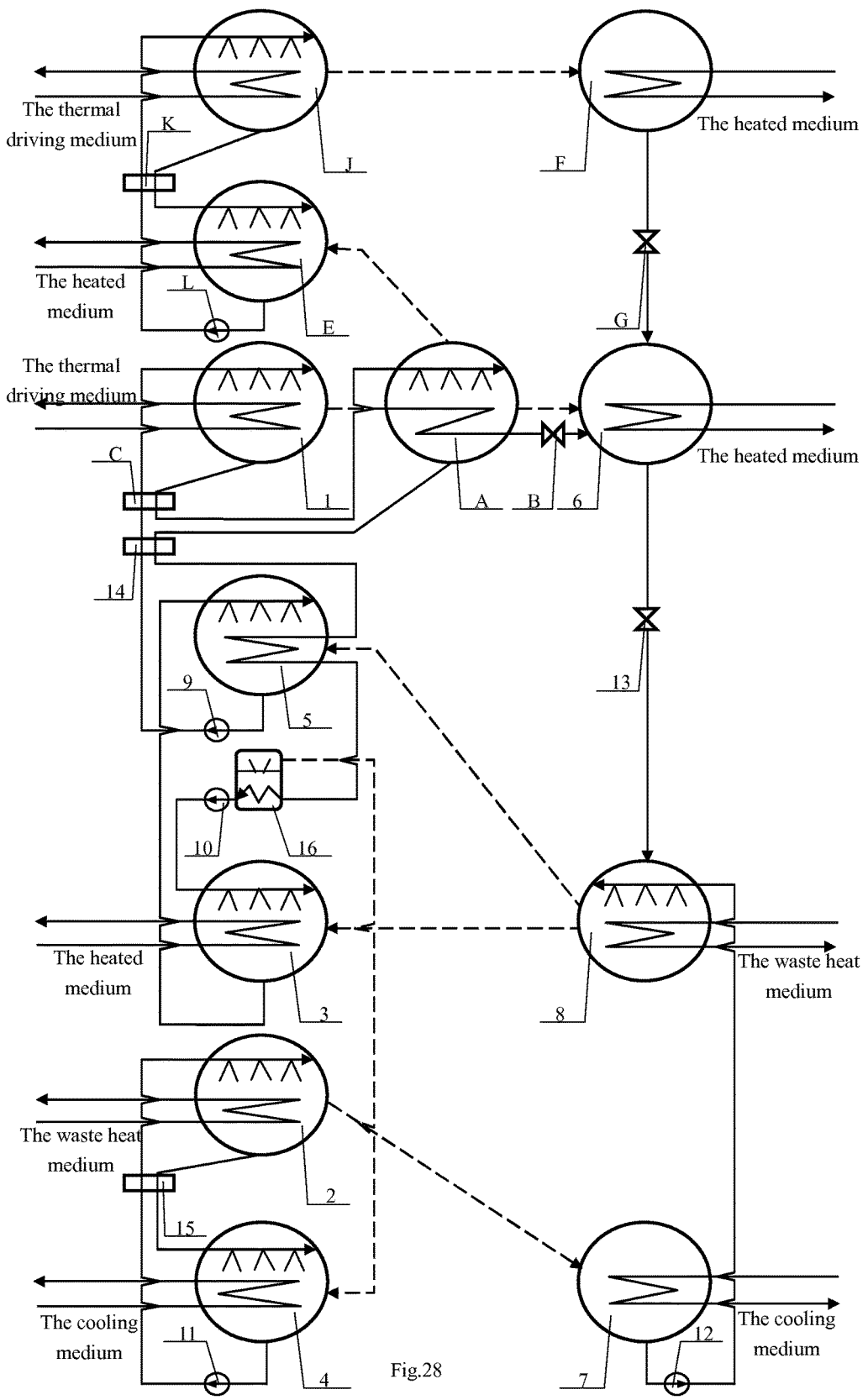
FIG. 28 is the twenty-eighth structure and flow diagram of the hierarchy condensation third-type absorption heat pump.

The hierarchy condensation third-type absorption heat pump in FIG. 28 can be realized in the following manner:

Structurally, in the hierarchy condensation third-type absorption heat pump shown in FIG. 18, it further adds with a new added second generator J, a new added absorber E, a new added second solution heat exchanger K, a new added second solution pump L, a new added condenser F and a new added second throttle G and cancels the heated medium pipe of absorption-generator 5 connected the external. The refrigerant vapor channel of the new added generator A communicated with the new added absorber E. The dilute solution pipe of the new added absorber E communicated with the new added second generator J via the new added second solution pump L and the new added second solution heat exchanger K. The concentrated solution pipe of the new added second generator J communicated with the new added absorber E via the new added second solution heat exchanger K. The refrigerant vapor channel of the new added second generator J communicated with the new added condenser F. The refrigerant liquid pipe of the new added condenser F communicated with the first condenser 6 via the new added second throttle G. The thermal driving medium pipe of the new added second generator J communicated with the external. The heated medium pipe of the new added absorber E and the new added condenser F communicated with the external.

Procedurally, the refrigerant vapor produced by the first generator 1 is provided for the first condenser 6 and the new added absorber E respectively. The dilute solution of the new added absorber E flows through the new added second solution pump L and the new added second solution heat exchanger K into the new added second generator J. The thermal driving medium flows through the new added second generator J in which it heats the solution flowed through J and the solution releases the refrigerant vapor provided for the new added condenser F. The concentrated solution of the new added second generator J flows through the new added second solution heat exchanger K into the new added absorber E in which it absorbs the refrigerant vapor and releases heat to the heated medium. The refrigerant vapor of the new added condenser F releases heat to the heated medium and becomes refrigerant liquid. The refrigerant liquid of the new added condenser F flows through the new added second throttle G into the first condenser 6. The hierarchy condensation third-type absorption heat pump is thereby formed.

Figure 29:
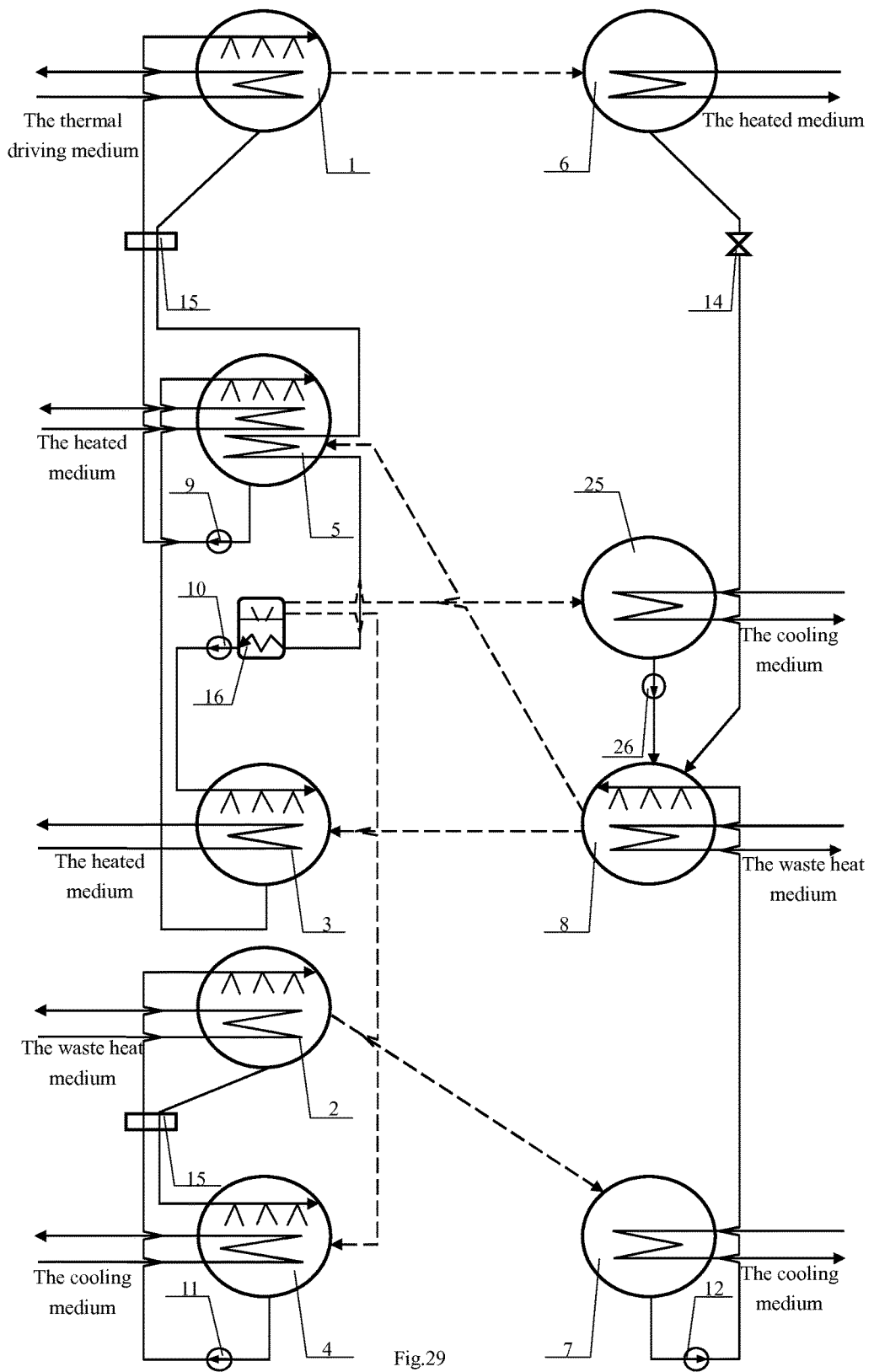
FIG. 29 is the twenty-ninth structure and flow diagram of the hierarchy condensation third-type absorption heat pump.

The hierarchy condensation third-type absorption heat pump in FIG. 29 can be realized in the following manner:

In the hierarchy condensation third-type absorption heat pump shown in FIG. 1, it further adds with the third condenser 25 and the second refrigerant liquid pump 26. The refrigerant vapor channel of the steam distributing chamber 16 communicated with the third condenser 25. The refrigerant liquid pipe of the third condenser 25 communicated with evaporator 8 via the second refrigerant liquid pump 26. The cooling medium pipe of the third condenser 25 communicated with the external. The refrigerant vapor produced by the steam distributing chamber 16 is provided for the second absorber 4 and the third condenser 25 respectively. The refrigerant vapor of the third condenser 25 releases heat to the heated medium and becomes refrigerant liquid. The refrigerant liquid of the third condenser 25 flows through the second refrigerant liquid pump 26 into evaporator 8. The hierarchy condensation third-type absorption heat pump is thereby formed.

Figure 30:
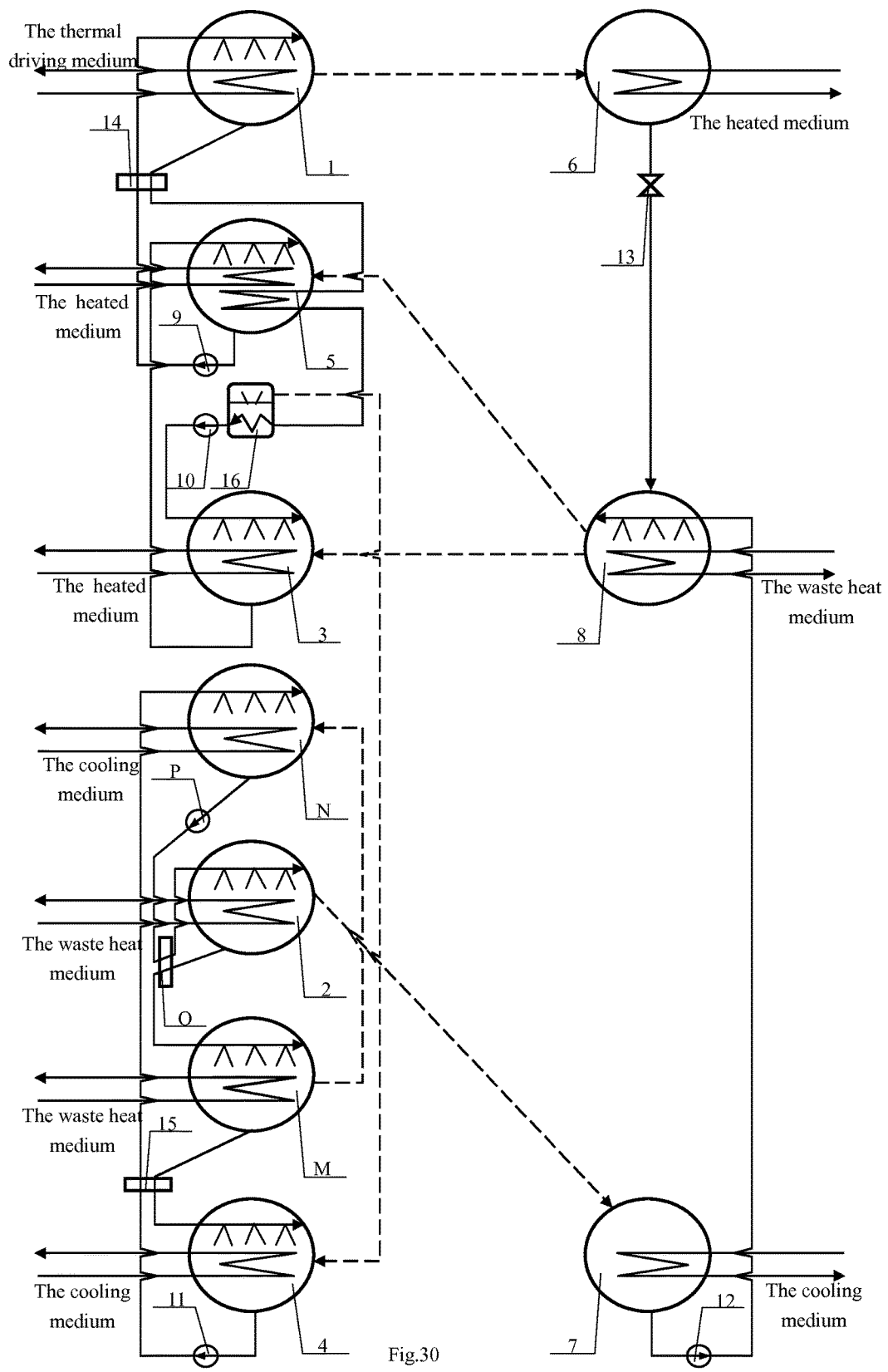
FIG. 30 is the thirtieth structure and flow diagram of the hierarchy condensation third-type absorption heat pump.

The hierarchy condensation third-type absorption heat pump in FIG. 30 can be realized in the following manner:

Structurally, in the hierarchy condensation third-type absorption heat pump shown in FIG. 18, it further adds with a re-added generator M, a re-added absorber N, a re-added solution heat exchanger O and a re-added solution pump P. The dilute solution pipe of the second absorber 4 communicated with the re-added absorber N via the third solution pump 11 and the second solution heat exchanger 15. The dilute solution pipe of the re-added absorber N communicated with the second generator 2 via the re-added solution pump P and the re-added solution heat exchanger O. The concentrated solution pipe of the second generator 2 communicated with the re-added generator M via the re-added solution heat exchanger O. The concentrated solution pipe of the re-added generator M communicated with the second absorber 4 via the second solution heat exchanger 15. The refrigerant vapor channel of the re-added generator M communicated with the re-added absorber N. The waste heat medium pipe of the re-added generator M communicated with the external. The cooling medium pipe of the re-added absorber N communicated with external.

Procedurally, the dilute solution of the second absorber 4 flows through the third solution pump 11 and the second solution heat exchanger 15 into the re-added absorber N in which it absorbs the refrigerant vapor and releases heat to the cooling medium. The dilute solution of the re-added absorber N flows through the re-added solution pump P and the re-added solution heat exchanger O into the second generator 2. The concentrated solution of the second generator 2 flows through the re-added solution heat exchanger O into the re-added generator M. The thermal driving medium flows through the re-added generator M in which it heats the solution flowed through M and the solution releases the refrigerant vapor provided for the re-added absorber N. The refrigerant liquid of the re-added generator M flows through the second solution heat exchanger 15 into the second absorber 4. The hierarchy condensation third-type absorption heat pump is thereby formed.

The Effect Achieved by the Invention Technology:

The hierarchy condensation third-type absorption heat pump provided by the invention has the effect and advantages as follows:

1. The waste heat medium temperature is promoted hierarchically by hierarchy condensation. The temperature is improved higher. The low temperature waste heat medium temperature is used more deeply.

2. The temperature reducing process of a part of waste heat load is completed by the second absorber, the second condenser and the re-added absorber. It is good for reducing the heat transfer temperature difference, reducing the irreversible factors and promoting the thermodynamic perfection.

3. The waste heat is used respectively in the absorption-generator, the second generator and evaporator. It is good for using deeply of the waste heat resources.

4. The hierarchy condensation third-type absorption heat pump with regenerative cooling side can use the waste heat medium deeply and use different grade waste heat. The performance index of this kind of absorption heat pump is reasonable and sequential changes in a certain range.

5. The hierarchy condensation third-type absorption heat pump with regenerative heat supply side can use the high temperature thermal driving medium deeply and use different grade high temperature thermal driving mediums. The performance index of this kind of absorption heat pump is reasonable and sequential changes in a certain range.

6. When the cooling medium temperature is changing, the hierarchy condensation third-type absorption heat pump including the third condenser has a higher waste heat utilization ratio as the waste heat temperature is changing in different stage process.

In a ward, the hierarchy condensation third-type absorption heat pump enrich the type and process of absorption heat pump, realize the hierarchical promotion of waste heat temperature, extends the utilization range of absorption heat pump and possess the creativity, novelty and practicability.

The invention claimed is:

1. A hierarchy condensation third-type absorption heat pump comprising a first generator (1), a second generator (2), a first absorber (3), a second absorber (4), an absorption-generator (5), a first condenser (6), a second condenser (7), an evaporator (8), a first solution pump (9), a second solution pump (10), a third solution pump (11), a refrigerant liquid pump (12), a throttle valve (13), a first solution heat exchanger (14), a second solution heat exchanger (15) and a steam distributing chamber (16), wherein a dilute solution pipe of the second absorber (4) communicates with the second generator (2) via the third solution pump (11) and the second solution heat exchanger (15), a concentrated solution pipe of the second generator (2) communicates with the second absorber (4) via the second solution heat exchanger (15), a refrigerant vapor channel of the second generator (2) communicates with the second condenser (7), a refrigerant liquid pipe of the second condenser (7) communicates with the evaporator (8) via the refrigerant liquid pump (12), a refrigerant vapor channel of the evaporator (8) communicates with the first absorber (3) and the absorption-generator (5), a dilute solution pipe of the first absorber (3) communicates with the absorption-generator (5), a dilute solution pipe of the absorption-generator (5) communicates with the first generator (1) via the first solution pump (9) and the first solution heat exchanger (14), a concentrated solution pipe of the first generator (1) communicates with the steam distributing chamber (16) via the second solution heat exchanger (14) and the absorption-generator (5), a concentrated solution pipe of the steam distributing chamber (16) communicates with the first absorber (3) via the second solution pump (10), a refrigerant vapor channel of the steam distributing chamber (16) communicates with the second absorber (4), a refrigerant vapor channel of the first generator (1) communicates with the first condenser (6), a refrigerant liquid pipe of the first condenser (6) communicates with the evaporator (8) via the throttle valve (13), a thermal driving medium pipe of the first generator (1) communicates with an external, waste heat medium pipes of the second generator (2) and the evaporator (8) respectively communicate with the external, heated medium pipes of the first absorber (3) and the first condenser (6) respectively communicate with the external, cooling medium pipes of the second absorber (4) and the second condenser (7) respectively communicate with the external, a heated medium pipe of the absorption-generator (5) communicates with the external, so that the hierarchy condensation third-type absorption heat pump is formed.

2. The hierarchy condensation third-type absorption heat pump, as recited in claim 1, further comprising a third absorber (20), wherein the dilute solution pipe of the first absorber (3) communicates with the third absorber (20), a dilute solution pipe of the third absorber (20) communicates with the absorption-generator (5), the refrigerant vapor channel of the evaporator (8) communicates with the third absorber (20), a heated medium pipe of the third absorber (20) communicates with the external, so that the hierarchy condensation third-type absorption heat pump is formed.

3. The hierarchy condensation third-type absorption heat pump, as recited in claim 1, further comprising a third generator (22), a third absorber (20), a third solution heat exchanger (19) and a fourth solution pump (23), wherein the dilute solution pipe of the absorption-generator (5) communicates with the third absorber (20) via the first solution pump (9) and the third solution heat exchanger (19), a dilute solution pipe of the third absorber (20) communicates with the first generator (1) via the fourth solution pump (23) and the second solution heat exchanger (14), the concentrated solution pipe of the first generator (1) communicates with the third generator (22) via the second solution heat exchanger (14), a concentrated solution pipe of the third generator (22) communicates with the steam distributing chamber (16) via the third solution heat exchanger (19) and the absorption-generator (5), a refrigerant vapor channel of the third generator (22) communicates with the third absorber (20), a thermal driving medium pipe of the third generator (22) communicates with the external, a heated medium pipe of the third absorber (20) communicates with the external, so that the hierarchy condensation third-type absorption heat pump is formed.

4. The hierarchy condensation third-type absorption heat pump, as recited in claim 1, further comprising a third generator (22), a third absorber (20), a third solution heat exchanger (19), a fourth solution heat exchanger (24) and a fourth solution pump (23), wherein the concentrated solution pipe of the steam distributing chamber (16) communicates with the third generator (22) via the second solution pump (10) and the third solution heat exchanger (19), a concentrated solution pipe of the third generator (22) communicates with the first absorber (3) via the fourth solution heat exchanger (24), the dilute solution pipe of the first absorber (3) communicates with the third absorber (20) via the fourth solution pump (23) and the fourth solution heat exchanger (24), a dilute solution pipe of the third absorber (20) communicates with the absorption-generator (5) via the third solution heat exchanger (19), a refrigerant vapor channel of the third generator (22) communicates with the third absorber (20), the thermal driving medium pipe of the third generator (22) communicates with the external, a heated medium pipe of the third absorber (20) communicates with the external, so that the hierarchy condensation third-type absorption heat pump is formed.

5. A hierarchy condensation third-type absorption heat pump comprising a first generator (1), a second generator (2), a first absorber (3), a second absorber (4), an absorption-generator (5), a first condenser (6), a second condenser (7), an evaporator (8), a first solution pump (9), a second solution pump (10), a third solution pump (11), a refrigerant liquid pump (12), a throttle valve (13), a first solution heat exchanger (14), a second solution heat exchanger (15), a steam distributing chamber (16) and a solution throttle valve (21), wherein a dilute solution pipe of the second absorber (4) communicates with the second generator (2) via the third solution pump (11) and the second solution heat exchanger (15), a concentrated solution pipe of the second generator (2) communicates with the second absorber (4) via the second solution heat exchanger (15), a refrigerant vapor channel of the second generator (2) communicates with the second condenser (7), a refrigerant liquid pipe of the second condenser (7) communicates with the evaporator (8) via the refrigerant liquid pump (12), a refrigerant vapor channel of the evaporator (8) communicates with the first absorber (3) and the absorption-generator (5), a dilute solution pipe of the first absorber (3) communicates with the steam distributing chamber (16) via the solution throttle valve (21) and the absorption-generator (5), a concentrated solution pipe of the steam distributing chamber (16) communicates with the first absorber (3) via the second solution pump (10), a refrigerant vapor channel of the steam distributing chamber (16) communicates with the second absorber (4), a dilute solution pipe of the absorption-generator (5) communicates with the first generator (1) via the first solution pump (9) and the first solution heat exchanger (14), a concentrated solution pipe of the first generator (1) communicates with the absorption-generator (5) via the second solution heat exchanger (14), a refrigerant vapor channel of the first generator (1) communicates with the first condenser (6), a refrigerant liquid pipe of the first condenser (6) communicates with the evaporator (8) via the throttle valve (13), a thermal driving medium pipe of the first generator (1) communicates with an external, waste heat medium pipes of the second generator (2) and the evaporator (8) respectively communicate with the external, a heated medium pipe of the first absorber (3) and the first condenser (6) communicates with the external, cooling medium pipes of the second absorber (4) and the second absorber (7) respectively communicate with the external, a heated medium pipe of the absorption-generator (5) communicates with the external, so that the hierarchy condensation third-type absorption heat pump is formed.

6. The hierarchy condensation third-type absorption heat pump, as recited in claim 5, further comprising a third absorber (20), wherein the dilute solution pipe of the first generator (1) communicates with the third absorber (20) via the first solution heat exchanger (14), a dilute solution pipe of the third absorber (20) communicates with the absorption-generator (5), the refrigerant vapor channel of the evaporator (8) communicates with the third absorber (20), a heated medium pipe of the third absorber (20) communicates with the external, so that the hierarchy condensation third-type absorption heat pump is formed.

7. The hierarchy condensation third-type absorption heat pump, as recited in claim 5, further comprising a third generator (22), a third absorber (20), a third solution heat exchanger (19) and a fourth solution pump (23), wherein the dilute solution pipe of the absorption-generator (5) communicates with the third absorber (20) via the first solution pump (9) and the third solution heat exchanger (19), a dilute solution pipe of the third absorber (20) communicates with the first generator (1) via the fourth solution pump (23) and the second solution heat exchanger (14), the concentrated solution pipe of the first generator (1) communicates with the third generator (22) via the second solution heat exchanger (14), a concentrated solution pipe of the third generator (22) communicates with the absorption-generator (5) via the third solution heat exchanger (19), a refrigerant vapor channel of the third generator (22) communicates with the third absorber (20), a thermal driving medium pipe of the third generator (22) communicates with the external, a heated medium pipe of the third absorber (20) communicates with the external, so that the hierarchy condensation third-type absorption heat pump is formed.

8. A hierarchy condensation third-type absorption heat pump comprising a first generator (1), a second generator (2), a first absorber (3), a second absorber (4), an absorption-generator (5), a first condenser (6), a second condenser (7), an evaporator (8), a first solution pump (9), a second solution pump (10), a third solution pump (11), a refrigerant liquid pump (12), a throttle valve (13), a first solution heat exchanger (14), a second solution heat exchanger (15) and a steam distributing chamber (16), a second evaporator (17), a second throttle valve (18) and a third solution heat exchanger (19), wherein a dilute solution pipe of the second absorber (4) communicates with the second generator (2) via the third solution pump (11) and the second solution heat exchanger (15), a concentrated solution pipe of the second generator (2) communicates with the second absorber (4) via the second solution heat exchanger (15), a refrigerant vapor channel of the second generator (2) communicates with the second condenser (7), a refrigerant liquid pipe of the second condenser (7) communicates with the evaporator (8) via the refrigerant liquid pump (12), a refrigerant vapor channel of the evaporator (8) communicates with the first absorber (3), a dilute solution pipe of the first absorber (3) communicates with the absorption-generator (5) via the third solution heat exchanger (19), a dilute solution pipe of the absorption-generator (5) communicates with the first generator (1) via the first solution pump (9) and the first solution heat exchanger (14), a concentrated solution pipe of the first generator (1) communicates with the steam distributing chamber (16) via the second solution heat exchanger (14) and the absorption-generator (5), a concentrated solution pipe of the steam distributing chamber (16) communicates with the first absorber (3) via the second solution pump (10) and the third solution heat exchanger (19), a refrigerant vapor channel of the steam distributing chamber (16) communicates with the second absorber (4), a refrigerant vapor channel of the first generator (1) communicates with the first condenser (6), a refrigerant liquid pipe of the first condenser (6) communicates with the evaporator (8) via the throttle valve (13), a thermal driving medium pipe of the first generator (1) communicates with an external, waste heat medium pipes of the second generator (2) and the evaporator (8) respectively communicate with the external, heated medium pipes of the first absorber (3) and the first condenser (6) respectively communicate with the external, cooling medium pipes of the second absorber (4) and the second condenser (7) respectively communicate with the external, a heated medium pipe of the absorption-generator (5) communicates with the external, a refrigerant liquid pipe of the evaporator (8) communicates with the second evaporator (17) via the second throttle valve (18), a refrigerant vapor channel of the second evaporator (17) communicates with the absorption-generator (5), a waste heat medium pipe of the second evaporator (17) communicates with the external, so that the hierarchy condensation third-type absorption heat pump is formed.

9. The hierarchy condensation third-type absorption heat pump, as recited in claim 8, further comprising a third absorber (20), wherein the dilute solution pipe of the first absorber (3) communicates with the third absorber (20) via the third solution heat exchanger (19), a dilute solution pipe of the third absorber (20) communicates with the absorption-generator (5), a refrigerant vapor channel of the second evaporator (17) communicates with the third absorber (20), a heated medium pipe of the third absorber (20) communicates with the external, so that the hierarchy condensation third-type absorption heat pump is formed.

10. The hierarchy condensation third-type absorption heat pump, as recited in claim 8, further comprising a third generator (22), a third absorber (20), a fourth solution heat exchanger (24) and a fourth solution pump (23), wherein the dilute solution pipe of the absorption-generator (5) communicates with the third absorber (20) via the first solution pump (9) and the fourth solution heat exchanger (24), a dilute solution pipe of the third absorber (20) communicates with the first generator (1) via the fourth solution pump (23) and the second solution heat exchanger (14), the concentrated solution pipe of the first generator (1) communicates with the third generator (22) via the second solution heat exchanger (14), a concentrated solution pipe of the third generator (22) communicates with the steam distributing chamber (16) via the fourth solution heat exchanger (24) and the absorption-generator (5), a refrigerant vapor channel of the third generator (22) communicates with the third absorber (20), a thermal driving medium pipe of the third generator (22) communicates with the external, a heated medium pipe of the third absorber (20) communicates with the external, so that the hierarchy condensation third-type absorption heat pump is formed.

11. The hierarchy condensation third-type absorption heat pump, as recited in claim 8, further comprising a third generator (22), a third absorber (20), a fourth solution heat exchanger (24) and a fourth solution pump (23), wherein the concentrated solution pipe of the steam distributing chamber (16) communicates with the third generator (22) via the second solution pump (10) and the third solution heat exchanger (19), a concentrated solution pipe of the third generator (22) communicates with the first absorber (3) via the fourth solution heat exchanger (24), the dilute solution pipe of the first absorber (3) communicates with the third absorber (20) via the fourth solution pump (23) and the fourth solution heat exchanger (24), a dilute solution pipe of the third absorber (20) communicates with the absorption-generator (5) via the third solution heat exchanger (19), a refrigerant vapor channel of the third generator (22) communicates with the third absorber (20), a thermal driving medium pipe of the third generator (22) communicates with the external, a heated medium pipe of the third absorber (20) communicates with the external, so that the hierarchy condensation third-type absorption heat pump is formed.

12. The hierarchy condensation third-type absorption heat pump, as recited in claim 8, further comprising a third generator (22), a third absorber (20), a fourth solution heat exchanger (24) and a fourth solution pump (23), wherein the concentrated solution pipe of the steam distributing chamber (16) communicates with the third generator (22) via the third solution heat exchanger (19), a concentrated solution pipe of the third generator (22) communicates with the first absorber (3) via the second solution pump (10) and the fourth solution heat exchanger (24), the dilute solution pipe of the first absorber (3) communicates with the third absorber (20) via the fourth solution heat exchanger (24), a dilute solution pipe of the third absorber (20) communicates with the absorption-generator (5) via the fourth solution pump (23) and the third solution heat exchanger (19), a refrigerant vapor channel of the third generator (22) communicates with the third absorber (20), a thermal driving medium pipe of the third generator (22) communicates with the external, a heated medium pipe of the third absorber (20) communicates with the external, so that the hierarchy condensation third-type absorption heat pump is formed.

* * * * *